US012647291B2

(12) United States Patent
O'Meara et al.

(10) Patent No.: US 12,647,291 B2
(45) Date of Patent: Jun. 2, 2026

(54) DATA BACKUPS USING MULTIPLE BLOCKCHAINS

(71) Applicant: Inveniam Capital Partners, Inc., New York, NY (US)

(72) Inventors: Patrick D. O'Meara, Northville, MI (US); Kevin M. Cuddeback, Medford, MA (US); Richard Gates Bunker, Jr., Jenkintown, PA (US); Robert Yablunsky, Malvern, PA (US); Quentin Vidal, Brooklyn, NY (US)

(73) Assignee: Invenian Capital Partners, Inc., New York, NY (US)

( * ) Notice: Subject to any disclaimer, the term of this patent is extended or adjusted under 35 U.S.C. 154(b) by 96 days.

(21) Appl. No.: 18/438,819

(22) Filed: Feb. 12, 2024

(65) Prior Publication Data

US 2024/0275619 A1    Aug. 15, 2024

Related U.S. Application Data

(60) Provisional application No. 63/485,084, filed on Feb. 15, 2023, provisional application No. 63/485,093, filed on Feb. 15, 2023.

(51) Int. Cl.
H04L 9/00 (2022.01)
G06F 3/06 (2006.01)
(Continued)

(52) U.S. Cl.
CPC ............... H04L 9/50 (2022.05); G06F 3/067 (2013.01); G06F 21/64 (2013.01); H04L 67/1095 (2013.01)

(58) Field of Classification Search
CPC ....... H04L 9/50; H04L 67/1095; G06F 3/067; G06F 21/64
See application file for complete search history.

(56) References Cited

U.S. PATENT DOCUMENTS 4,309,569 A    1/1982   Merkle
5,499,294 A    3/1996   Friedman
(Continued)

FOREIGN PATENT DOCUMENTS

CN    107392618 A    11/2017
CN    110392052 A    10/2019
(Continued)

OTHER PUBLICATIONS

Al-Naji, Nader et al., "Basis: A Price-Stable Cryptocurrency with an Algorithmic Central Bank" www.basis.io Jun. 20, 2017, 27 pages.
(Continued)

*Primary Examiner* — Abdulkader M Alriyashi
(74) *Attorney, Agent, or Firm* — Koffsky Schwalb LLC

(57) ABSTRACT

Data backups are performed in multiple blockchain environments. Digital pictures, movies, computer files, apps, and any other electronic data may be automatically backed-up, or duplicated, to multiple blockchain networks. First, an electronic data is written to a first blockchain network. A second, different, blockchain network is automatically selected based on many factors and/or parameters. Then, the electronic data is written to the second blockchain network. Still more duplicate copies of the electronic data may be redundantly written to third, fourth, and more blockchain networks. Any of the blockchain networks may send a confirmation that confirms the duplicate copy was written. One or more cryptographic proofs may be generated to prove the duplicate copies were stored to the multiple blockchain networks.

20 Claims, 52 Drawing Sheets

(51) Int. Cl.
    *G06F 21/64*          (2013.01)
    *H04L 67/1095*       (2022.01)

(56)                References Cited

U.S. PATENT DOCUMENTS

| | | | |
|---|---|---|---|
| 5,606,609 A | 2/1997 | Houser | |
| 5,862,218 A | 1/1999 | Steinberg | |
| 5,920,629 A | 7/1999 | Rosen | |
| 5,966,446 A | 10/1999 | Davis | |
| 6,363,481 B1 | 3/2002 | Hardjono | |
| 7,028,263 B2 | 4/2006 | Maguire | |
| 7,212,808 B2 | 5/2007 | Eric | |
| 7,272,179 B2 | 9/2007 | Siemens | |
| 7,572,179 B2 | 8/2009 | Choi | |
| 7,729,950 B2 | 6/2010 | Mendizabal | |
| 7,730,113 B1 | 6/2010 | Payette | |
| 8,245,038 B2 | 8/2012 | Golle | |
| 8,266,439 B2 | 9/2012 | Haber | |
| 8,359,361 B2 | 1/2013 | Thornton | |
| 8,442,903 B2 | 5/2013 | Zadoorian | |
| 8,560,722 B2 | 10/2013 | Gates | |
| 8,612,477 B2 | 12/2013 | Becker | |
| 8,706,616 B1 | 4/2014 | Flynn | |
| 8,712,887 B2 | 4/2014 | Degroeve | |
| 8,867,741 B2 | 10/2014 | Mccorkindale | |
| 8,943,332 B2 | 1/2015 | Horne | |
| 8,990,322 B2 | 3/2015 | Cai | |
| 9,124,423 B2 | 9/2015 | Jennas, II | |
| 9,325,653 B1 | 4/2016 | Peterson | |
| 9,378,343 B1 | 6/2016 | David | |
| 9,396,006 B2 | 7/2016 | Kundu | |
| 9,398,018 B2 | 7/2016 | Macgregor | |
| 9,407,431 B2 | 8/2016 | Bellare | |
| 9,411,524 B2 | 8/2016 | O'Hare | |
| 9,411,976 B2 | 8/2016 | Irvine | |
| 9,411,982 B1 | 8/2016 | Dippenaar | |
| 9,424,576 B2 | 8/2016 | Vandervort | |
| 9,436,923 B1 | 9/2016 | Sriram | |
| 9,436,935 B2 | 9/2016 | Hudon | |
| 9,472,069 B2 | 10/2016 | Roskowski | |
| 9,489,827 B2 | 11/2016 | Quinn | |
| 9,584,493 B1 | 2/2017 | Leavy | |
| 9,588,790 B1 | 3/2017 | Wagner | |
| 9,647,977 B2 | 5/2017 | Levasseur | |
| 9,722,790 B2 | 8/2017 | Ebrahimi | |
| 9,794,074 B2 | 10/2017 | Toll | |
| 9,818,109 B2 | 11/2017 | Loh | |
| 9,830,580 B2 | 11/2017 | Macgregor | |
| 9,875,510 B1 | 1/2018 | Kasper | |
| 9,876,646 B2 | 1/2018 | Ebrahimi | |
| 9,882,918 B1 | 1/2018 | Ford | |
| 10,025,941 B1 | 7/2018 | Griffin | |
| 10,046,228 B2 | 8/2018 | Tran | |
| 10,102,265 B1 * | 10/2018 | Madisetti | G06F 16/27 |
| 10,102,526 B1 | 10/2018 | Madisetti | |
| 10,108,954 B2 | 10/2018 | Dunlevy | |
| 10,135,607 B1 | 11/2018 | Roets | |
| 10,135,609 B2 | 11/2018 | Bibera | |
| 10,163,080 B2 | 12/2018 | Chow | |
| 10,250,395 B1 | 4/2019 | Borne-Pons | |
| 10,270,599 B2 | 4/2019 | Nadeau | |
| 10,346,815 B2 | 7/2019 | Glover | |
| 10,355,869 B2 | 7/2019 | Bisti | |
| 10,366,204 B2 | 7/2019 | Tanner, Jr. | |
| 10,373,129 B1 | 8/2019 | James | |
| 10,411,897 B2 | 9/2019 | Paolini-Subramanya | |
| 10,419,225 B2 | 9/2019 | Deery | |
| 10,438,285 B1 | 10/2019 | Konstantinides | |
| 10,438,290 B1 | 10/2019 | Winklevoss | |
| 10,476,847 B1 | 11/2019 | Smith | |
| 10,532,268 B2 | 1/2020 | Tran | |
| 10,586,270 B2 | 3/2020 | Reddy | |
| 10,628,268 B1 | 4/2020 | Baruch | |
| 10,657,151 B2 | 5/2020 | Qiu | |
| 10,685,399 B2 | 6/2020 | Snow | |
| 10,693,652 B2 | 6/2020 | Nadeau | |
| 10,726,346 B2 | 7/2020 | Saxena | |
| 10,749,848 B2 | 8/2020 | Voell | |
| 10,764,752 B1 | 9/2020 | Avetisov | |
| 10,783,164 B2 | 9/2020 | Snow | |
| 10,817,873 B2 | 10/2020 | Paolini-Subramanya | |
| 10,826,685 B1 | 11/2020 | Campagna | |
| 10,841,372 B1 | 11/2020 | Ram | |
| 10,855,446 B2 | 12/2020 | Ow | |
| 10,873,457 B1 | 12/2020 | Beaudoin | |
| 10,915,895 B1 | 2/2021 | Fogg | |
| 10,929,842 B1 | 2/2021 | Arvanaghi | |
| 10,949,926 B1 | 3/2021 | Call | |
| 10,956,973 B1 | 3/2021 | Chang | |
| 10,958,418 B2 | 3/2021 | Ajoy | |
| 10,997,159 B2 | 5/2021 | Iwama | |
| 11,042,871 B2 | 6/2021 | Snow | |
| 11,044,095 B2 | 6/2021 | Lynde | |
| 11,044,097 B2 | 6/2021 | Snow | |
| 11,044,100 B2 | 6/2021 | Deery | |
| 11,063,770 B1 | 7/2021 | Peng | |
| 11,075,744 B2 | 7/2021 | Tormasov | |
| 11,093,933 B1 | 8/2021 | Peng | |
| 11,134,120 B2 | 9/2021 | Snow | |
| 11,164,250 B2 | 11/2021 | Snow | |
| 11,164,254 B1 | 11/2021 | Gordon, III | |
| 11,170,366 B2 | 11/2021 | Snow | |
| 11,171,782 B2 | 11/2021 | Tang | |
| 11,205,172 B2 | 12/2021 | Snow | |
| 11,265,173 B2 | 3/2022 | Liao | |
| 11,276,056 B2 | 3/2022 | Snow | |
| 11,281,660 B1 | 3/2022 | Pike | |
| 11,295,296 B2 | 4/2022 | Snow | |
| 11,296,889 B2 | 4/2022 | Snow | |
| 11,328,290 B2 | 5/2022 | Snow | |
| 11,334,874 B2 | 5/2022 | Snow | |
| 11,347,769 B2 | 5/2022 | Snow | |
| 11,348,097 B2 | 5/2022 | Snow | |
| 11,348,098 B2 | 5/2022 | Snow | |
| 11,423,398 B1 | 8/2022 | Mullins | |
| 11,438,143 B2 | 9/2022 | Collins | |
| 11,886,425 B2 | 1/2024 | Pezeshki | |
| 11,943,334 B2 | 3/2024 | Snow | |
| 2001/0029482 A1 | 10/2001 | Tealdi | |
| 2003/0018563 A1 | 1/2003 | Kilgour | |
| 2004/0085445 A1 | 5/2004 | Park | |
| 2004/0168052 A1 | 8/2004 | Clisham | |
| 2005/0206741 A1 | 9/2005 | Raber | |
| 2006/0075228 A1 | 4/2006 | Black | |
| 2006/0184443 A1 | 8/2006 | Erez | |
| 2007/0027787 A1 | 2/2007 | Tripp | |
| 2007/0094272 A1 | 4/2007 | Yeh | |
| 2007/0174630 A1 | 7/2007 | Shannon | |
| 2007/0294235 A1 | 12/2007 | Millett | |
| 2007/0296817 A1 | 12/2007 | Ebrahimi | |
| 2008/0010466 A1 | 1/2008 | Hopper | |
| 2008/0028439 A1 | 1/2008 | Shevade | |
| 2008/0059726 A1 | 3/2008 | Rozas | |
| 2009/0025063 A1 | 1/2009 | Thomas | |
| 2009/0287597 A1 | 11/2009 | Bahar | |
| 2010/0049966 A1 | 2/2010 | Kato | |
| 2010/0058476 A1 | 3/2010 | Isoda | |
| 2010/0161459 A1 | 6/2010 | Kass | |
| 2010/0228798 A1 | 9/2010 | Kodama | |
| 2010/0241537 A1 | 9/2010 | Kass | |
| 2011/0061092 A1 | 3/2011 | Bailloeul | |
| 2011/0161674 A1 | 6/2011 | Ming | |
| 2011/0199469 A1 | 8/2011 | Gallagher | |
| 2012/0059824 A1 | 3/2012 | Simon | |
| 2012/0203670 A1 | 8/2012 | Piersol | |
| 2012/0264520 A1 | 10/2012 | Marsland | |
| 2013/0142323 A1 | 6/2013 | Chiarella | |
| 2013/0222587 A1 | 8/2013 | Roskowski | |
| 2013/0275765 A1 | 10/2013 | Lay | |
| 2013/0276058 A1 | 10/2013 | Buldas | |
| 2014/0022973 A1 | 1/2014 | Kopikare | |
| 2014/0201541 A1 | 7/2014 | Paul | |
| 2014/0229738 A1 | 8/2014 | Sato | |
| 2014/0279762 A1 | 9/2014 | Xaypanya | |

(56) References Cited

U.S. PATENT DOCUMENTS

| | | |
|---|---|---|
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0052615 A1 | 2/2015 | Gault |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | Mccarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0085955 A1 | 3/2016 | Lerner |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | Mccoy |
| 2016/0321751 A1 | 11/2016 | Creighton, IV |
| 2016/0321769 A1 | 11/2016 | Mccoy |
| 2016/0328791 A1 | 11/2016 | Parsells |
| 2016/0330031 A1 | 11/2016 | Drego |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0212781 A1 | 7/2017 | Dillenberger |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0269186 A1 | 9/2017 | Sharma |
| 2017/0330279 A1 | 11/2017 | Ponzone |
| 2017/0344983 A1 | 11/2017 | Muftic |
| 2017/0346693 A1 | 11/2017 | Dix |
| 2017/0352027 A1 | 12/2017 | Zhang |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vishwa |
| 2018/0183602 A1 | 6/2018 | Campagna |
| 2018/0189333 A1 | 7/2018 | Childress |
| 2018/0189781 A1 | 7/2018 | Mccann |
| 2018/0204213 A1 | 7/2018 | Zappier |
| 2018/0212779 A1 | 7/2018 | Bergmann |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0253702 A1 | 9/2018 | Dowding |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0323963 A1 | 11/2018 | Stollman |
| 2018/0330349 A1 | 11/2018 | Uhr |
| 2018/0341930 A1 | 11/2018 | Moir |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0028273 A1 | 1/2019 | Harras |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0058581 A1 | 2/2019 | Wood |
| 2019/0058709 A1 | 2/2019 | Kempf |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0081796 A1 | 3/2019 | Chow |

(56) References Cited

U.S. PATENT DOCUMENTS

| | | |
|---|---|---|
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0207748 A1* | 7/2019 | Courtney ............... H04L 9/3239 |
| 2019/0236286 A1 | 8/2019 | Scriber |
| 2019/0251199 A1 | 8/2019 | Klianev |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0318117 A1 | 10/2019 | Beecham |
| 2019/0319782 A1 | 10/2019 | Ghosh |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340267 A1 | 11/2019 | Vo |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005270 A1 | 1/2020 | Griffith |
| 2020/0005290 A1 | 1/2020 | Madisetti |
| 2020/0007341 A1 | 1/2020 | Veeningen |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0151714 A1 | 5/2020 | Chan |
| 2020/0160326 A1 | 5/2020 | Sarin |
| 2020/0167870 A1 | 5/2020 | Isaacson |
| 2020/0175506 A1 | 6/2020 | Snow |
| 2020/0195441 A1 | 6/2020 | Suen |
| 2020/0201964 A1 | 6/2020 | Nandakumar |
| 2020/0211005 A1 | 7/2020 | Bodorik |
| 2020/0211011 A1 | 7/2020 | Anderson |
| 2020/0231122 A1 | 7/2020 | Simlett |
| 2020/0234386 A1 | 7/2020 | Blackman |
| 2020/0250747 A1 | 8/2020 | Padmanabhan |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0286082 A1 | 9/2020 | Cheng |
| 2020/0302433 A1 | 9/2020 | Green |
| 2020/0304289 A1 | 9/2020 | Androulaki |
| 2020/0314648 A1 | 10/2020 | Cao |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0322159 A1 | 10/2020 | Xu |
| 2020/0358619 A1 | 11/2020 | Ding |
| 2020/0366495 A1 | 11/2020 | Mahoney |
| 2020/0374129 A1 | 11/2020 | Dilles |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0152332 A1 | 5/2021 | Chen |
| 2021/0174353 A1 | 6/2021 | Snow |
| 2021/0176038 A1 | 6/2021 | Bortnikov |
| 2021/0194673 A1 | 6/2021 | Collins |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0217002 A1 | 7/2021 | Basu |
| 2021/0226769 A1 | 7/2021 | Snow |
| 2021/0226773 A1 | 7/2021 | Snow |
| 2021/0234665 A1 | 7/2021 | Kramer |
| 2021/0241282 A1 | 8/2021 | Gu |
| 2021/0248514 A1 | 8/2021 | Cella |
| 2021/0266167 A1 | 8/2021 | Lohe |
| 2021/0266174 A1 | 8/2021 | Snow |
| 2021/0272103 A1 | 9/2021 | Snow |
| 2021/0273807 A1 | 9/2021 | Wertheim |
| 2021/0273810 A1 | 9/2021 | Lynde |
| 2021/0273816 A1 | 9/2021 | Deery |
| 2021/0297397 A1 | 9/2021 | Bartolucci |
| 2021/0326815 A1 | 10/2021 | Brody |
| 2021/0328804 A1 | 10/2021 | Snow |
| 2021/0342836 A1 | 11/2021 | Cella |
| 2021/0357369 A1* | 11/2021 | Kwon ................... H04L 9/3239 |
| 2021/0366586 A1 | 11/2021 | Ryan |
| 2022/0006641 A1 | 1/2022 | Snow |

(56) References Cited

U.S. PATENT DOCUMENTS

| | | |
|---|---|---|
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0044162 A1 | 2/2022 | Zhang |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |
| 2022/0274703 A1 | 9/2022 | Di Cosola |
| 2022/0286273 A1 | 9/2022 | Snow |
| 2022/0329630 A1 | 10/2022 | Li |
| 2022/0343768 A1 | 10/2022 | Di Cosola |
| 2022/0405260 A1 | 12/2022 | Snow |
| 2022/0405742 A1* | 12/2022 | Ravinathan ............ G06Q 20/02 |
| 2022/0407728 A1 | 12/2022 | Snow |
| 2023/0185783 A1 | 6/2023 | Haddad |
| 2023/0199677 A1 | 6/2023 | Richardson |
| 2023/0334490 A1* | 10/2023 | Tai ....................... G06Q 20/326 |
| 2024/0046391 A1 | 2/2024 | Ma |
| 2024/0113862 A1 | 4/2024 | Snow |
| 2024/0187254 A1 | 6/2024 | Deery |
| 2024/0205030 A1 | 6/2024 | Wright |
| 2024/0275580 A1 | 8/2024 | Snow |
| 2024/0296171 A1 | 9/2024 | Douglass |
| 2024/0330317 A1 | 10/2024 | Snow |
| 2024/0388621 A1 | 11/2024 | Snow |
| 2025/0055715 A1 | 2/2025 | Snow |
| 2025/0184117 A1 | 6/2025 | Snow |
| 2025/0286731 A1 | 9/2025 | Deery |

FOREIGN PATENT DOCUMENTS

| | | |
|---|---|---|
| CN | 110599147 A | 12/2019 |
| CN | 112329041 A | 2/2021 |
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |
| KR | 101747221 | 6/2017 |
| WO | 0049797 | 8/2000 |
| WO | 2007069176 | 6/2007 |
| WO | 2015077378 | 5/2015 |
| WO | 2017190795 A1 | 11/2017 |
| WO | 2018013898 A1 | 1/2018 |
| WO | 2018109010 | 6/2018 |
| WO | 2018116106 A1 | 6/2018 |
| WO | 2018127923 A1 | 7/2018 |
| WO | 2018127923072018 | 7/2018 |
| WO | 2018208105 A1 | 11/2018 |
| WO | 2019180702 | 9/2019 |
| WO | 2019207504 | 10/2019 |
| WO | 2020019341 A1 | 1/2020 |
| WO | 2020125839 A1 | 6/2020 |

OTHER PUBLICATIONS

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014. 7 pages.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Basis: A Price-Stable Cryptocurrency with an Algorithmic Central Bank Formerly known as: Basecoin Nader Al-Najij@ intangiblelabs. co), Josh Chen (Year: 2018) 27 pages.

Casey, "BitBeat: Factom Touts Blockchain Tool for Keeping Record Keepers Honest", Wall Street Journal, Nov. 5, 2014. 2 pages.

Chakravorty, Antorweep, and Chunming Rong, "Ushare: user controlled social media based on blockchain." Proceedings of the 11th International Conference on Ubiquitous Information Management and Communication. ACM, 2017. 6 pages.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017. 7 pages.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018). 7 pages.

Eberhardt et al., "ZoKrates—Scalable Privacy-Preserving Off-Chain Computations," https://ieeexplore.ieee.org/stamp/JSP?tp:::&armumber:::8726497. (Year:2018) 8 pages.

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, May 17, 2018, 15 pages.

Iddo Bentov, Bitcoin and Secure Computation with Money, May 2016 (Year: 2016). 177 pages.

Kim et al., "A Perspective on Blockchain Smart Contracts," Schulich School of Business, York University, Toronto, Canada, 2017, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018) 6 pages.

Luther, "Do We Need A "Fedcoin" Cryptocurrency?," ValueWalk, Newstex Global Business Blogs, Dec. 30, 2015 (Year: 2015) 10 pages.

Luu et al., Making Smart Contracts Smarter, 2016. 16 pages.

Menezes, Alfred. J., et al. "Handbook of Applied Cryptography," 1997, CRC Press, p. 527-28.

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

(56) References Cited

OTHER PUBLICATIONS

MOF-BC: A Memory Optimized and Flexible BlockChain for Large Scale Networks. IIe:///C:/Users/Eoussir/Documents/e-Red%20Folder/16905961/NPL_MOF_BC_A%20Memory%20Optimized%20and%20Flexible%20Blockchain.pdf (Year:2018) 43 pages.

Muhamed et al. EduCTX: A Blockchain-Based Higher Education Credit Platform, https://ieeexplore.ieee.org/stamp/stamp.jsp?arnumber=8247166. (Year: 2017). 16 pages.

On blockchain and its integration with IoT. Challenges and opportunities. file:///C:/Users/eoussir/Downloads/1-s2.0S0167739X17329205-main%20(1). pdf (Year: 2018) 18 pages.

Sokolowski, R. (2011). Signed, sealed, delivered: EMortgages are protected from unauthorized alteration by something called a tamper seal. Mortgage Banking, 71(6), 108(4). Retrieved from https://dialog.proquest.com/professional/docview/1068158815? accountid=131444 (Year: 2011).

United States: New Generation cryptocurrency, USDX Protocol, Offers Crypto Advantages and Fiat Pegging, Apr. 2, 2018 (Year: 2018). 3 pages.

Unknown, "Federated Learning: Collaborative Machine Learning without Centralized Training Data" Apr. 6, 2017, 11 pages.

Unknown, "Midex", https://promo.midex.com/Midex_EN.pdf, 2017, 25 pages.

Unknown, Xtrade White Paper, https://xtrade1-9649.kxcdn.com/wp-content/uploads/2017/09/xtrade-whitepaper.pdf Feb. 7, 2018, 37 pages.

Watanabe, Hiroki, et al. "Blockchain contract: Securing a blockchain applied to smart contracts." 2016 IEEE International Conference on Consumer Electronics (ICCE). IEEE, 2016. 2 pages.

White, Ron, "How Computers Work," Oct. 2003, Que, Seventh Edition (Year: 2003), 23 pages.

Why offchain storage is needed for blockchain_V4_1 FINAL (Year: 2018), by IBM, 13 pages.

Written Opinion in PCT/US2021/040207, Inventor Snow, Mail date Oct. 7, 2021, 14 pages.

ZoKrates—Scalable Privacy-Preserving Off-Chain Computations, by Jacob Eberhardt, Stefan Tai , 8 pages, Nov. 3, 2011 (Year: 2011).

Eleftherios Kokoris-Kogias, OmniLedger: A Secure, Scale-Out, Decentralized Ledger via Sharding, Jul. 2018, IEEE, https:// ieeexplore.ieee.org/stamp/stamp.jsp?tp=&arnumber=8418625 (Year: 2018) (pp. 1-16).

Encoding, Encryption, and Hashing by Andrea Chiarelli (Year: 2022) 12 pages.

P. Sood, P. Palsania, S. Ahuja, S. Kumar, K. Khatter and A. Mishra, "Decentralised & Collaborative DocuPad Using Blockchain," 2022 IEEE Delhi Section Conference (DELCON), New Delhi, India, 2022, pp. 1-8, doi: 10.1109/DELCON54057.2022.9752853. ( Year: 2022).

* cited by examiner

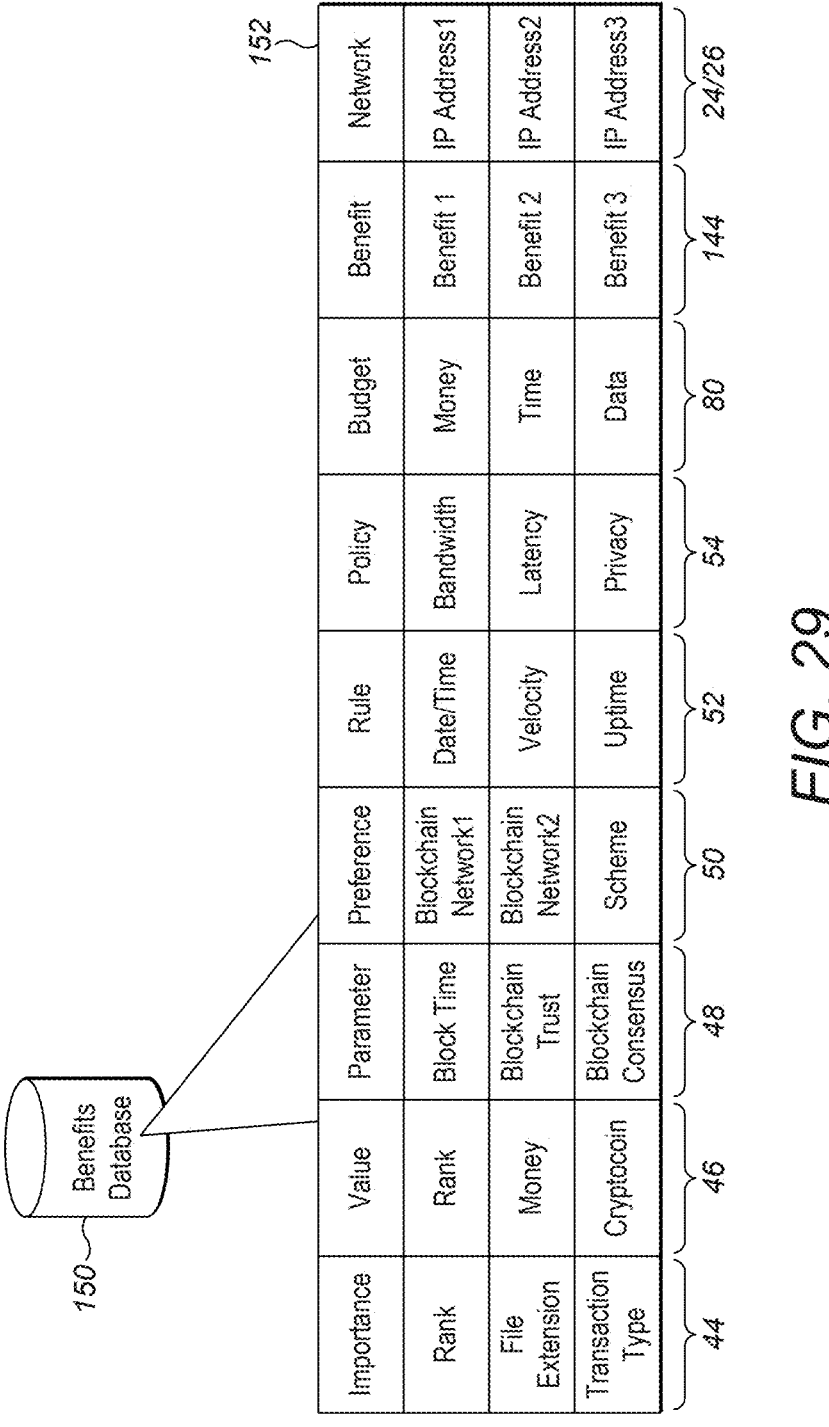

| Importance | Value | Parameter | Preference | Rule | Policy | Budget | Benefit | Network |
|---|---|---|---|---|---|---|---|---|
| Rank | Rank | Block Time | Blockchain Network1 | Date/Time | Bandwidth | Money | Benefit 1 | IP Address1 |
| File Extension | Money | Blockchain Trust | Blockchain Network2 | Velocity | Latency | Time | Benefit 2 | IP Address2 |
| Transaction Type | Cryptocoin | Blockchain Consensus | Scheme | Uptime | Privacy | Data | Benefit 3 | IP Address3 |
| 44 | 46 | 48 | 50 | 52 | 54 | 80 | 144 | 24/26 |

150 — Benefits Database

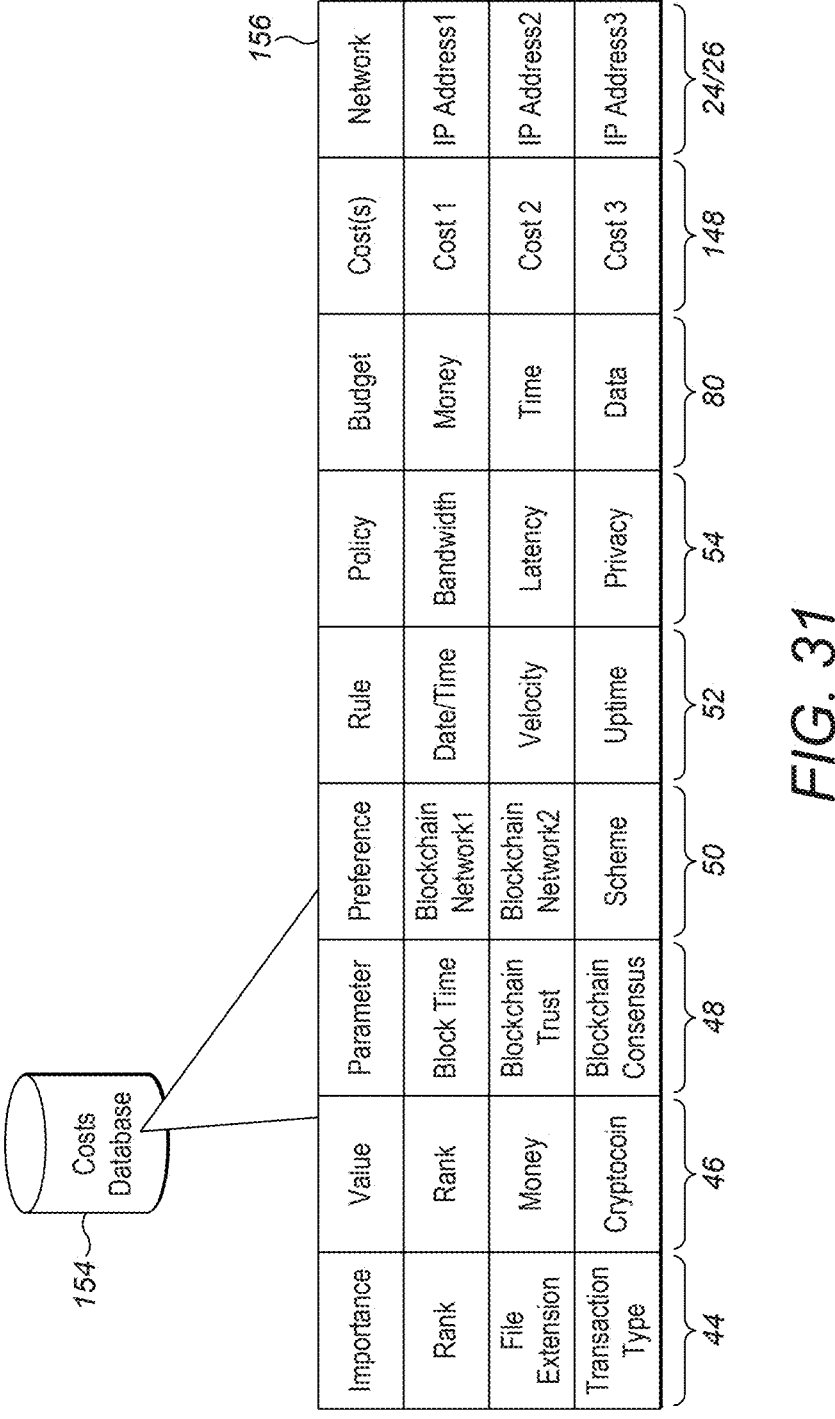

| Importance | Value | Parameter | Preference | Rule | Policy | Budget | Cost(s) | Network |
|---|---|---|---|---|---|---|---|---|
| Rank | Rank | Block Time | Blockchain Network1 | Date/Time | Bandwidth | Money | Cost 1 | IP Address1 |
| File Extension | Money | Blockchain Trust | Blockchain Network2 | Velocity | Latency | Time | Cost 2 | IP Address2 |
| Transaction Type | Cryptocoin | Blockchain Consensus | Scheme | Uptime | Privacy | Data | Cost 3 | IP Address3 |
| 44 | 46 | 48 | 50 | 52 | 54 | 80 | 148 | 24/26 |

Costs Database

DATA BACKUPS USING MULTIPLE BLOCKCHAINS

CROSS-REFERENCE TO RELATED APPLICATIONS

This application claims the benefit of U.S. provisional application No. 63/485,084 filed Feb. 15, 2023, and of U.S. provisional application No. 63/485,093 filed Feb. 15, 2023, each of which is incorporated herein in its entirety.

BACKGROUND

Data backups are essential in today's data-driven society. Every day rogue entities attempt to hack and fish our devices and data. Malicious software is just a click away. Network breaches are common. Hardware and software failures also jeopardize our data. Data backups are thus essential best practices.

Centralized data storage, though, is ineffective. Many people and businesses transfer their data to a central database (such as an external drive, network server, or cloud service). This conventional, central database scheme is generally inexpensive and easy to implement. However, centralized database schemes are still prone to hardware and software failures. Centralized database schemes may also be slow, perhaps due to network latency and traffic. Centralized database schemes are still vulnerable to hacking, intrusions, and other rogue operations.

SUMMARY

Exemplary embodiments automatically backup data to multiple blockchains. When we store digital images, movies, and other electronic data to our smartphones and to other computers, exemplary embodiments transfer duplicate copies to multiple blockchains. Each blockchain is a decentralized storage scheme where each duplicate copy is stored to many different hardware locations. Duplicate copies are thus dispersed to many computers in different blockchain networks. Because the duplicate copies are written to many hardware locations in multiple blockchain networks, data redundancy and security are greatly improved, and there is no single hardware or software point of failure. Moreover, exemplary embodiments may automatically select which blockchain(s) is/are best suited for storing our duplicate copies. Because the different blockchain networks likely have different and varying costs and performances, exemplary embodiments may automatically determine which blockchain(s) is/are best suited for redundantly writing the duplicate copies. Indeed, exemplary embodiments allow users and administrators to define many characteristics, parameters, and attributes (such as importance, budget, rules, performance, policies, and/or restrictions) that govern selections among the multiple blockchain networks. Exemplary embodiments weigh and compare these attributes to automatically select which one or more blockchain(s) is/are best suited for storing the duplicate copies. Exemplary embodiments may also cryptographically prove that the duplicate copies were written to the selected blockchain(s).

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 28-33 further illustrate the blockchain selection mechanism, according to exemplary embodiments;

FIGS. 33-34 illustrate predetermined outcomes, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
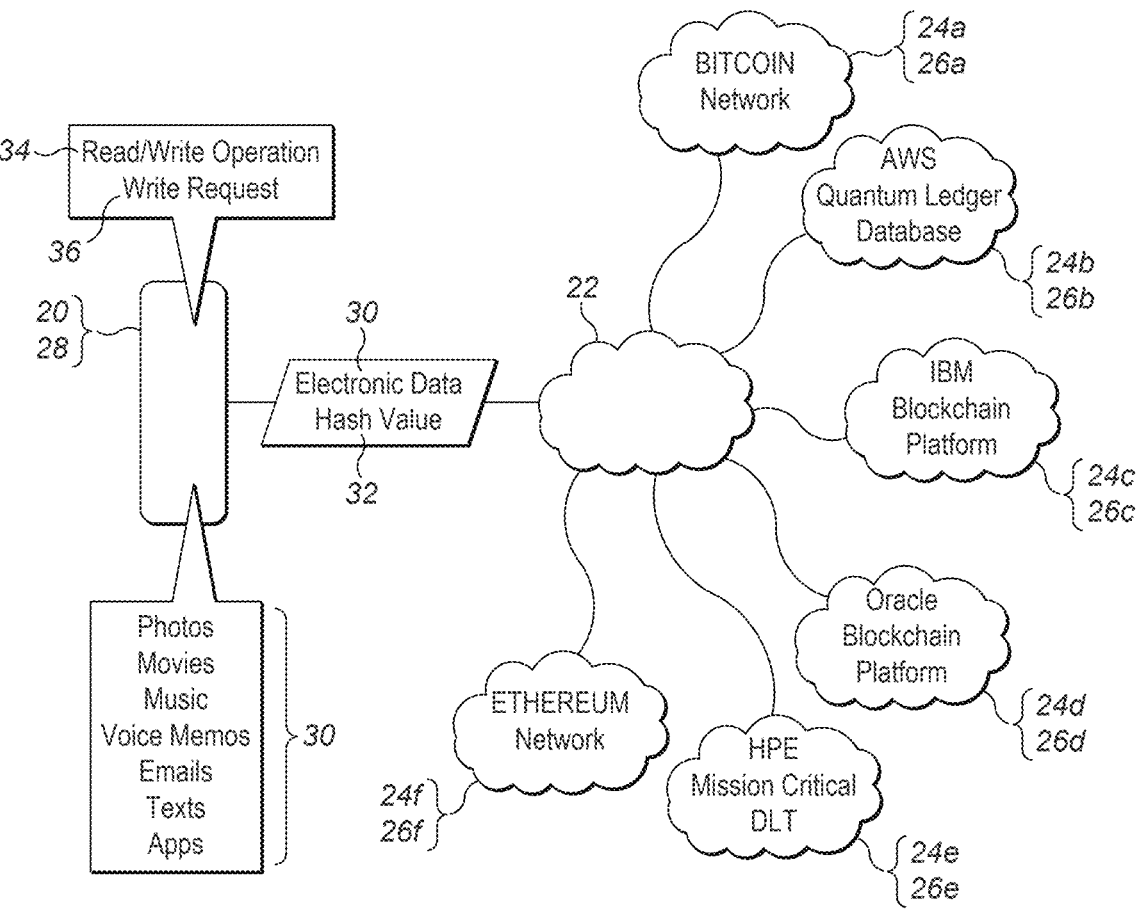
FIGS. 1-17 are simplified illustrations of decentralized blockchain data storage, according to exemplary embodiments.

FIGS. 1-17 are simplified illustrations of decentralized blockchain data storage, according to exemplary embodiments. FIG. 1 illustrates a computer 20 communicating via a communications network 22 with multiple blockchain networks 24 and/or multiple blockchain service providers 26. Most readers are familiar with mobile computing, so FIG. 1 illustrates the computer 20 as a smartphone 28. The computer 20, however, may be any processor-controlled device, as this disclosure will explains below. As the reader understands, the smartphone 28 may store all kinds of electronic data 30, such as digital photos, movies, music, voice memos, emails, text messages, and software "apps." Indeed, the smartphone 28 may store gigabytes of many different types of the electronic data 30. As the reader also understands, to prevent data loss, the smartphone 28 may be programmed to copy, backup, transfer, or archive the various electronic data 30 to some remote storage location.

FIG. 1 illustrates blockchain recordations. When the smartphone 28 requires remote storage, for any reason, the smartphone 28 interfaces with any of the multiple blockchain networks 24 and/or the multiple blockchain service providers 26. There are many different blockchain networks 24 and/or blockchain service providers 26. FIG. 1, for simplicity, only illustrates those blockchain networks 24 and service providers 26 thought familiar to most readers. The smartphone 28, for example, may request or access the BITCOIN® blockchain network offered by the Bitcoin Project (illustrated, respectively, as reference numerals 24a and 26a). When the smartphone 28 requires data storage services, the smartphone 28 may select the BITCON® blockchain network 24a and request that any, some, or all of the electronic data 30 (or its representative hash value(s) 32) be written to the BITCOIN® blockchain. The smartphone 28, however, may additionally or alternatively select the Quantum Ledger Database 24b offered as a blockchain as a service (or "BaaS") by Amazon Web Services (or "AWS") (illustrated as reference numeral 26b). Moreover, the smartphone 28 may additionally or alternatively select the Blockchain Platform 24c offered by IBM® 26c, the Blockchain Platform Cloud Service 24d offered by ORACLE® 26d, Hewlett Packard Enterprise's Mission-Critical Distributed Ledger Technology (e.g., 24e and 26e), and the ETHEREUM® blockchain 24f managed by the Ethereum Foundation 26f. While only six (6) blockchain networks 24 and service providers 26 are shown, the smartphone 28 may establish communication with any number of different blockchain networks 24 and/or different blockchain service providers 26. Regardless, when the smartphone 28 requires blockchain storage services (such as executing a read/write operation 34 or sending a blockchain write request 36), the smartphone 28 may select any one or more of the multiple blockchain networks 24 and/or the different blockchain service providers 26 as remote, blockchain network storage destinations.

Figure 2:
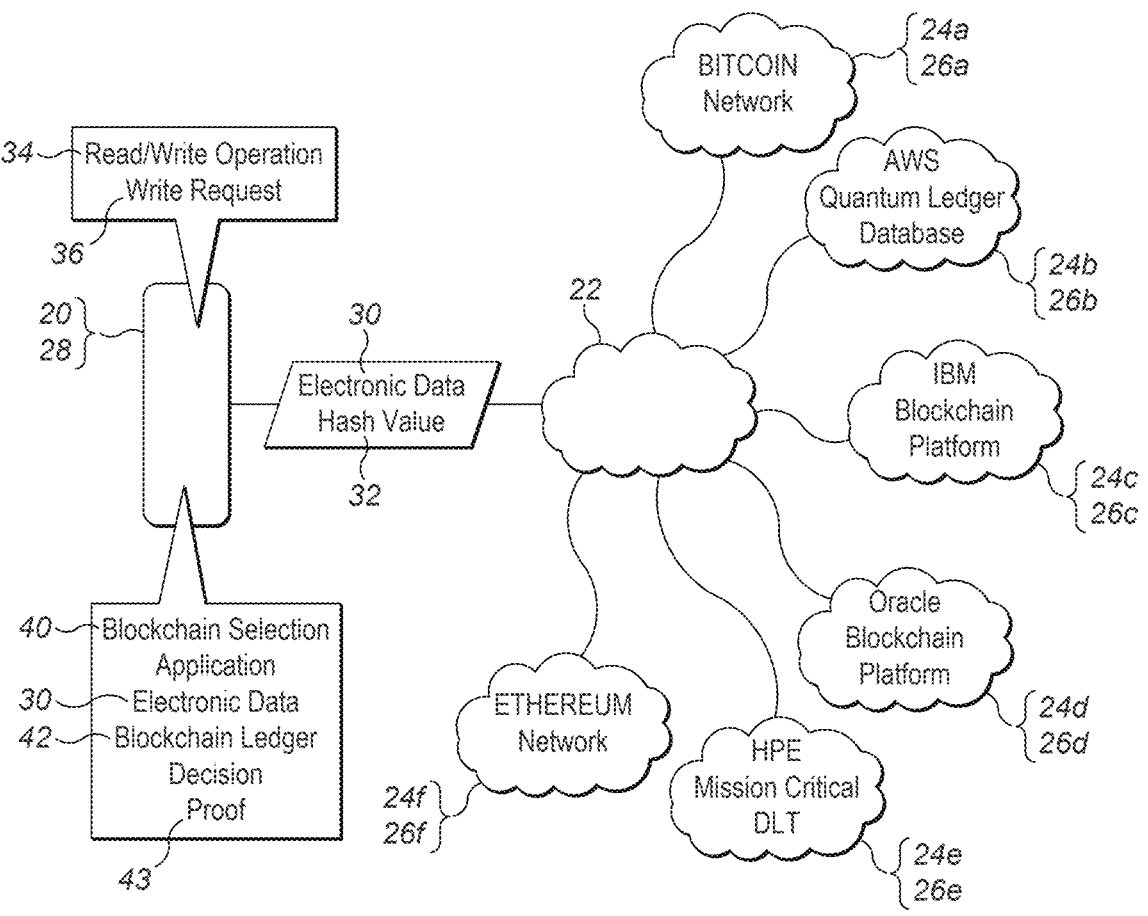

FIG. 2 illustrates an automated blockchain selection mechanism. Because the computer 20 (again illustrated as the smartphone 28) may interface with the different blockchain networks 24 and/or the different blockchain service providers 26, the smartphone 28 may need to decide which one or more of the different blockchain networks 24 and/or different blockchain service providers 26 is/are best suited for backing up the electronic data 30. The smartphone 28 may thus store and/or execute a blockchain selection application 40. The blockchain selection application 40 includes computer programming or code that instructs or causes the smartphone 28 to perform operations, such as generating a blockchain ledger decision 42, based at least in part on the electronic data 30. The blockchain ledger decision 42 represents which one, or more, of the different blockchain networks 24 and/or the different blockchain service providers 26 is/are best suited for writing or storing duplicate copies of the electronic data 30. Once the blockchain ledger decision 42 is generated, the smartphone 28 commences requesting, writing, or recording the duplicate copies of the electronic data 30 to the chosen or selected blockchain network(s) 24 and/or the blockchain service provider(s) 26 (such as by using multiple read/write operations 34 and/or multiple blockchain write requests 36, as later paragraphs will explain). The smartphone 28 may also generate a cryptographic proof 43 of the blockchain ledger decision 42. The cryptographic proof 43 may be written one or more of the blockchain network(s) 24 and/or the blockchain service provider(s) 26. The cryptographic proof 43 thus verifies that the duplicate copies of the electronic data 30 were backed-up and written to at least two of the different blockchain networks 24 and/or the different blockchain service providers 26.

Figure 3:
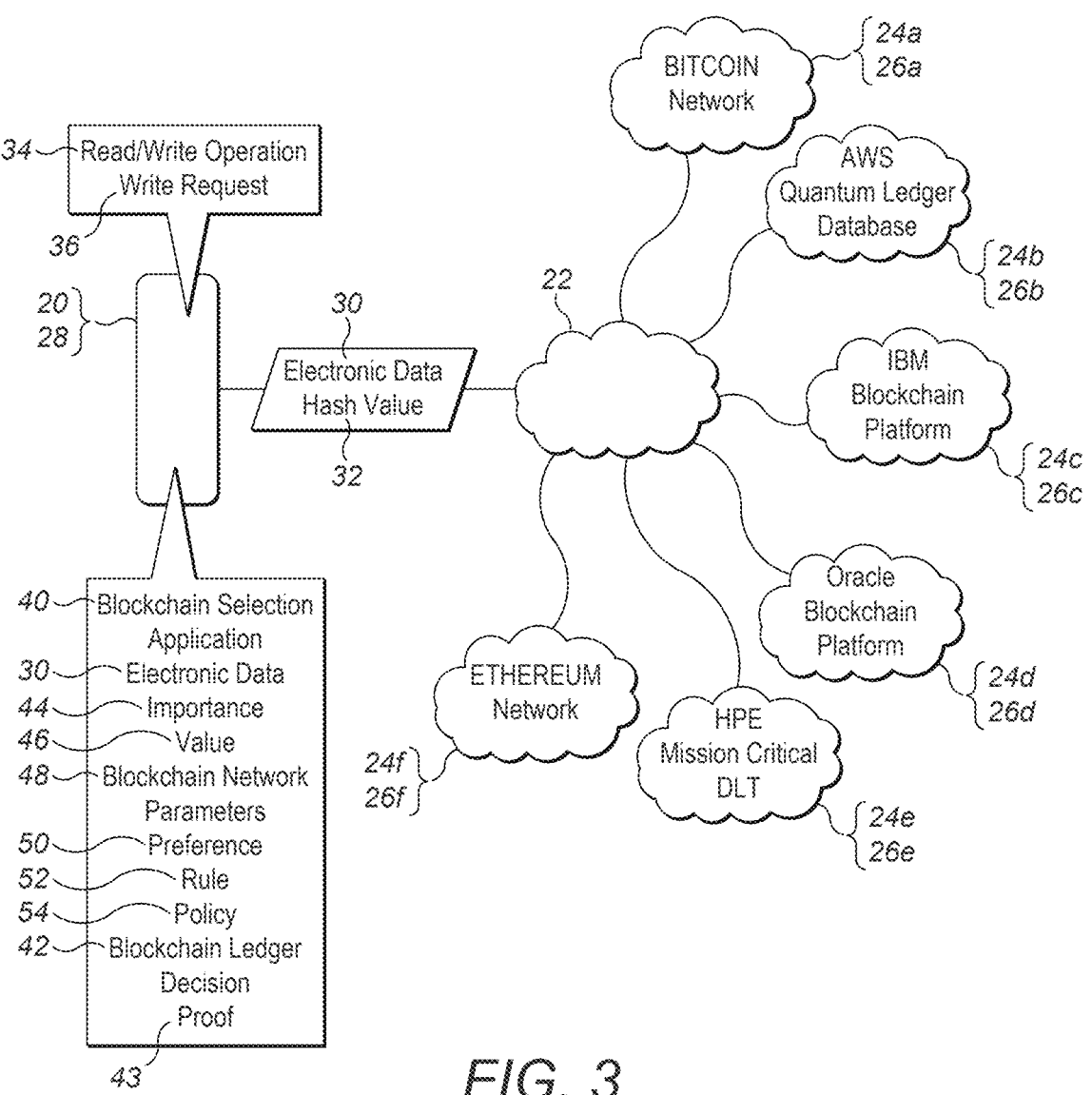

FIG. 3 further illustrates the blockchain selection mechanism. The blockchain selection application 40 may instruct or cause the computer 20 (e.g., the smartphone 28) to acquire and to evaluate various data and information to generate the blockchain ledger decision 42. The electronic data 30, for example, may have an importance 44 and/or a value 46. The smartphone 28 may acquire blockchain network parameters 48 associated with the multiple blockchain networks 24 and/or the different blockchain service providers 26. The smartphone 28 may also acquire one or more ledger or blockchain preferences 50 associated with the multiple blockchain networks 24 and/or the different blockchain service providers 26. The preference(s) 50 may be configured by a user or administrator to favor, or to sometimes exclusively use, a particular one of the blockchain networks 24 and/or a particular one of the blockchain service providers 26. The smartphone 28 may also retrieve and execute logical rules 52 and policies 54 that further govern the blockchain selection mechanism. The smartphone 28 generates the blockchain ledger decision 42 by retrieving and weighing the importance 44 or the value 46 of the electronic data 30, the blockchain network parameters 48, and the preference(s) 50, perhaps according to the logical rules 52 and policies 54. Once the smartphone 28 generates the blockchain ledger decision 42, the smartphone 28 commences requesting, writing, recording, or storing the duplicate copies of the electronic data 30 to the chosen or selected blockchain network(s) 24 and/or the blockchain service provider(s) 26. The smartphone 28 may also generate the cryptographic proof 43 of the blockchain ledger decision 42. The cryptographic proof 43 thus verifies that the duplicate copies of the electronic data 30 were written or archived.

Figure 4:
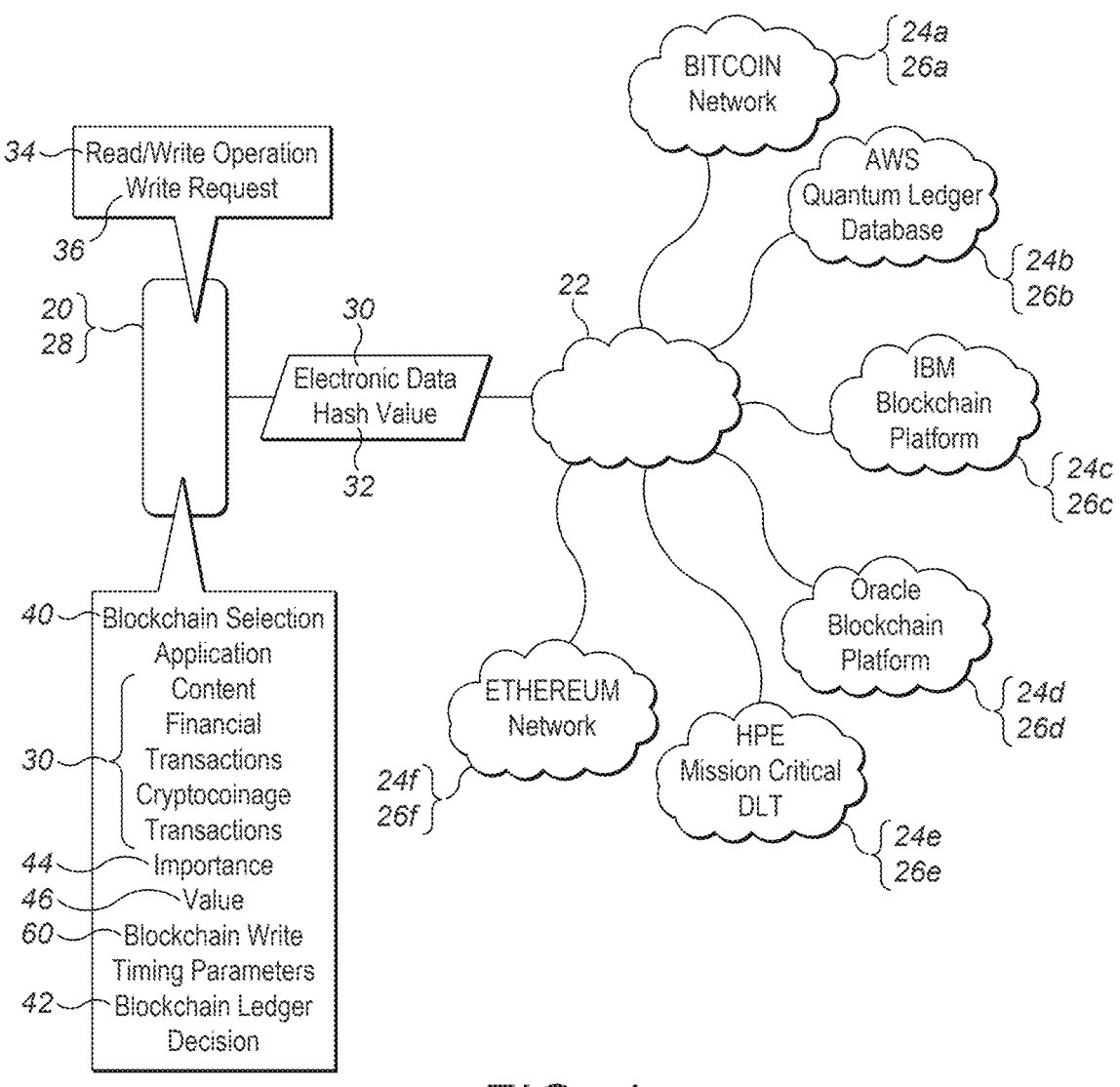

FIG. 4 further illustrates the electronic data 30. The user or administrator may configure the smartphone 28 and/or the blockchain selection application 40 to write any type of the electronic data 30 to any of the blockchain network(s) 24 and/or the blockchain service provider(s) 26. Digital pictures, movies, music, messages, files, and any other electronic data 30 may be written, recorded, and/or archived. The importance 44 and/or the value 46 of the electronic data 30 may thus affect or influence the blockchain ledger decision 42. The electronic data 30, for example, may represent or describe financial transactions (such as account deposits, debits and withdrawals). The electronic data 30 may also represent or describe cryptocoinage wallet transactions (such as BITCOIN® and ETHEREUM®). As the reader may understand, these financial transactions may be very important and valuable, perhaps justifying urgent write/record/request backup operations according to a frequent blockchain write timing parameter 60. Text, email, social postings, and other electronic messages may also be important and require frequent write/record/request backup operations (illustrated as reference numerals 34 and 36), according to their corresponding blockchain write timing parameter 60. Digital family photos and movies, while precious, important, and valuable, may only require infrequent archival write/record/request operations. The user or administrator may thus associate the electronic data 30 to its corresponding importance 44 (e.g., high/medium/low or other ranking), the value 46 (e.g., dollar value or other ranking), and/or blockchain write timing parameter 60 (e.g., seconds, minutes, hours, days). The smartphone 28 generates the blockchain ledger decision 42 by retrieving and weighing the importance 44, the value 46, and blockchain write timing parameter 60 associated with the electronic data 30 to be written to the blockchain network(s) 24 and/or the blockchain service provider(s) 26.

The importance 44 and value 46 of the electronic data 30 may thus be service or transfer triggers. The blockchain selection application 40 may be programmed or configured to compare the importance 44 and value 46 to one or more threshold values. If the importance 44 and value 46 are less than, or do not at least equal or satisfy the threshold values, then perhaps redundant data backup transfers are not required and/or not implemented. The blockchain selection application 40 may thus only write the electronic data 30 to a first blockchain network (such as the BITCOIN® blockchain 24a and 26a). However, if the importance 44 and value 46 are at least equal to, greater than, or otherwise satisfy the threshold values, then the importance 44 and value 46 may trigger blockchain data backup transfers. The blockchain selection application 40 may thus collect and compare the importance 44 or the value 46 of the electronic data 30, the blockchain network parameters 48, and the preference(s) 50, perhaps according to the logical rules 52 and policies 54. The blockchain selection application 40 generates the blockchain ledger decision 42 and redundantly writes the electronic data 30 to a second blockchain network (such as Amazon's Quantum Ledger Database 24b/26b).

Figure 5:
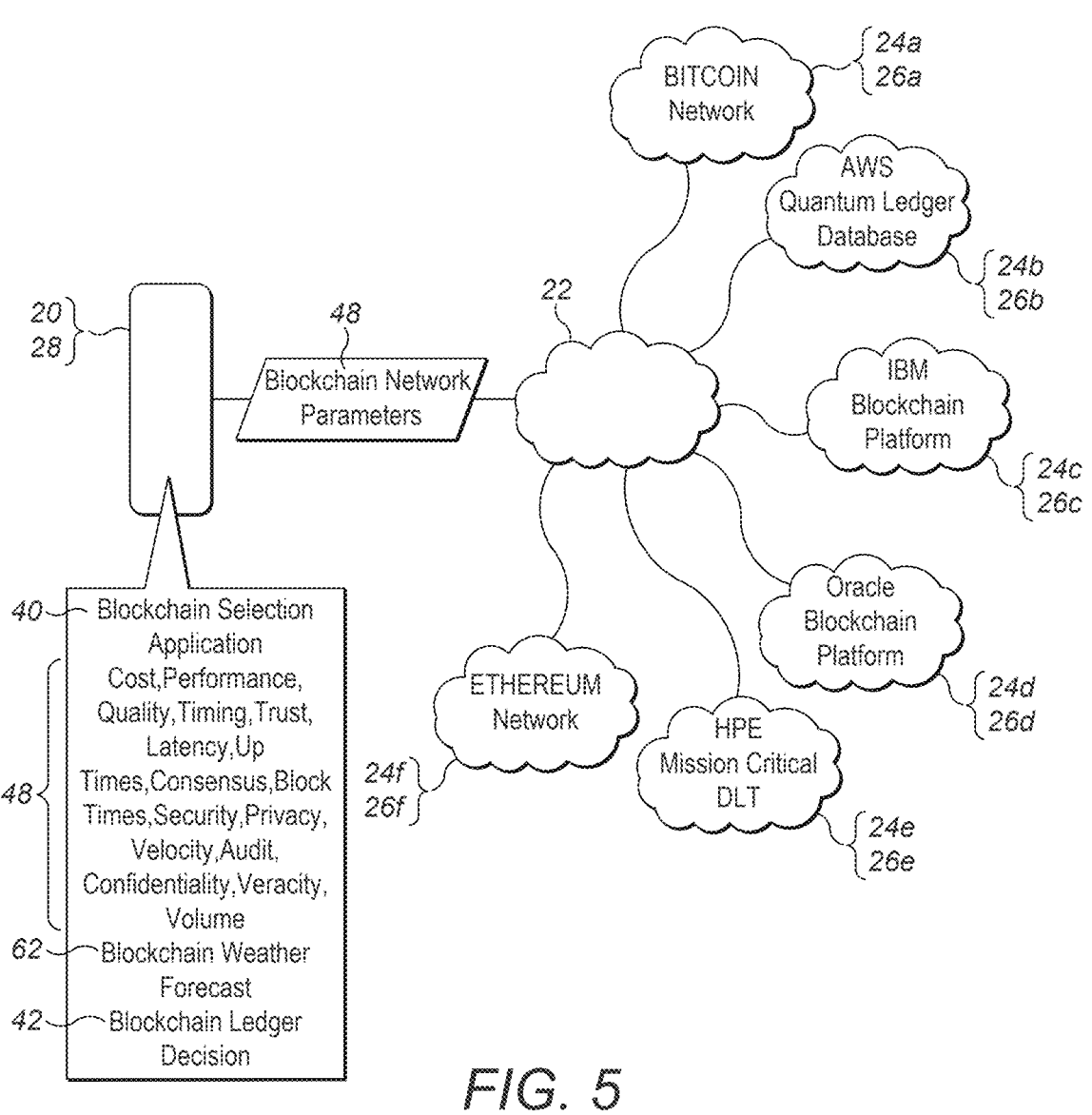

FIG. 5 illustrates the blockchain network parameters 48. The blockchain network parameters 48 represent any cost(s), performance, timing, or quality metrics reported by, or associated with, any of the multiple blockchain network(s) 24 and/or the multiple blockchain service provider(s) 26. As the reader may understand, the blockchain network(s) 24 and the blockchain service provider(s) 26 likely require some kind of fee or payment in exchange for writing the electronic data 30. The blockchain network(s) 24 and the blockchain service provider(s) 26 may thus have different and/or varying costs associated with their respective services, perhaps depending on trust, network latency, up or availability or down times, blockchain consensus schemes, and/or block times. The blockchain network(s) 24 and the blockchain service provider(s) 26 may also have different and/or varying security metrics, privacy metrics, velocity metrics, review/audit metrics, confidentiality metrics, data veracity metrics, and transactional volume metrics. Simply put, the blockchain network parameters 48 represent a blockchain "weather" forecast 62 that represents cost(s), performance, timing, or quality metrics reported by, or associated with, each blockchain network 24 and/or each blockchain service provider 26. As the computer 20 (again illustrated as the smartphone 28) and/or the blockchain selection application 40 compare the multiple blockchain networks 24 and/or the multiple blockchain service providers 26, one or more may have lower costs, greater performance, reduced timing, or higher quality metrics.

Figure 6:
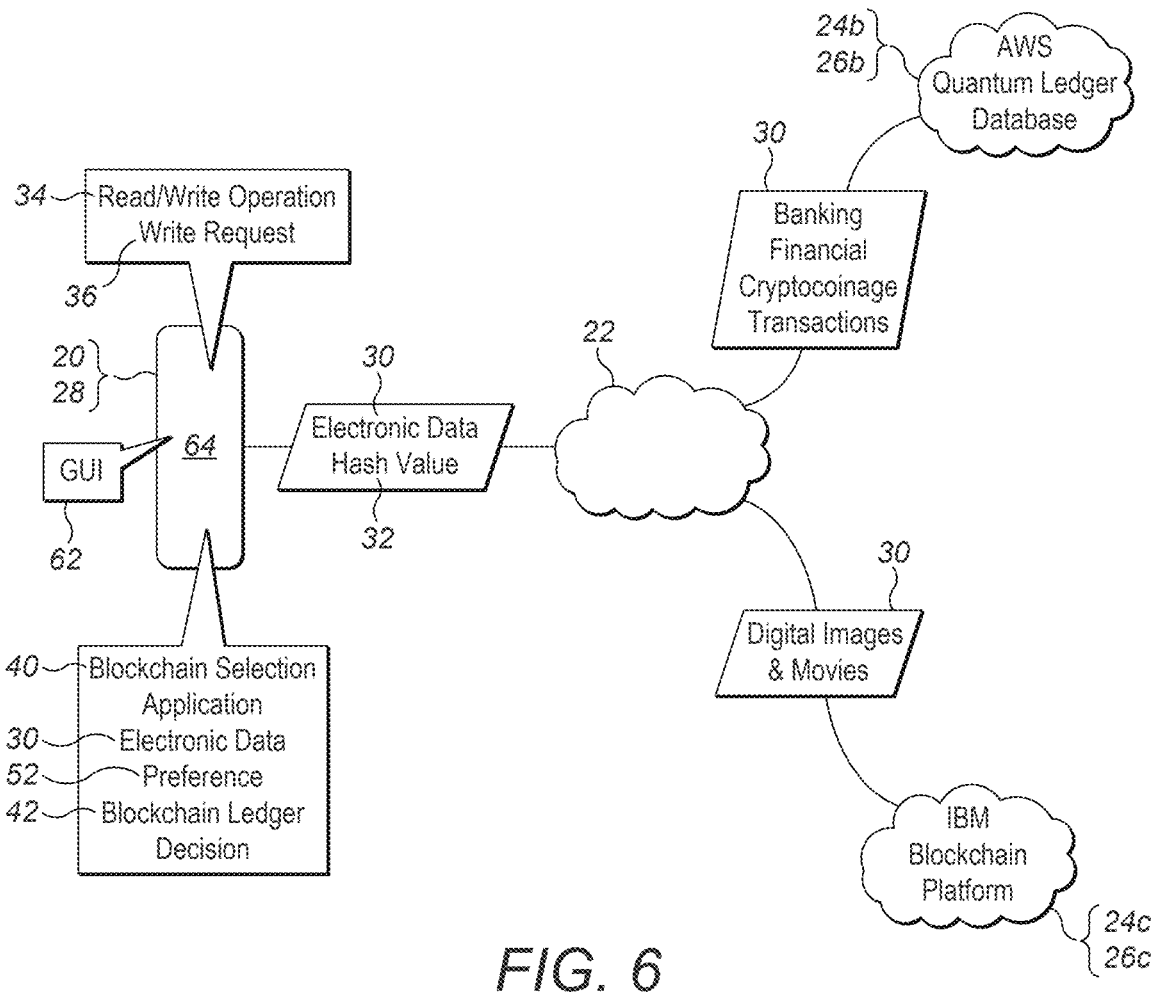

FIG. 6 illustrates the preference 50. Exemplary embodiments may perform simultaneous and real-time write/record/request operations to the multiple blockchain networks 24 and/or the multiple blockchain service providers 26. However, the user or administrator may configure or define the write/record/request operations according to one or more preferences 50 associated with the electronic data 30. That is, some electronic data 30 may only be written to a particular blockchain 24 or service provider 26, while a different electronic data 30 is reserved for a different blockchain 224 or service provider 26. As a simple example, suppose that the user prefers that her banking, financial, and cryptocoinage records and transactions be routed to, and written to, Amazon's Quantum Ledger Database (illustrated as reference numerals 24b and 26b). However, the user may also prefer that her personal digital images and movies be sent and written to IBM's Blockchain Platform (illustrated as reference numerals 24c and 26c). While the preference 50 may have any form or code, most readers are thought familiar with GUI selections and logical rules. As the computer 20 (such as the smartphone 28) executes the blockchain selection application 40, the blockchain selection application 40 may cause or instruct the smartphone 28 to generate a graphical user interface (or "GUI") 62 on a capacitive or other display device 64. The graphical user interface 62 may present various graphical controls and configuration options for defining her blockchain preferences 50 for blockchain write/record/requests 34 and 36. The user may thus make capacitive, tactile, or inputs and/or selections that specify the electronic data 30 and the destination blockchain 24 or service provider 26. When the smartphone 28 reads or inspects the electronic data 30, the blockchain selection application 40 may cause or instruct the computer 20 to honor her preference 50 and to write, copy, or archive all her banking and other financial transactions to Amazon's Quantum Ledger Database. Her personal digital images and movies, however, will be written to IBM's Blockchain Platform.

Figure 7:
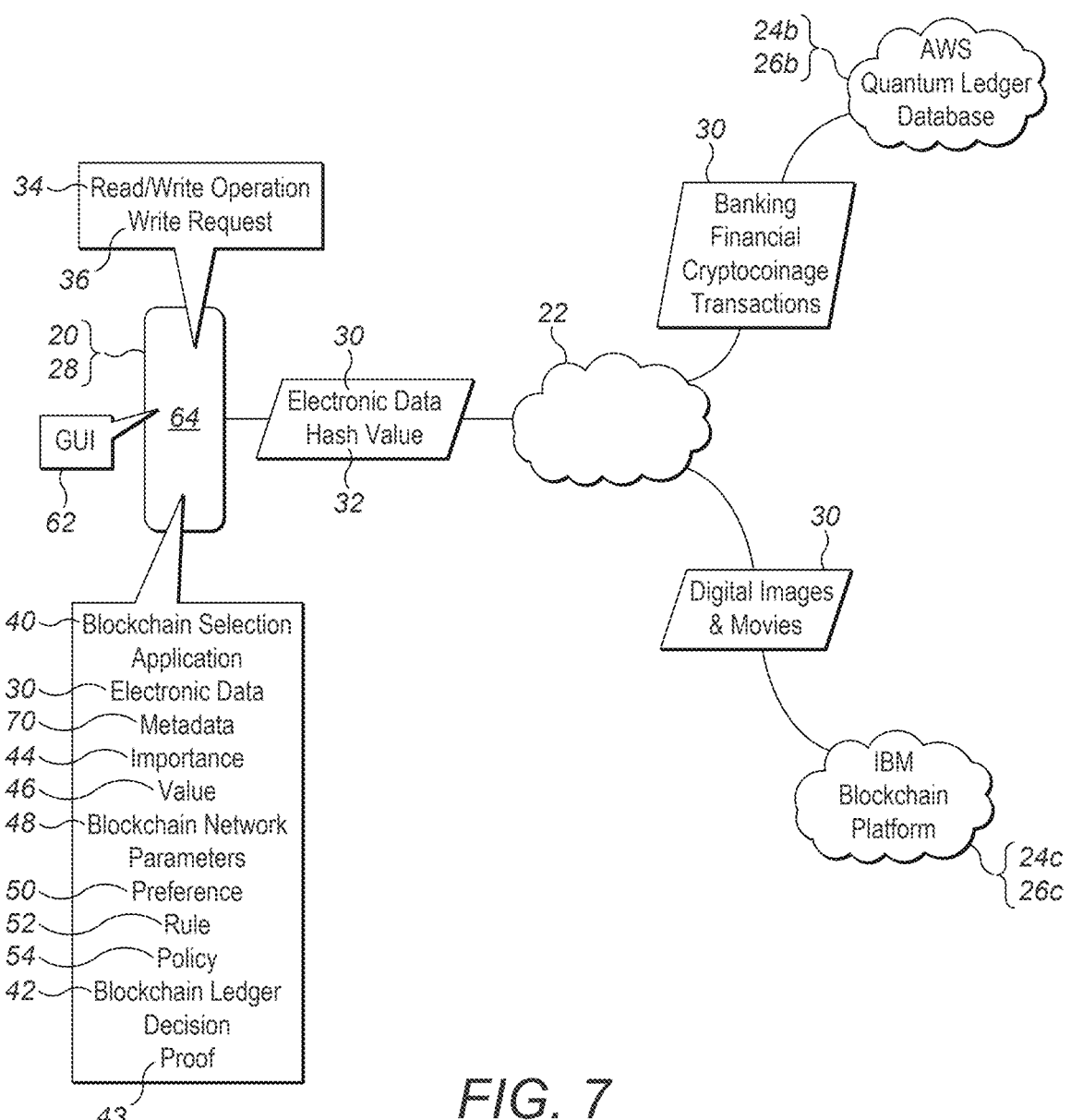

FIG. 7 illustrates metadata 70. The blockchain selection application 40 may generate the blockchain ledger decision 42 using any metadata 70 associated with the importance 44 or the value 46 of the electronic data 30, the blockchain network parameters 48, the preference(s) 50, the logical rules 52, and/or the policies 54. When the smartphone 28 reads or inspects the electronic data 30, the blockchain selection application 40 may cause or instruct the computer 20 to read any metadata 70 defined by, accompanying, or associated with the electronic data 30. There are many different types of the metadata 70, which are too numerous to list. This disclosure will thus mention the metadata 70 thought familiar to most readers. For example, when the smartphone 28 or a digital camera captures a digital photo image or movie, that electronic data 30 may be tagged, appended, or associated with the metadata 70 representing or describing a source identifier (such as the smartphone 28 or camera), a date/time stamp, a filename, a title, a file extension, and/or a GPS geographical location. The user may thus configure the blockchain selection application 40 to define the blockchain preference 50 in terms of these types of the metadata 70 and/or an Internet protocol address or URL associated with IBM's Blockchain Platform 24c and 26c. Whenever the smartphone 28 reads any metadata 70 that satisfies the predefined preference 50 for IBM's Blockchain Platform, the blockchain selection application 40 generates the blockchain ledger decision 42 that honors the preference 50, unless other factors weigh against or override the preference 50. Similarly, the user's banking and financial records/transactions may also be described using the metadata 70 (such as bank's Internet protocol address, URL, or other unique identifier), account/wallet/routing information, transaction identifier, or any other descriptive information. The user may thus define another preference 50 for her banking/financial electronic data 30, its associated metadata 70, and Amazon's Quantum Ledger Database. When the computer 20 reads or inspects the electronic data 30, the blockchain selection application 40 may also instruct the computer 20 to read the metadata 70 and to generate the blockchain ledger decision 42, perhaps according to the preference 50.

The metadata 70, however, may describe any factor. The importance 44 of the electronic data 30, for example, may be described by the metadata 70. The user or administrator may define the importance 44 of the electronic data 30 (perhaps via the GUI 62) using the metadata 70, such as entering an alphanumeric description, ranking, formatting, file extension, vendor, source, IP address, URL, or other parameter. The user or administrator may also define or configure the value 46, the blockchain network parameters 48, the logical rules 52, and/or the policies 54 using any form or type of the metadata 70. The smartphone 28 may retrieve, read, and compare any of the metadata 70 associated with the importance 44 and the value 46 of the electronic data 30, the blockchain network parameters 48, the preference(s) 50, the logical rules 52, and the policies 54. The smartphone 28 may generate the blockchain ledger decision 42 using the metadata 70.

Exemplary embodiments may also write the decisional details. When the blockchain selection application 40 generates the blockchain ledger decision 42, the blockchain selection application 40 may also instruct the computer 20 (such as the user's smartphone 28) to immutably record why, when, and where the electronic data 30 was archived to the multiple blockchain networks 24 or service provides 26. The blockchain selection application 40, for example, may instruct the smartphone 28 to write the importance 44 and/or the value 46 of the electronic data 30, the blockchain network parameters 48, the preference(s) 50, the logical rules 52, and/or the policies 54 that affected, influenced, or caused the blockchain ledger decision 42. In simple words, the blockchain selection application 40 documents the blockchain ledger decision 42 for audit and reconstruction purposes. The blockchain selection application 40 may also generate the cryptographic proof 43 of the blockchain ledger decision 42 (perhaps by hashing any of the importance 44 and/or the value 46 of the electronic data 30, the blockchain network parameters 48, the preference(s) 50, the logical rules 52, and/or the policies 54).

Exemplary embodiments thus improve computer functioning. As the reader likely understands, our devices sometimes fail (processor, memory, etc.). Software may be compromised or become corrupt. Moreover, every day our smartphones and other computers are exposed to fishing emails and text messages with links to malware and viruses. Conventional data backup solutions perform periodic data transfers to USB drives and/or to cloud services. Exemplary embodiments, instead, immutably store our electronic data 30 to the multiple blockchains 24. Each blockchain 24/26 may have hundreds or thousands of computing nodes, thus dispersing and transferring our electronic data 30 to hundreds or thousands of backup locations. Moreover, exemplary embodiments automatically choose the blockchain networks 24, thus allowing our smartphones and other computers to dynamically and intelligently backup our data based on the importance 44 and/or the value 46 of the electronic data 30, the blockchain network parameters 48, the preference(s) 50, the logical rules 52, and/or the policies 54. Even though our data may be dispersed to the different blockchain networks 24, exemplary embodiments also automatically track those data transfers/backups/copies for reassembly, reconstruction, and auditing purposes.

Exemplary embodiments may further improve computer functioning. Because our electronic data 30 may be written to one or multiple blockchains 24, hardware processing operations may be vastly reduced. That is, when the electronic data 30 must be redundantly stored, the smartphone 28 needs only to send or transfer the electronic data 30 to the remote blockchain networks 24. The smartphone's internal hardware processor and memory, for example, need not be burdened with read/write operations to a local or remote memory device. Instead, the smartphone's internal hardware processor and memory may simply offload the electronic data 30 to an intelligent network interface. The intelligent network interface thus uses its own, dedicated hardware processor and memory to send the electronic data 30 into the communications network 22. The smartphone's internal hardware processor and memory are relieved of time- and power-consuming backup operations.

Figure 8:
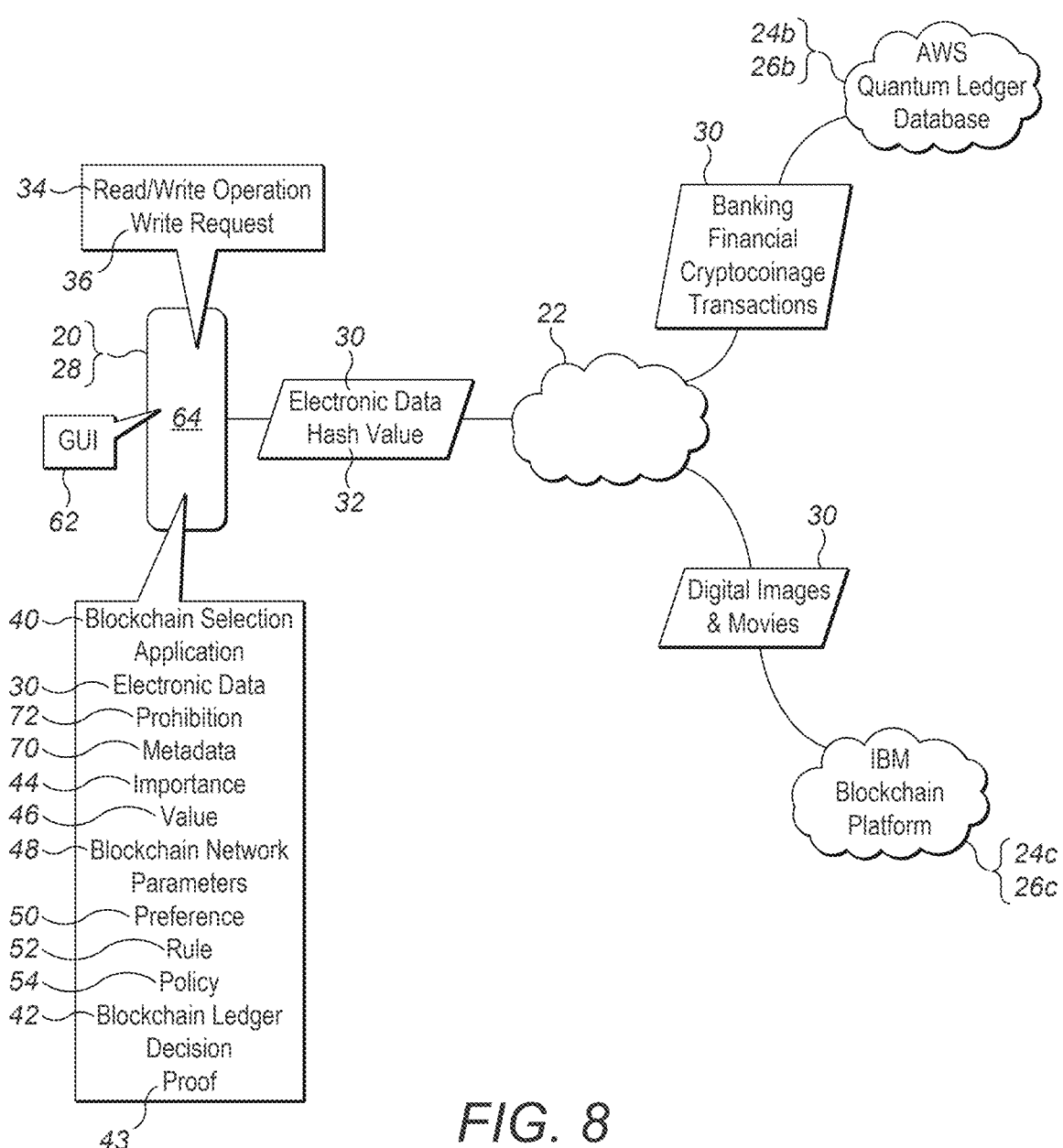

FIG. 8 illustrates a prohibition 72. The user or administrator may define or specify impermissible blockchain networks 24 and/or service providers 26. There may be some blockchains, and/or some companies, that the user declines to use, for whatever her reasons. The prohibition 72 may thus be defined or configured as one of the preferences 50, one of the logical rules 52, and/or one of the policies 54. The prohibition 72 may proscribe or prevent write/record/request operations 34 and 36 to any particular blockchain network 24 or any particular service provider 26. The prohibition 72 may also be defined using any metadata 70 that corresponds to the associated with the importance 44 and the value 46 of the electronic data 30, the blockchain network parameters 48, the preference(s) 50, the logical rules 52, and the policies 54. When the smartphone 28 reads or inspects the electronic data 30, the blockchain selection application 40 may also instruct the smartphone 28 to generate the blockchain ledger decision 42, perhaps according to the prohibition 72. The blockchain selection application 40 may also generate the cryptographic proof 43 of the blockchain ledger decision 42.

Figure 9:
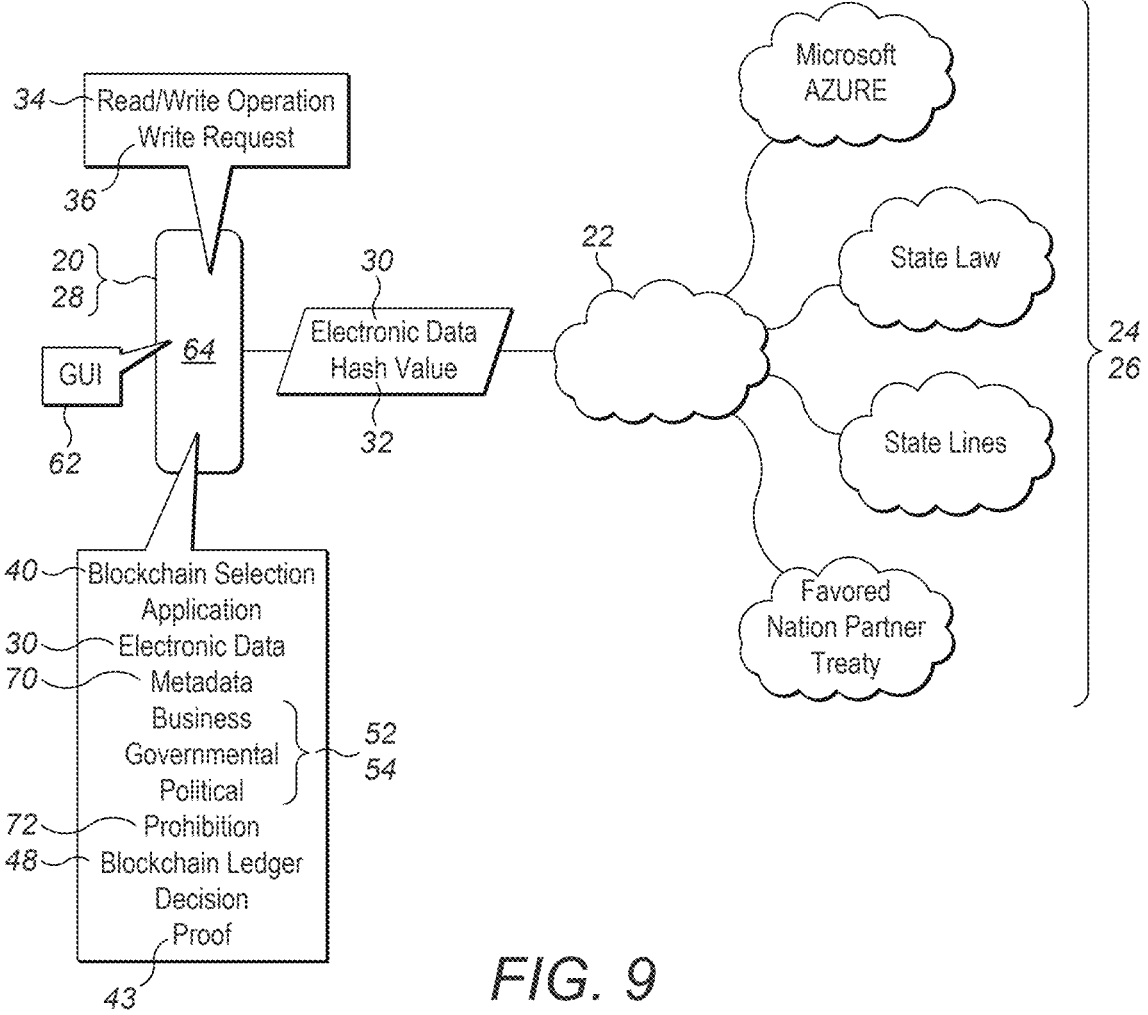

FIG. 9 further illustrates the logical rules 52 and policies 54. Recall that the blockchain selection application 40 instructs the computer 20 (again illustrated as the smartphone 28) to generate the blockchain ledger decision 42, perhaps according to the rules 52 and policies 54. Some of the rules 52 and policies 54 may be defined or logically expressed (perhaps using the GUI 62) to achieve business, governmental, and/or political objectives. For example, the blockchain selection application 40 may be constrained to only use a particular blockchain network 24 offered by, or associated with, a particular company or industry. As a very simple example, Microsoft's customers and employees may be required to use Microsoft's AZURE blockchain products and services 24 and 26. The rules 52 and policies 54 may thus be defined or configured (perhaps in terms of the metadata 70) that restrict the blockchain ledger decision 42 to only write to blockchain networks 24 offered by MICROSOFT® and/or its affiliates. Conversely, the rules 52 and policies 54 may be defined or configured to prohibit using a blockchain 24 or service provider 26 affiliated with a particular company, industry, or competitor (such as the prohibition 72).

Other rules 52 and policies 54 may express state, country, or other geographical/geopolitical regions or affiliations. As a familiar example, New York's banking laws may require that all banking or other financial transactions be wholly conducted or conveyed intrastate (perhaps to avoid interstate commerce). The rules 52 and policies 54 may thus be defined or configured (perhaps in terms of the metadata 70) that restrict the blockchain ledger decision 42 to only blockchain networks 24 and/or service providers 26 operating under New York's jurisdictional banking laws or even within the state's boundaries. As another example, the rules 52 and policies 54 may prohibit writing to, or using, blockchain networks 24 and/or service providers 26 affiliated with unlicensed or rogue entities. The rules 52 and policies 54 may be defined or configured to write to blockchain networks 24 and/or service providers 26 affiliated with favored nations and/or trading partners. Conversely, the rules 52 and policies 54 may also prohibit writing to, or using, blockchain networks 24 and/or service providers 26 affiliated with disfavored or prohibited governmental regimes. The rules 52 and policies 54 may thus be expressed to implement any business, governmental, and/or political objective. The blockchain selection application 40 may also generate the cryptographic proof 43 of the blockchain ledger decision 42, thus documenting the rules 52 and policies 54 that affected or impacted the blockchain ledger decision 42.

Figure 10:
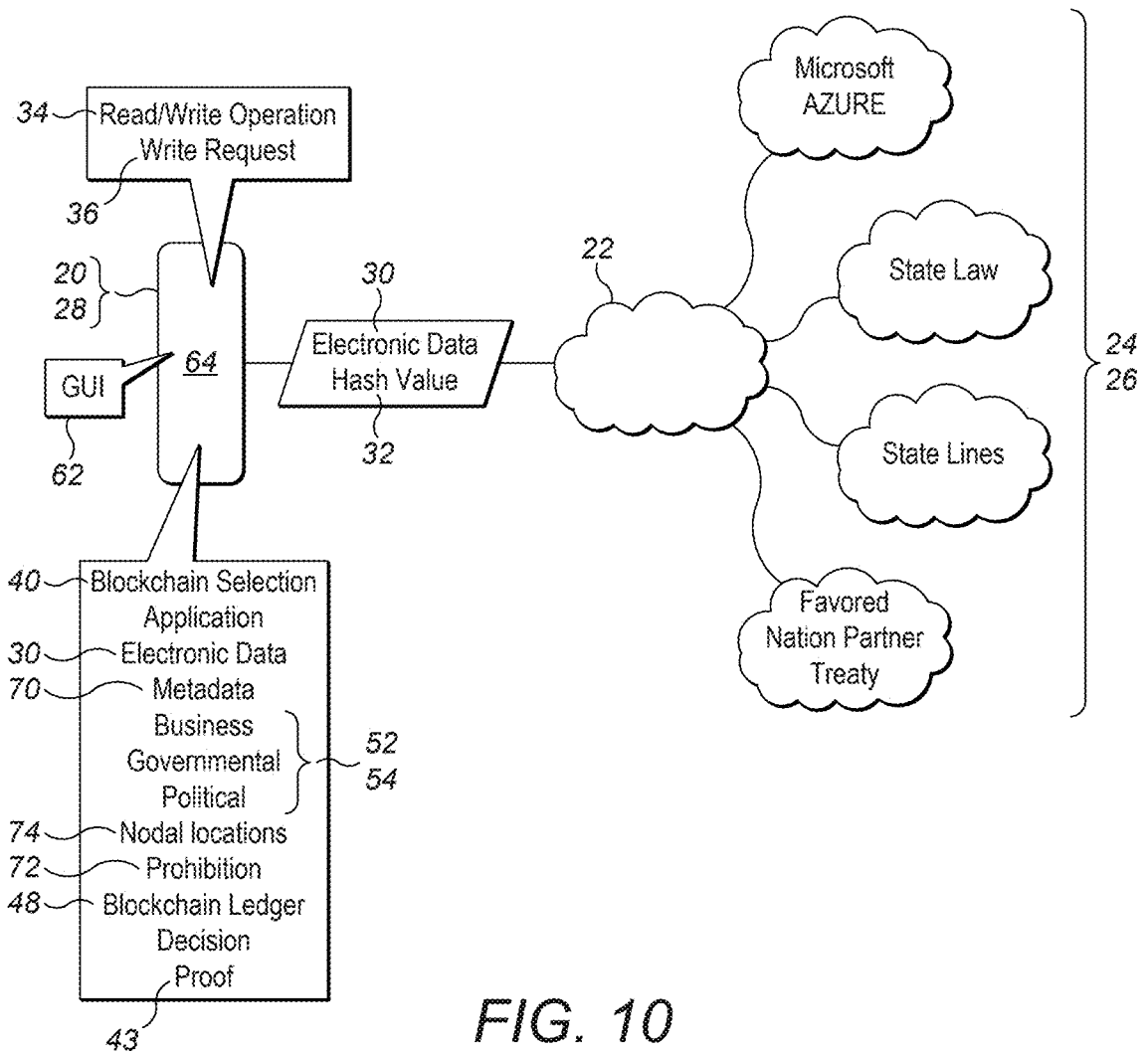

FIG. 10 illustrates nodal concerns. Here the rules 52 and policies 54 may define permissible, and/or impermissible, blockchain nodal/miner locations or affiliations. As the reader may understand, each blockchain network 24 has many computing peer nodes (perhaps even so-called "miners") that process blocks of data. The computing infrastructure of each blockchain network 24 is well understood and need not be explained in detail. In general, though, the computing peer nodes affiliated with each blockchain network 24 and/or service provider 26 may be geographically dispersed in different cities, different states, and even different countries. Because the peer nodes are geographically dispersed, the rules 52 and policies 54 (e.g., business, governmental, and/or political objectives) may again influence the selection of which blockchain network 24 and/or service provider 26 is appropriate for the particular image/movie, file, transaction, or other electronic data 30 (e.g., the blockchain ledger decision 42).

Nodal location may affect the blockchain ledger decision 42. Because the peer nodes are geographically dispersed, the rules 52 and policies 54 may restrict blockchain endpoints (such as processing or mining operations) to a particular nodal geographic location 74. Again, New York's laws may require that all the blockchain nodes operating in a particular blockchain network 24 be geographically located within New York's state lines. The rules 52 and policies 54 may thus be defined or configured (perhaps in terms of the IP addresses or other metadata 70) that restrict the blockchain ledger decision 42 to strictly write to a blockchain network 24 and/or service provider 26 having all (or 100%) of its computing nodes (and their corresponding IP addresses) geographically located within New York's state lines. Other rules 52 and policies 54 may be less strict and permit only 95% of the blockchain computing nodes (and their corresponding IP addresses) be geographically located within New York's state lines. The user or administrator may additionally define (perhaps via the GUI 62) other rules 52 and policies 54 that restrict, or permit, the nodal geographic location 74 (and their corresponding IP addresses) of any computing nodes to any particular country or region. Some blockchain nodes, for example, may be located within, or affiliated with, disfavored countries or regimes. The rules 52 and policies 54 may thus be logically stated to avoid or prohibit politically exposed blockchains, service providers, and/or computing nodes. The rules 52 and policies 54 may thus be logically stated to achieve or enforce nationality, country, and data sovereignty objectives or laws. The rules 52 and policies 54 may also very advantageously for compliance purposes.

Figure 11:
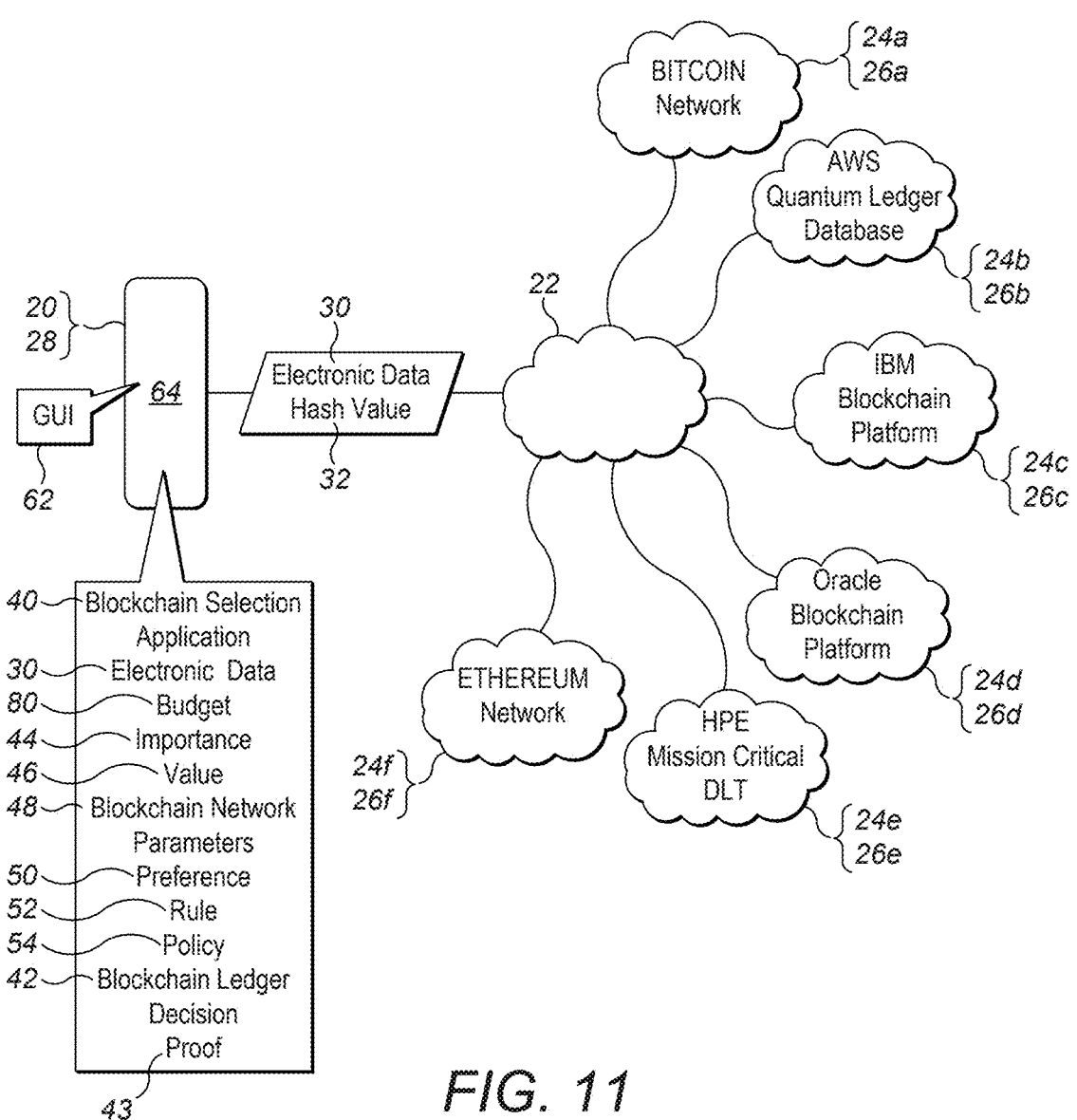

FIG. 11 illustrates budgetary considerations. As this disclosure above explained, the blockchain network(s) 24 and the blockchain service provider(s) 26 likely require some kind of fee or payment in exchange for blockchaining the electronic data 30. As the reader also understands, we all must live and operate within a budget 80. The user or administrator, in other words, may specify (perhaps via the GUI 62) what she is willing to spend or pay to write or archive her images/movies, files, transactions, or other electronic data 30. The blockchain selection application 40 may thus have configuration options or GUI fields for specifying the budget 80. While the budget 80 may be specified in any way, the reader is most likely familiar with daily, weekly, monthly, or other usage plans. Simply put, the user pays a recurring fee for some amount blockchain usage (such as memory byte space or transactional count). Because the blockchain network(s) 24 and the blockchain service provider(s) 26 likely have different and/or varying costs associated with their respective blockchain services, the blockchain selection application 40 may weigh, or balance, the budget 80 in relation to the importance 44 and/or the value 46 of the electronic data 30, the blockchain network parameters 48, the preference(s) 50, and the logical rules 52 and policies 54. When the budget 80 has sufficient funds or cryptocoinage, the blockchain selection application 40 may favor the best performing blockchain network 24 or service 26 for very important electronic data 30. Lesser valuable or important electronic data 30 may be steered for writing to less performing, less reliable, cheaper blockchains. The blockchain selection application 40 may also generate the cryptographic proof 43 of the blockchain ledger decision 42, thus documenting the budget 80 that affected or impacted the blockchain ledger decision 42.

Figure 12:
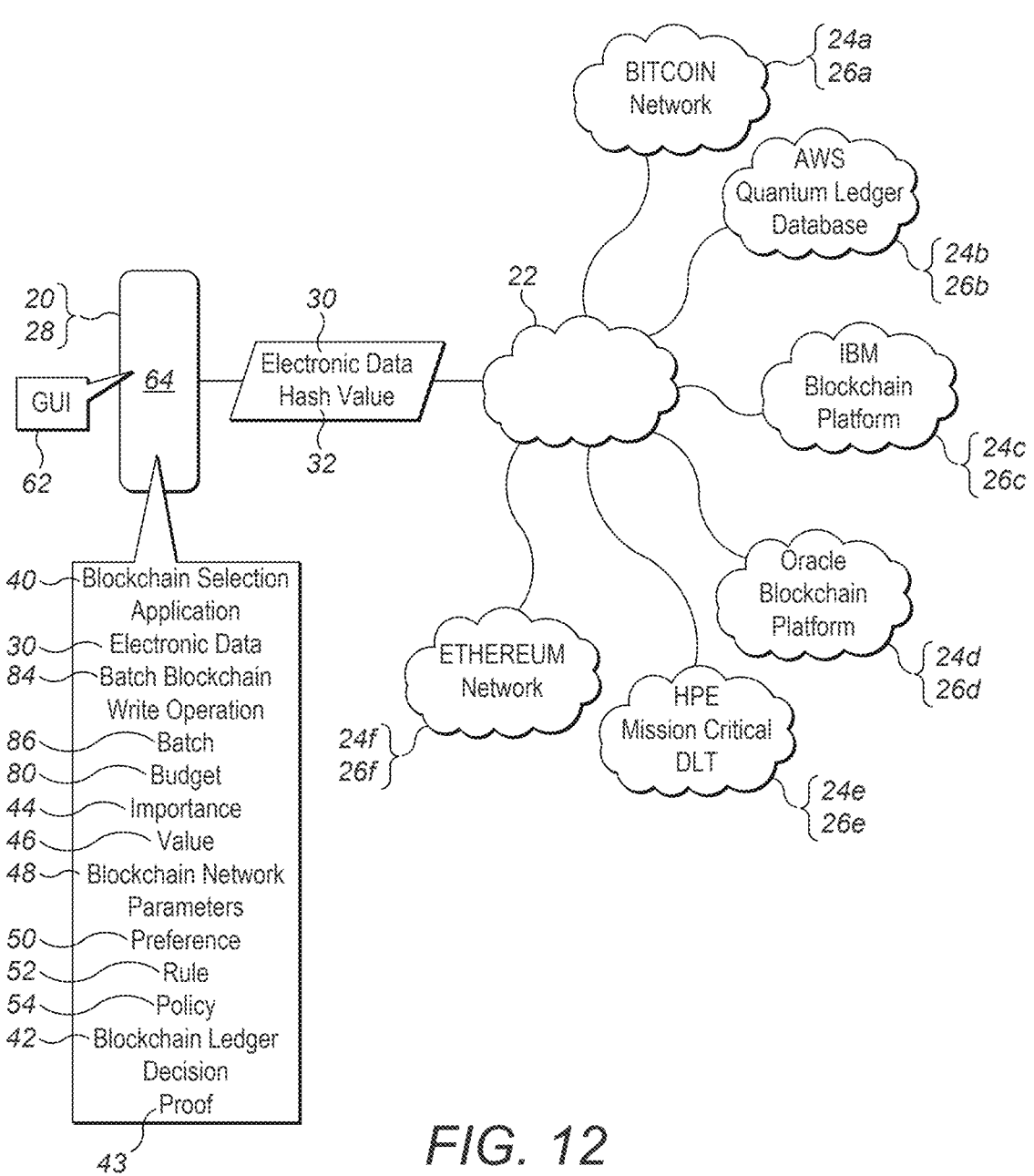

FIG. 12 illustrates a batch blockchain write operation 84. The blockchain selection application 40 may implement the batch blockchain write operation 84 to reduce expenses. Some electronic data 30, for example, is important and urgent, thus justifying immediate blockchain recordation to one or more of the networks 24 and/or service providers 26. Other electronic data 30, though, may wait and be delayed for cheaper, less expensive write/record/request opportunities and operations. The blockchain selection application 40 may thus order or command the smartphone 28 to request the batch blockchain write operation 84 for groups, or batches, of the electronic data 30. That is, one or more different types of the electronic data 30 may be merged or grouped together for blockchain recordation. The user or administrator may configure or define the batch blockchain write operation 84 according to the budget 80, the importance 44 and/or the value 46 of the electronic data 30, the blockchain network parameters 48, the preference(s) 50, and the logical rules 52 and policies 54. The blockchain selection application 40 may be configured to implement this batch blockchain write operation 84 during days, times, or other opportunities when rates/services are cheaper, faster, more secure, or other criteria. For example, as the user captures digital pictures and movies with her smartphone 28, the blockchain selection application 40 may instruct the smartphone 28 to merge, group, or batch 86 all the pictures and movies captured during the past week. The blockchain selection application 40 may then write the batch 86 to the selected blockchain network(s) 24 (perhaps using the read/write operation 34). The blockchain selection application 40 may additionally or alternatively send the batch 86 as the blockchain write request 36 to the URL or IP address associated with the selected blockchain network(s) 24. The blockchain selection application 40 may also generate the cryptographic proof 43 of the blockchain ledger decision 42, thus documenting the batch blockchain write operation 84 that affected or impacted the blockchain ledger decision 42.

An annual report provides a simple example. While the batch blockchain write operation 84 may be used with any electronic data 30, many readers are familiar with quarterly and annual reports. Many publicly-traded companies are required to issue annual reports. While these types of the electronic data 30 are certainly important, these reports may not justify urgent blockchain recordation. The annual report, for example, need not be immediately written (e.g., perhaps as the hash value 32) with high priority to any of the multiple blockchain networks 24 or multiple service providers 26. The annual report, instead, may be written as a batch recordation (with other transactions, documents, and other electronic data 30) during less-expensive times (e.g., end of day, Sunday, midnight).

Quarterly reports provide more examples. Many publicly-traded companies are also required to issue quarterly reports. The user or administrator may configure the blockchain selection application 40 (perhaps via the GUI 62) to write quarterly reports (perhaps described by the metadata 70 and/or represented by the hash values 34) to the ETHEREUM® blockchain. Because the quarterly reports may have greater importance 44 and value 46, the budget 80, rules 52, and/or policies 54 may justify the greater expense of writing to the ETHEREUM® blockchain (e.g., having a quick block time of about 12-15 seconds). The annual report, however, while certainly important and valuable, need not be so urgently written. The annual report, in other words, may be written to the less-expensive BITCOIN® blockchain (having a much longer block time of about 10 minutes). Moreover, the annual report (written to the BITCOIN® blockchain) may indicate that the annual report is merely the sum of four quarterly reports. As a further time and expense reduction, one hash value may represent the annual report itself, while a second hash value may represent all the data that the annual report relied on, or at least the four quarterly reports. The quarterly and annual reports (and their representative hash values) may thus have a hierarchical, Merkel tree-ish relationship, so the batch blockchain write operation 84 may considerably reduce costs. The importance 44 and value 46, the budget 80, rules 52, and/or policies 54 may thus be defined or configured to specify a write frequency (e.g., the blockchain write timing parameter 60 illustrated in FIG. 4) for each individual electronic data 30 and/or the batch blockchain write operation 84. After all, a velocity of the blockchain write operations recognizes that the quarterly and annual reports may require months of preparation and revisions, so their respective blockchain recordations cannot be that urgent.

Stock trades may have more urgency. Some people or investment funds buy and hold stocks, perhaps for months or even years. Again, then, these types of long-term purchases (and their descriptive electronic data 30) may not justify urgent blockchain recordations. Day traders, though, may frequently buy and sell, so short-term traders may need urgent blockchain recordations. Buy orders, after all, should be written to at least one of the multiple blockchain networks 24, and/or the multiple blockchain service providers 26, before a corresponding sell order is commenced or completed to avoid booking/auditing discrepancies. Again, the user or administrator may define or configure the rules 52 and policies 54 to specify the write frequency (e.g., perhaps the blockchain write timing parameter 60 illustrated in FIG. 4) for each individual trade and/or the batch blockchain write operation 84. Moreover, stock trades may be batched together for blockchain recordation, but the write frequency should reflect a chronological ordering of buy/sell orders. Frequent blockchain writes is usually safer, but frequent blockchain writes likely increase expenses. The importance 44 and value 46 of the electronic data 30, the blockchain network parameters 48, the ledger or blockchain preferences 50, the rules 52, the policies 54, and/or the budget 80 may thus determine whether the batch blockchain write operation 84 is appropriate at any given time or for any electronic data 30.

The batch blockchain write operation 84 may reduce costs. The importance 44 and value 46 of the electronic data 30, the blockchain network parameters 48, the ledger or blockchain preferences 50, the rules 52, and/or the policies 54 may thus determine how frequently the electronic data 30 is written to blockchains. Both the ETHEREUM® blockchain and the BITCOIN® blockchain offer the immutability of the electronic data 30. However, because the ETHEREUM® blockchain has much shorter block times, it's pricing structure may be more expensive. So, less important and/or less urgent electronic data 30 (such as the annual report), may be deferred for hours or days and written to the BITCOIN® blockchain to reduce expenses.

Figure 13:
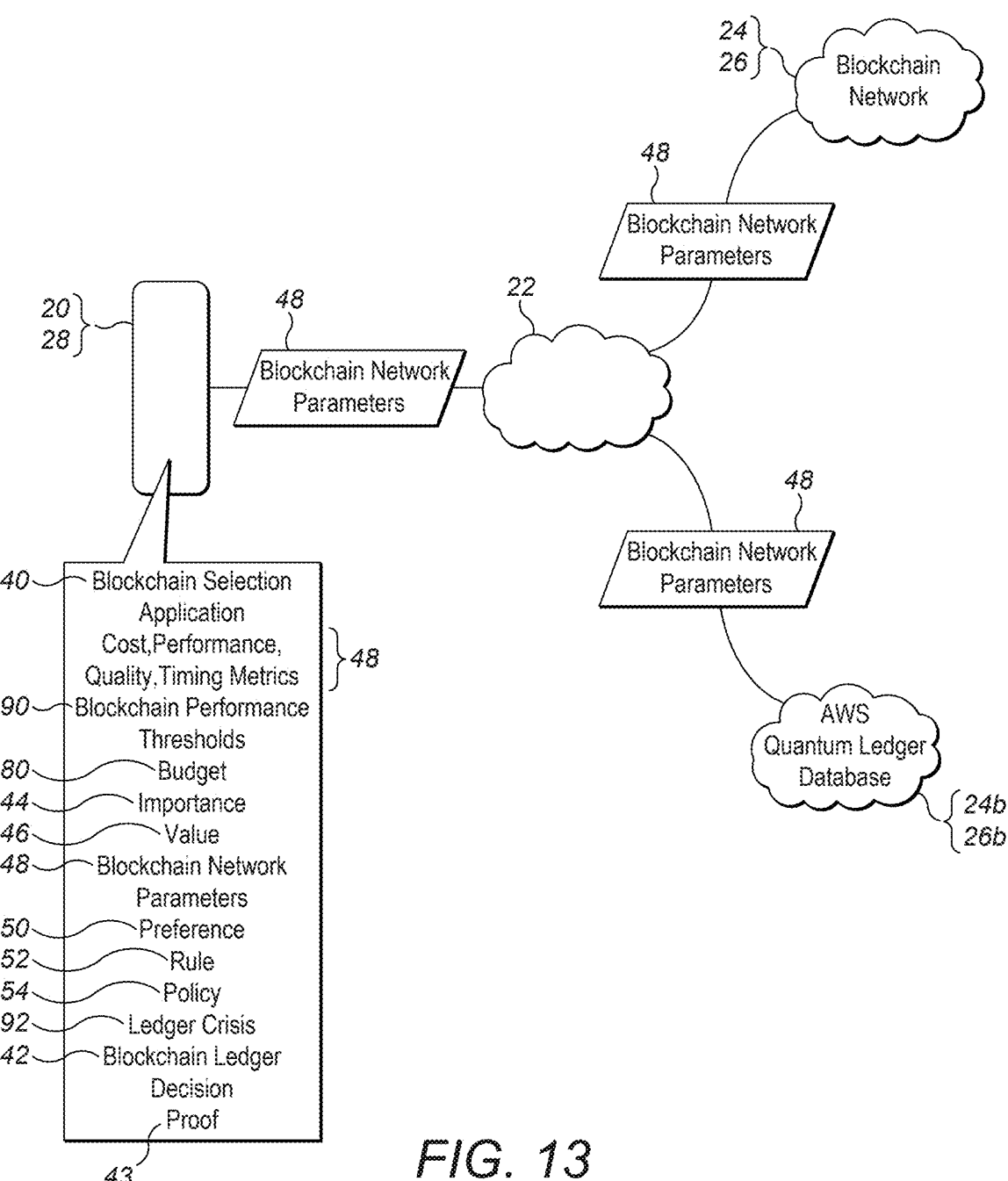

FIG. 13 illustrates measuring and predicting blockchain failures. As this disclosure above explained (especially with reference to FIG. 5), each blockchain network 24 and/or blockchain service provider 26 provides their respective blockchain network parameters 48 (e.g., cost, performance, timing, and quality metrics). For example, FIG. 13 illustrates Amazon's Quantum Ledger Database 24b and 26b publishing, broadcasting, reporting, or otherwise pushing its blockchain network parameters 48 to clients or subscribers (such as the smartphone 28). The smartphone 28, however, may additionally or alternatively send a query request or poll to any blockchain network 24 or service provider 26 (such as the ETHEREUM® blockchain 24f managed by the Ethereum Foundation 26f). The query requests any data or information representing the blockchain network parameters 48. A server or blockchain node, associated or affiliated with ETHEREUM®, may reply and send a query response specifying the blockchain network parameters 48. Whether a push or pull mechanism is used, when the smartphone 28 receives or acquires the blockchain network parameters 48, the blockchain selection application 40 may instruct the smartphone 28 to compare the blockchain network parameters 48 to one or more blockchain performance thresholds 90. The blockchain performance thresholds 90 specify data, information, values, and/or parameters representing a healthy blockchain network. The blockchain performance thresholds 90, for example, may specify minimum, maximum, or otherwise acceptable ranges or values for the blockchain network parameters 48. If the blockchain network parameters 48 at least equal or otherwise satisfy any or all of the blockchain performance thresholds 90, then the blockchain selection application 40 may infer that the corresponding blockchain network 24 or service provider 26 is healthy and performing as expected. The corresponding blockchain network 24 or service provider 26, in other words, is available and is selectable as a candidate for the blockchain ledger decision 42, considering the importance 44 and value 46 of the electronic data 30, the blockchain network parameters 48, the ledger or blockchain preferences 50, the rules 52, the policies 54, and/or the budget 80.

Failure may be predicted. As the blockchain selection application 40 compares the blockchain network parameters 48 to the blockchain performance thresholds 90, one or more of the blockchain network parameters 48 may be less than, exceed, lie outside a range, or otherwise fail any or all of the blockchain performance thresholds 90. When any overage, underage, or other discrepancy is determined, then the blockchain selection application 40 may infer or predict a ledger crisis 92. The corresponding blockchain network 24 and/or blockchain service provider 26 may be unhealthy and not performing as expected. The corresponding blockchain network 24 and/or blockchain service provider 26, in other words, may be flagged or designated as unavailable, unacceptable, offline, or otherwise not selectable, regardless of the importance 44 and value 46 of the electronic data 30, other blockchain network parameters 48, the ledger or blockchain preferences 50, the rules 52, the policies 54, and/or the budget 80. The blockchain selection application 40 may thus dynamically and pre-emptively hot-swap writes to a different blockchain network 24 or service provider 26 (such as Amazon's Quantum Ledger Database 24b and 26b) before an actual ledger failure occurs. The blockchain selection application 40 may also generate the cryptographic proof 43 of the blockchain ledger decision 42, thus documenting the ledger crisis 92 that affected or impacted the blockchain ledger decision 42.

Figure 14:
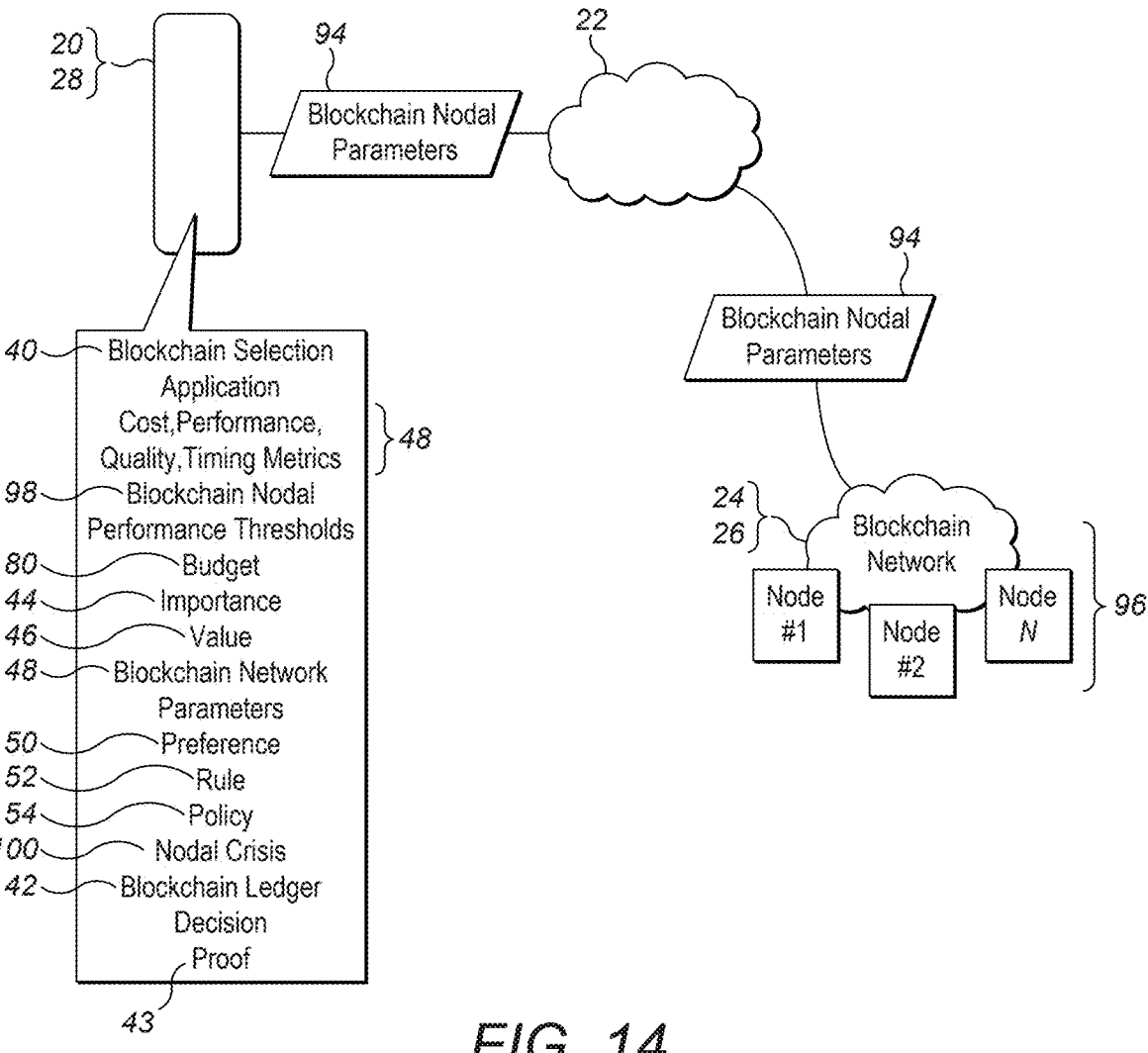

FIG. 14 illustrates predictive nodal failures. Here the blockchain selection application 40 may receive blockchain nodal parameters 94 reported by, or associated with, the computing nodes 96 operating within, or affiliated with, the corresponding blockchain network 24 or service provider 26. While FIG. 14 simply illustrates only three (3) blockchain nodes (illustrated as reference numerals 96a-N), in actual practice there may be hundreds, thousands, or more either partial and full "miner" blockchain nodes. The blockchain nodal parameters 94 may be similar to the blockchain network parameters 48 (with reference to FIG. 5), but the blockchain nodal parameters 94 may be individualized cost, performance, timing, and quality metrics that are specific to a single blockchain peer node 96 and/or to a grouping of the blockchain peer nodes 96. Again, each blockchain network 24 and/or blockchain service provider 26 may publish, broadcast, report, or otherwise push its respective blockchain nodal parameters 94 to clients or subscribers (such as the smartphone 28). The smartphone 28, however, may send a query or poll to each blockchain network 24, each blockchain service provider 26, and/or any blockchain peer node 96 and receive responses specifying the blockchain nodal parameters 94. Again, whether a push or pull mechanism is used, when the smartphone 28 receives or acquires the blockchain nodal parameters 94, the blockchain selection application 40 may instruct the smartphone 28 to compare the blockchain nodal parameters 94 to one or more blockchain nodal performance thresholds 98. The blockchain nodal performance thresholds 98 specify data, information, values, and/or parameters representing a healthy operation of a blockchain full- or partial-node 96. The blockchain nodal performance thresholds 98, for example, may specify minimum, maximum, or otherwise acceptable values for the blockchain nodal parameters 94. If the blockchain nodal parameters 94 at least equal or otherwise satisfy any or all of the blockchain nodal performance thresholds 98, then the blockchain selection application 40 may infer that the corresponding blockchain node 96 is healthy and performing as expected or desired. The corresponding blockchain node 96 may thus be approved to participate in the writing of the electronic data 30 to the corresponding blockchain network 24. The blockchain node 96, in other words, may receive, read, store, write, or otherwise process the electronic data 30 (again, perhaps considering the importance 44 and value 46 of the electronic data 30, the ledger or blockchain preferences 50, the rules 52, the policies 54, and/or the budget 80).

Nodal failure may be predicted. As the blockchain selection application 40 compares the blockchain nodal parameters 94 to the blockchain nodal performance thresholds 98, one or more of the blockchain nodal parameters 94 may be less than, exceed, lie outside a range, or otherwise fail any or all of the blockchain nodal performance thresholds 98. In response, the blockchain selection application 40 may infer or predict a blockchain nodal crisis 100. The blockchain node 96 is unhealthy and not performing as expected or desired. The blockchain node 96, in other words, may be flagged or designated as unavailable, unacceptable, offline, unapproved, or otherwise not selectable for processing the electronic data 30. The blockchain selection application 40 may deny or prohibit the blockchain network 24 from routing or using the blockchain node 96 determined to have the blockchain nodal crisis 100 when writing/storing the electronic data 30. The blockchain selection application 40 may additionally or alternatively flag or designate the entire blockchain network 24 as unavailable, unacceptable, offline, or otherwise not selectable, in response to the single blockchain nodal crisis 100. Again, the blockchain selection application 40 may thus dynamically and pre-emptively hot-swap nodes, or different blockchain networks 24 or service providers 26, in response to blockchain nodal crisis 100. The blockchain selection application 40 may also generate the cryptographic proof 43 of the blockchain ledger decision 42, thus documenting the blockchain nodal crisis 100 that affected or impacted the blockchain ledger decision 42.

Faults and failures may thus be managed. Any of the blockchain network parameters 48 may specify or reference ranges or tolerances of acceptable values. The blockchain selection application 40 may also call, retrieve, or query for the ranges or tolerances of acceptable values. blockchain selection application 40 inspects or compares the blockchain network parameters 48 (e.g., ledger performance, trust level of the ledger, consensus crisis, node hijack risk, uptime of a ledger, ledger speed, cost of a ledger, latency of a ledger, and/or the like), exemplary embodiments may determine whether the corresponding distributed ledger is at risk of failure (e.g., whether a reliability metric exceeds a threshold). The blockchain selection application 40 may initiate short term responses and/or long-term responses to a determination that the distributed ledger is at risk of failure. In some implementations, the blockchain selection application 40 may respond to a risk of failure temporarily by locally buffering (e.g., continuous local mastering) data 30 stored on the distributed ledger databases that are at risk of failing (or participating computing nodes of the distributed ledger databases), buffering the data 30 at another computing node, clone/whisper (i.e., a P2P communication protocol that allows (encrypted) messaging between nodes), re-prioritize/re-weight the ledger, and/or the like.

Exemplary embodiments further improve computer functioning. Because failures may be predicted, exemplary embodiments again substantially reduce data loss. Exemplary embodiments may exclude any blockchain network 24, any blockchain service provider 26, and/or any blockchain node 96 that is predicted to experience a storage/performance failure. Duplicate copies may thus be automatically and pre-emptively routed and written to an alternative network 24, blockchain service provider 26, and/or any blockchain node 96. Exemplary embodiments may further track and log why any exclusion was implemented and why the alternative storage blockchain or node was chosen. The computer 20 immutably records the exclusion and alternative transfer details to a blockchain ledger. The computer 20 may further generate the cryptographic proof 34 of the exclusion and alternative transfer. Exemplary embodiments thus provide a solution to a problem in the software arts of predictive storage failures, of data backups, and of data transfers.

Figure 15:
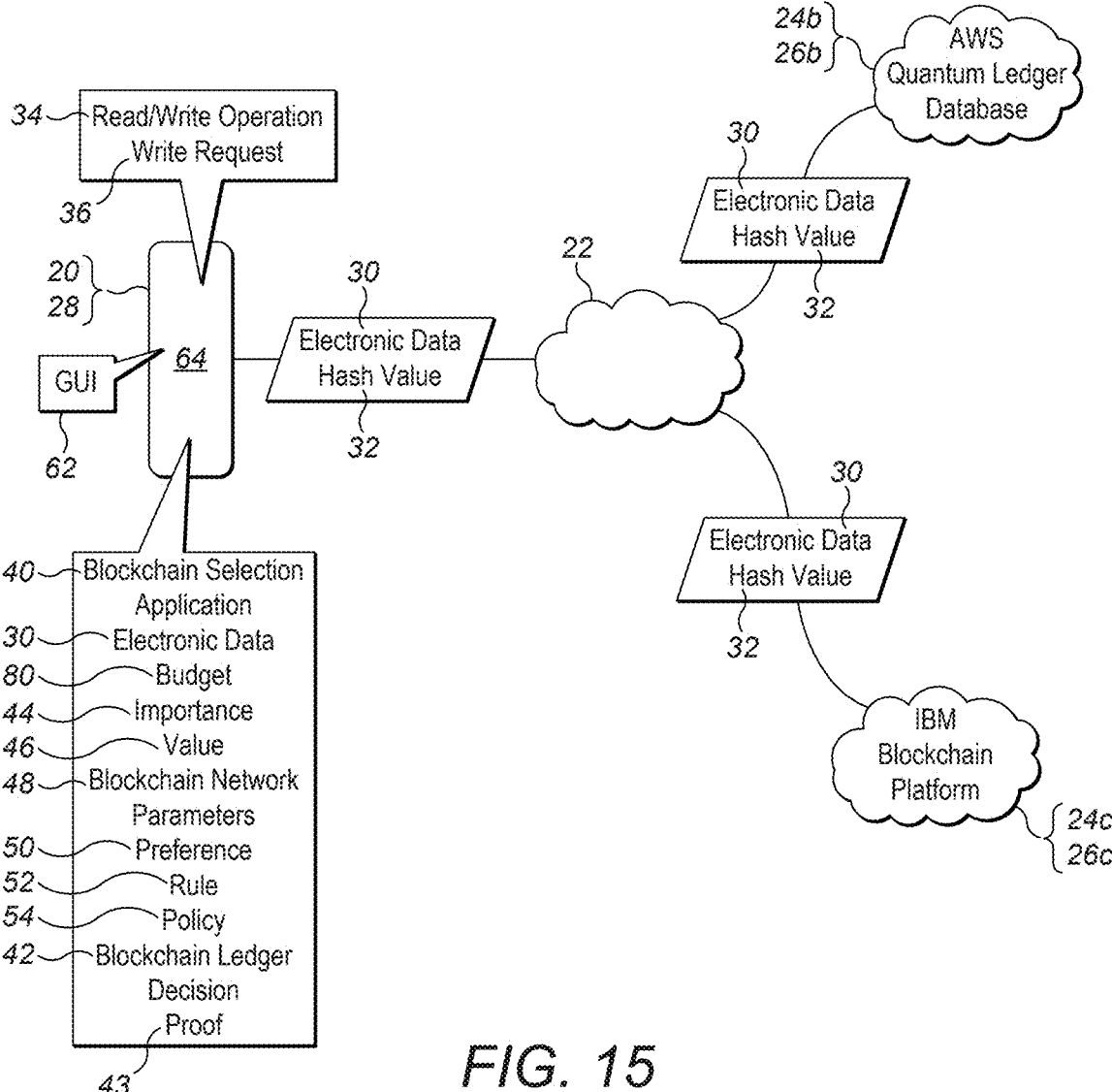

FIG. 15 illustrates stacked, multi-dimensional blockchains. Here the computer 20 (again illustrated as the smartphone 28 for simplicity) may store and write to redundant blockchains. The smartphone 28, for example, may request that the electronic data 30 (and/or its representative hash value(s) 32) be written to a first blockchain network (such as Amazon's Quantum Ledger Database 24*b* and 26*b*). The smartphone 28 may also selectively, and/or redundantly, rewrite any of the electronic data 30 to a different, second blockchain network (such as IBM's Blockchain Platform 24*c* and 26*c*). The blockchain selection application 40 may be configured to preserve and rewrite as many copies of the electronic data 30 (and/or its representative hash value(s) 32) to as many different blockchain networks 24 and/or service providers 26 as the user desires (perhaps based on the importance 44 and value 46 of the electronic data 30, the blockchain network parameters 48, the ledger or blockchain preferences 50, the rules 52, the policies 54, and/or the budget 80, as above explained). The smartphone 28 migrates the electronic data 30 to additional, or multidimensional, blockchains as data insurance. The user/administrator may thus configure the blockchain selection application 40 to request writes to multiple blockchain networks for redundant copies.

Exemplary embodiments may thus manage the blockchains. The blockchain selection application 40 may instruct the smartphone 28 to execute, or to request, simultaneous or near-simultaneous request/read/write operations (34 and 36) on multiple blockchains. The smartphone 28, for example, may initially write and store any electronic data 30 to a first blockchain network (such as Amazon's Quantum Ledger Database 24*b* and 26*b*). The blockchain selection application 40, however, may also manage redundant rewrites of the electronic data 30 to the second blockchain network (such as IBM's Blockchain Platform 24*c* and 26*c*). The blockchain selection application 40, in other words, may manage blockchain storage across the multiple blockchain networks 24 and 26, including managing, documenting, and writing why the redundant rewrites were required (e.g., the importance 44 and value 46 of the electronic data 30, the blockchain network parameters 48, the ledger or blockchain preferences 50, the rules 52, the policies 54, and/or the budget 80). The blockchain selection application 40 may also generate the cryptographic proof 43 of the blockchain ledger decision 42, thus documenting the importance 44 and value 46 of the electronic data 30, the blockchain network parameters 48, the ledger or blockchain preferences 50, the rules 52, the policies 54, and/or the budget 80.

Figure 16:
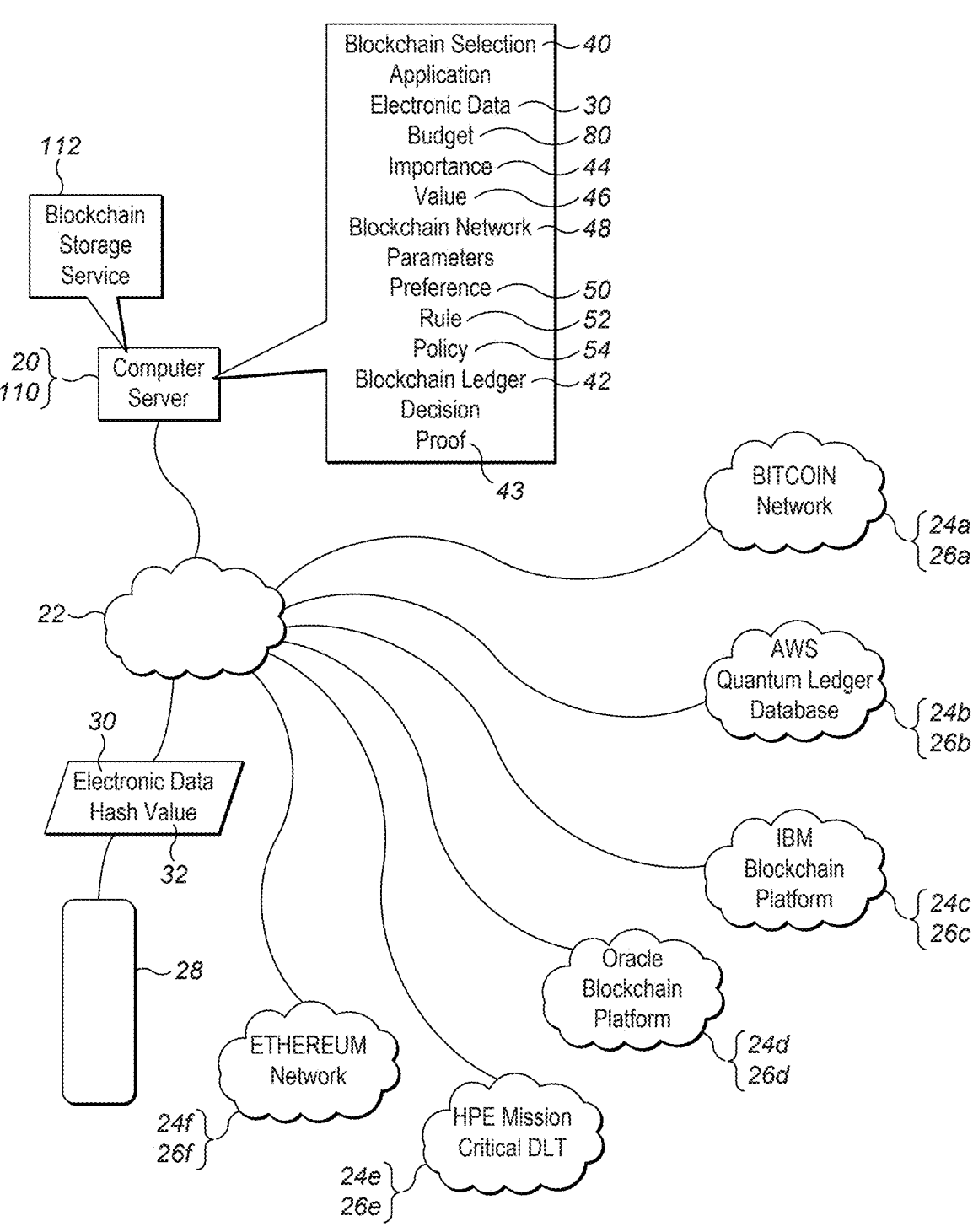

FIG. 16 illustrates a server or cloud-based service solution. When the smartphone 28 requires remote storage, the smartphone 28 may interface via the communications network 22 with a remote computer 20 (illustrated as a computer server 110). The smartphone 28 may send the electronic data 30 (and/or its representative hash value(s) 32) to the computer server 110, and the smartphone 28 may request that the computer server 110 determine which one or more of the blockchain networks 24 and/or the service providers 26 is/are best suited for archiving the electronic data 30. The computer server 110 stores and executes the blockchain selection application 40 and generates the blockchain ledger decision 42 (perhaps based on the importance 44 and value 46 of the electronic data 30, the ledger or blockchain preferences 50, the rules 52, the policies 54, and/or the budget 80, as this disclosure above explained). The computer server 110, in other words, performs a blockchain backup service 112 on behalf of clients (such as the smartphone 28). The user of the smartphone 28, or an administrator of the blockchain backup service 112, may configure the blockchain backup service 112 (e.g., blockchain selection application 40, the importance 44 and value 46 of the electronic data 30, the ledger or blockchain preferences 50, the rules 52, the policies 54, and/or the budget 80). The computer server 110 then provides the blockchain backup service 112, perhaps for a fee, subscription, cryptocoin, or other compensation scheme. Once the computer server 110 generates the blockchain ledger decision 42, the computer server 110 may then send or forward the electronic data 30 (and/or its representative hash value(s) 32) to the selected blockchain network(s) 224 and/or service provider(s) 26. The computer server 110 may additionally or alternatively command or instruct the client (such as the smartphone 28) to send the electronic data 30 (and/or its representative hash value(s) 32) to the selected blockchain network(s) 224 and/or service provider(s) 26. The blockchain backup service 112 may thus reduce the client's processor and memory storage burdens. The blockchain selection application 40 may also generate the cryptographic proof 43 of the blockchain ledger decision 42.

Figure 17:
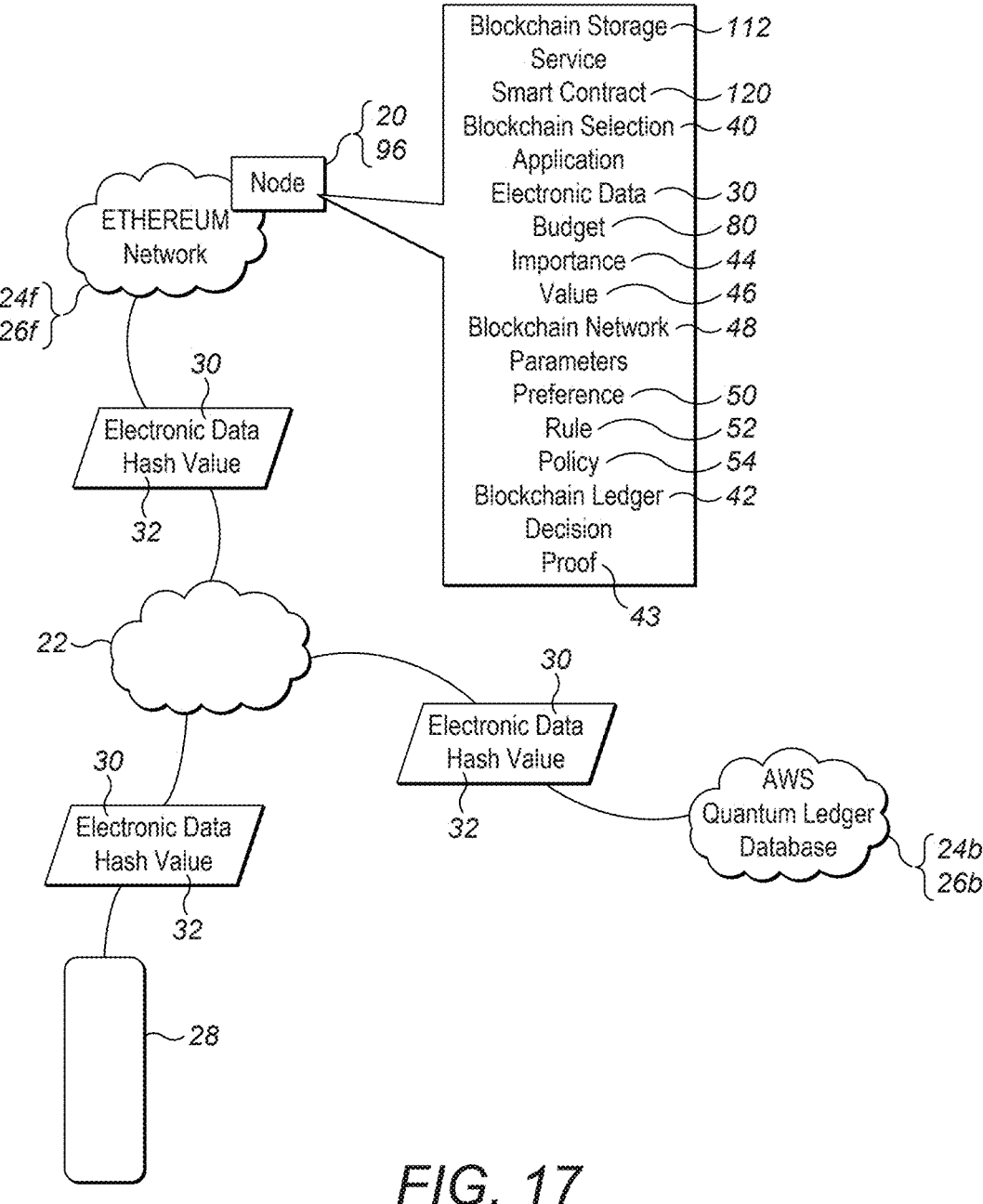

FIG. 17 illustrates a smart contract solution. Here any blockchain network 24 may manage redundant rewrites to another, and perhaps different, blockchain. Suppose, for example, that the smartphone 28 sends the electronic data 30 (and/or its representative hash value(s) 32) to a first blockchain network (such as Ethereum's blockchain network 24*f* and 26*f*). The smartphone 28 requests that Ethereum's blockchain network 24*f* and 26*f* write the electronic data 30 to the ETHEREUM® blockchain. The ETHEREUM® blockchain network 24*f* thus writes the electronic data 30 (and/or its representative hash value(s) 32) to the ETHEREUM® blockchain. Moreover, the ETHEREUM® blockchain network 24*f* may also redundantly rewrite the electronic data 30 to a second blockchain network 24 or service provider 26. While any blockchain or service may be selected, FIG. 17 illustrates Amazon's Quantum Ledger Database 24*b* and 26*b*. The ETHEREUM® blockchain network 24*f*, in other words, may perform the blockchain backup service 112 on behalf of clients (such as the smartphone 28). The ETHEREUM® blockchain network 24*f* selects Amazon's Quantum Ledger Database 24*b* and 26*b* for redundant storage and rewrites of the electronic data 30.

FIG. 17 thus illustrates nodal execution. While any computer/network component may generate the blockchain ledger decision 42, FIG. 17 illustrates the blockchain nodal computer 96. The blockchain nodal computer 96 executes software programming or code representing the blockchain selection application 40. Moreover, the software programming or code representing the blockchain selection application 40 may be implemented as a smart contract 120 that is appended to the ETHEREUM® blockchain and executed by the blockchain nodal computer 96. The blockchain nodal computer 96 may thus receive the electronic data 30 and generate the blockchain ledger decision 42, perhaps according to the importance 44 and value 46 of the electronic data 30, the blockchain network parameters 48, the ledger or blockchain preferences 50, the rules 52, the policies 54, and/or the budget 80. The user of the smartphone 28, or an administrator of the blockchain backup service 112, may configure the blockchain backup service 112 (e.g., blockchain selection application 40, the smart contact 120, the importance 44 and value 46 of the electronic data 30, the ledger or blockchain preferences 50, the rules 52, the policies 54, and/or the budget 80). The ETHEREUM® blockchain network 24*f* (and/or the blockchain nodal computer 96) then provides the blockchain backup service 112, perhaps for a fee, subscription, cryptocoin, or other compensation scheme. Once the ETHEREUM® blockchain network 24*f* generates the blockchain ledger decision 42, the ETHEREUM® blockchain network 24*f* may then send or forward the electronic data 30 (and/or its representative hash value(s) 32) to the selected blockchain (such as Amazon's Quantum Ledger Database 24*b* and 26*b*). The blockchain selection application 40 may also generate the cryptographic proof 43 of the blockchain ledger decision 42, thus documenting the blockchain backup service 112 and/or the smart contract 120 that affected the archival operation.

Exemplary embodiments may thus track or monitor data transfers across or between blockchain storage nodes in the blockchain networks 24. Because each blockchain is a decentralized database using a distributed storage system (the nodes 20, 96, and/or 110), the blockchain has an append-only immutable data structure resembling a distributed ledger capable of maintaining records between mutually untrusted parties. The untrusted parties are referred to as peers or peer nodes. Each peer may maintain at least a copied portion of the database records and no single peer can modify the database records without a consensus being reached among the distributed peers. The blockchain peers may thus execute a consensus protocol to validate blockchain storage transactions, group the storage transactions into a block of data, and build a hash chain over multiple blocks of data. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native crypto-currency and use consensus based on various protocols such as Proof of Work (PoW). On the other hand, a permissioned blockchain database provides secure interactions among a group of entities which share a common goal, but which do not fully trust one another, such as businesses that exchange funds, goods, information, and the like.

Any of the multiple blockchains 24 or service providers 26 may implement the digital or smart contract 120. The digital contract 120 is a computer program or "chaincode" that verifies and/or enforces negotiation and/or performance of a contract between nodes or parties. One fundamental purpose of so-called smart contracts is to integrate the practice of contract law and related business practices with electronic commerce protocols between parties or devices via the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others. Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators. The digital contract 120 may leverage tamper-proof properties of the blockchain database and an underlying agreement between nodes, which is referred to as an endorsement or endorsement policy. Blockchain transactions associated with the digital contract 120 can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Exemplary embodiments may utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

Exemplary embodiments may utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

Exemplary embodiments may utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for tracking data transfers in multiple blockchain networks. Exemplary embodiments solve the issues of time and trust by extending features of a database such as immutability, digital signatures and being a single source of truth. Exemplary embodiments provide a solution for tracking data transfers in multiple blockchain networks. The multiple blockchain networks 24 may be homogenous based on the importance 44 and value 46 of the electronic data 30, the blockchain network parameters 48, the ledger or blockchain preferences 50, the rules 52, the policies 54, and/or the budget 80.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for tracking data transfers using multiple blockchain networks 24 is implemented due to immutable accountability, security, privacy, permitted decentralization, availability of smart contracts, endorsements and accessibility that are inherent and unique to blockchain. In particular, the blockchain ledger data is immutable and that provides for efficient method for tracking data transfers in blockchain networks 24. Also, use of the encryption in the blockchain provides security and builds trust. The smart contract 120 manages the state of the asset to complete the life-cycle. The example blockchains are permission decentralized. Thus, each end user may have its own ledger copy to access. Multiple organizations (and peers) may be onboarded on the blockchain network 24. The key organizations may serve as endorsing peers to validate the smart contract execution results, read-set and write-set. In other words, the blockchain inherent features provide for efficient implementation of a method for tracking data transfers in multiple blockchain networks 24.

Exemplary embodiments improve computer functioning. Exemplary embodiments substantially reduce data loss, due to hardware failures or to malicious software, by generating duplicate copies that are intelligently and automatically transferred to multiple storage nodes 96 affiliated with the multiple blockchain networks 24. Exemplary embodiments may programmatically select the multiple storage nodes 96 and/or the multiple blockchain networks 24, based on the importance 44 and value 46 of the electronic data 30, the blockchain network parameters 48, the ledger or blockchain preferences 50, the rules 52, the policies 54, and/or the budget 80. The computer 20, for example, tracks and logs why the electronic data 30 was duplicated and where the duplicate copy was written. The computer 20 immutably records these duplication and transfer details to a blockchain ledger. The computer 20 may further generate the cryptographic proof 34 of the duplication and transfer. Exemplary embodiments thus provide a solution to a problem in the software arts of data backups and transfers.

In some embodiments, a method includes identifying, a set of distributed ledgers to store data, each distributed ledger from the set of distributed ledgers associated with a network of computing devices from a set of networks of compute devices. The method includes selecting a first distributed ledger from the set of distributed ledgers based on a characteristic of the first distributed ledger and a parameter for storing the data. The method further includes creating a checkpoint associated with at least a subset of the data and initiating storage of at least one of the data or the checkpoint on the first distributed ledger.

In some embodiments, a method includes receiving, from a user, identifying information and a data storage parameter. The method includes identifying a set of distributed ledgers for storing data, each distributed ledger from the set of distributed ledgers associated with a network of computing devices from a set of networks of compute devices. The method includes selecting a first distributed ledger from the set of distributed ledgers based on a characteristic of the first distributed ledger and the data storage parameter. The method includes creating a private cryptographic key and a master account associated with the user and initiating storage of the private cryptographic key on the first distributed ledger. The method includes receiving an indication of a change of ownership of the user and updating the private cryptographic key to define an updated private cryptographic key and the master account to define an updated master account in response to the indication of the change of ownership. The method includes selecting a second distributed ledger from the set of distributed ledgers based on a characteristic of the second distributed ledger and the data storage parameter and initiating storage of the updated private cryptographic key on the second distributed ledger.

Embodiments described herein include a method of data storage and handling having controlled openness and proprietary records. In some implementations, users or account owners can create, for example, local Merkle Trees of data which can then be copied in whole or in part to a private distributed ledger database or a public distributed ledger database. As a result, the contents of the data can remain private and accessible only by authorized users, while the events of the data creation and transfer can be immutable and trustworthy through the consensus-based process of the private or public distributed ledger databases. In other words, the account owner can access their own local Merkle tree (and thus contents of the data) but the account owner cannot change previous entries of the data without creating a detectable mismatch with the distributed ledger(s). In some implementations, the local Merkle tree can be used as a precursor and local copies of data can be shared, synchronized, or duplicated in sequence to selected distributed ledger databases with new hashes onto these distributed ledger databases. In other words, the first block in the distributed ledger may contain a hash pointer as a link to the local Merkle tree and the next block in the distributed ledger may contain a new hash pointer as a link to the first block. In some implementations, the systems and method described herein share a mixture of full-fidelity data (e.g., full text of a document), abstracted metadata (or summaries, checkpoints, snapshots of the data), parsable Uniform Resource Locators (URLs) (e.g., the text in the URLs may convey meaning along with the location), and/or cryptographic hashes (in some situations, the hashes convey authenticity of the user who may also has access to original documents for rehashing).

Embodiments described herein include a method of determining characteristics (or metrics) of multiple distributed ledger databases, parameters associated with data to be stored, and selecting, based on the ledger characteristics and storage parameters, at least one distributed ledger database to store the data (or checkpoints, metadata associated with the data). For example, the method can select a distributed ledger database that has more bandwidth, is more cost effective, is more reliable, has larger participation, etc. compared to the remaining available distributed ledger databases. For another example, the method can avoid congested ledgers, congested moments, or high-priced ledgers by writing (or storing data) to lower priced or less-congested ledgers. In some implementations, the method includes storing batched data (e.g., transactions) or delaying the storing of the data to achieve lower unit costs or at a less expensive time.

Figure 18:
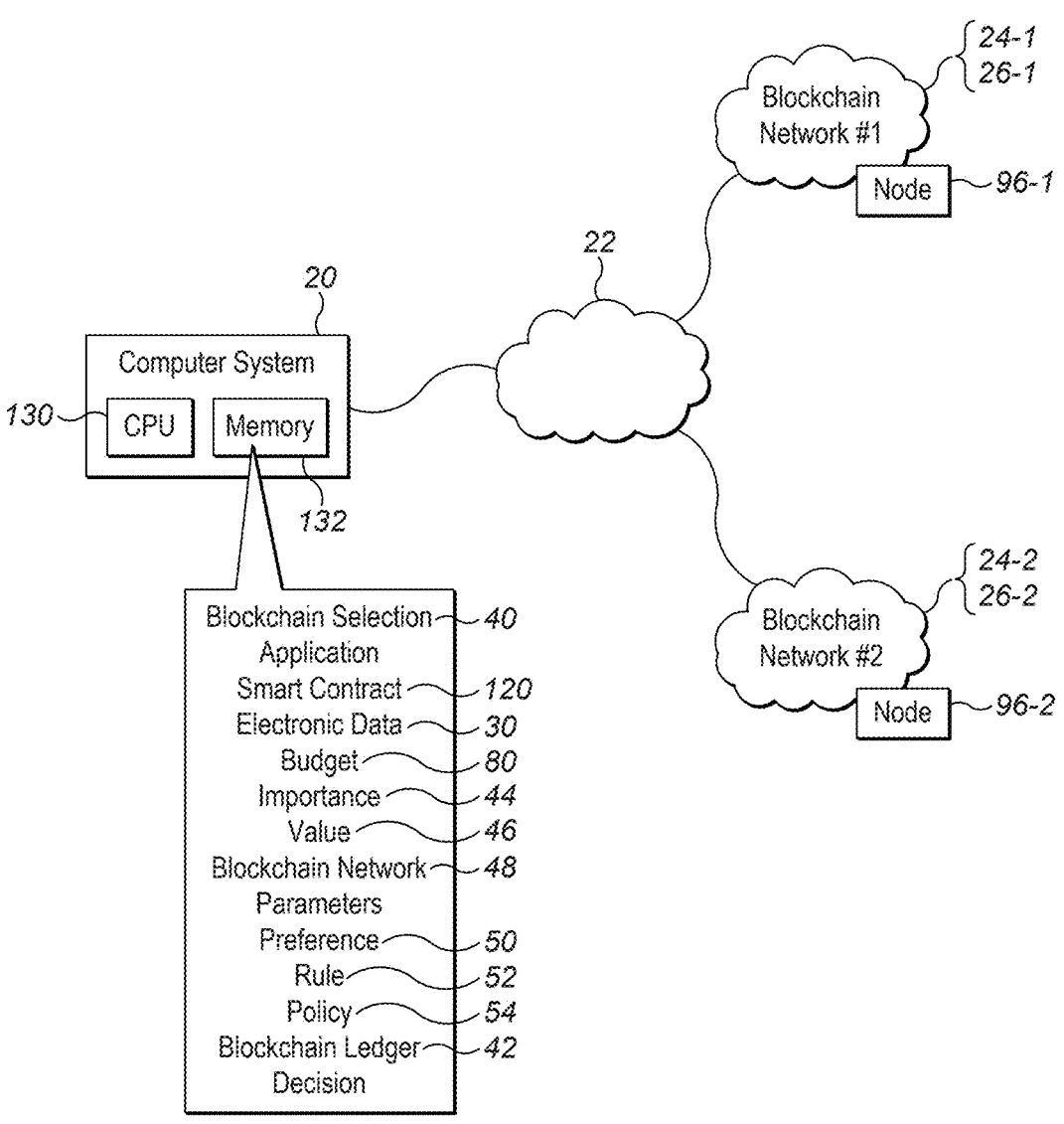
FIGS. 18-23 are more detailed illustrations of the blockchain operating environment, according to exemplary embodiments.

FIGS. 18-23 are more detailed illustrations of the blockchain operating environment, according to exemplary embodiments. FIG. 18 illustrates the computer 20 communicating via the communications network 22 with the multiple blockchain networks 24 and the multiple blockchain service providers 26. Again, while the computer 20 may interface with, or select from, many different blockchain networks 24 and blockchain service providers 26, for simplicity, FIG. 18 only illustrates a first blockchain network 24-1 (associated with a first blockchain service provider 26-1) and a second blockchain network 24-2 (perhaps associated with a second blockchain service provider 26-2). The computer 20 accesses the first blockchain network 24-1 by establishing packetized communications with any hardware processor, gateway, miner, or member (such as blockchain nodal computer 96-1). The computer 20 may also access the second blockchain network 24-2 by establishing packetized communications with any hardware processor, gateway, miner, or member (such as blockchain nodal computer 96-2). If the computer 20 presents, sends, or conveys the correct credentials, then perhaps the computer 20 may request reads of, and writes to, the first blockchain network 24-1. Similarly, if the computer 20 presents, sends, or conveys the correct credentials required by the second blockchain network 24-2, then perhaps the computer 20 may request reads of, and writes to, the second blockchain network 24-2.

The computer 20 may locally store the electronic data 30. The computer 20 has a hardware processing component 130 (illustrated as "P") (e.g., a central processing unit, a graphics processor, or an ASIC) that executes the blockchain selection application 40 (perhaps implemented as the smart contract 120) stored in a local memory device 132. The computer 20 has a network interface to the communications network 22, thus allowing two-way, bidirectional communication with the blockchain networks 24-1 and 24-2 (such as their respective blockchain processing nodes 96-1 and 96-2). The blockchain selection application 40 includes instructions, code, and/or programs that cause the computer 20 to perform operations, such as collecting and retrieving the electronic data 30, the importance 44 and value 46 of the electronic data 30, the blockchain network parameters 48, the ledger or blockchain preferences 50, the rules 52, the policies 54, and/or the budget 80. The blockchain selection application 40 evaluates and compares this information and generates the blockchain ledger decision 42. The blockchain selection application 40 may thus select which of the blockchain networks 24-1 and 24-2 is best suited for writing one or more duplicate copies of the electronic data 30.

Figure 19:
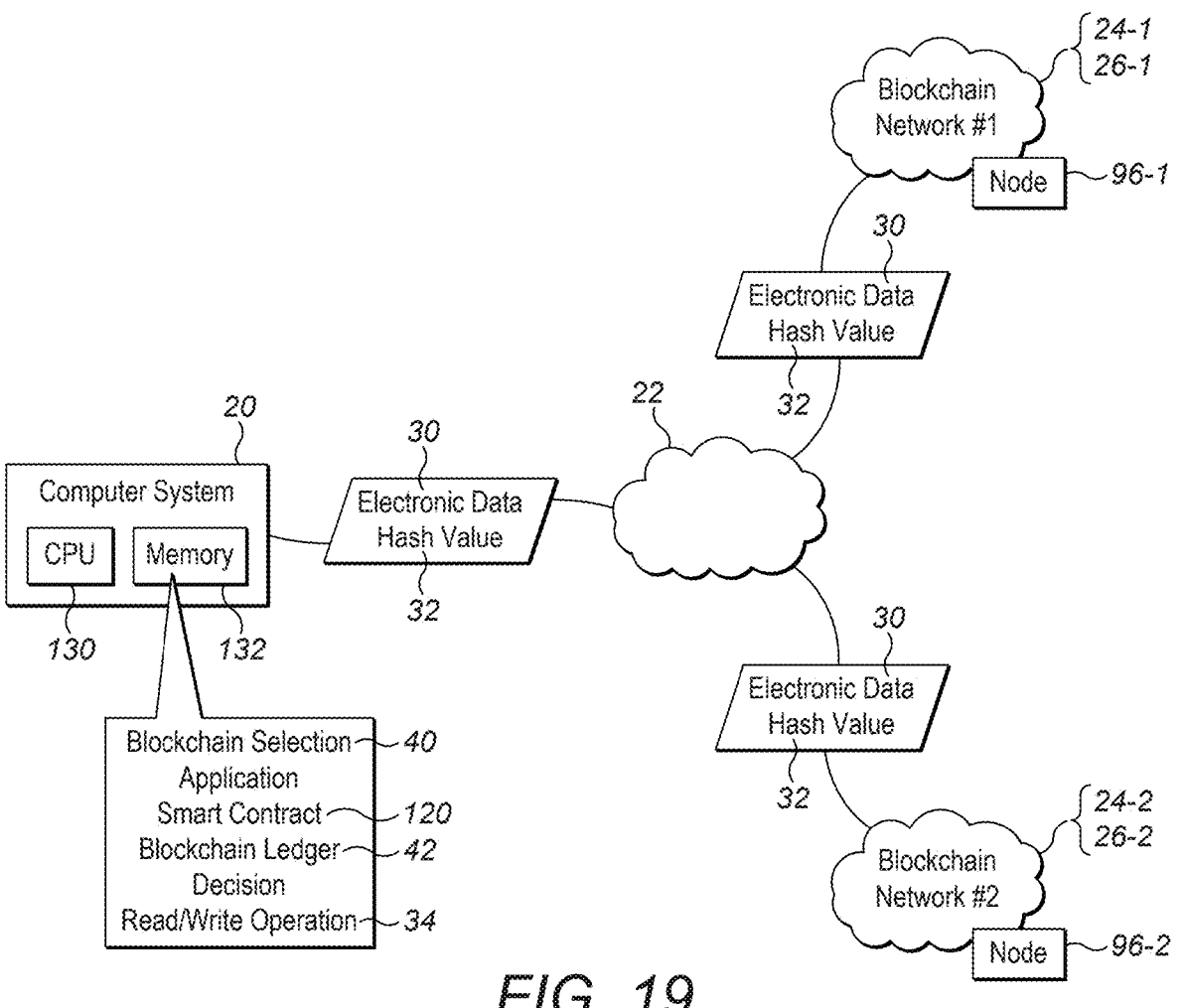

FIG. 19 illustrates the read/write operation 34. Once the blockchain ledger decision 42 is generated, the computer 20 may execute the read/write operation 34 and write the electronic data 30 to one or both of the blockchain networks 24-1 and 24-2 (such as their respective blockchain processing nodes 96-1 and 96-2). The computer 20 may thus have permissioned access and privileges to functionally write or store the electronic data 30 to their respective blockchain processing nodes 96-1 and 96-2 as remote storage media. The computer 20 establishes communication with the blockchain processing nodes 96-1 and 96-2 and sends the electronic data 30 via the communications network 22 to a network address (e.g., Internet Protocol address) assigned to the corresponding blockchain processing nodes 96-1 and 96-2. The computer 20 may also send a write instruction to remotely store and write the electronic data 30 to their respective blockchain networks 24-1 and 24-2. When the blockchain processing nodes 96-1 and/or 96-2 receive the electronic data 30, the blockchain processing nodes 96-1 and/or 96-2 may approve or authorize writing the electronic data 30 to the corresponding blockchain (e.g., the selected blockchain network 24-1 and/or 24-2).

Figure 20:
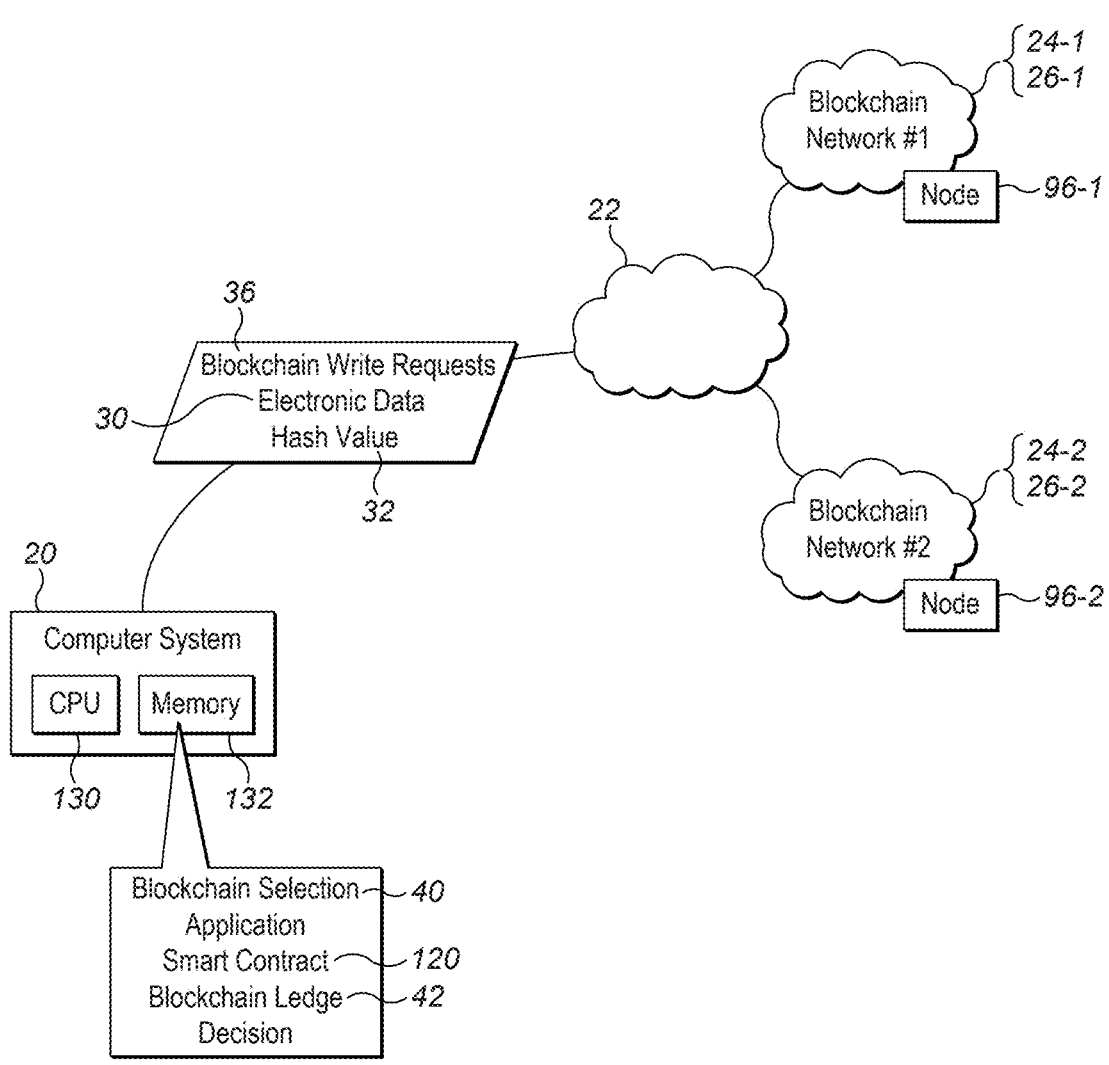

FIG. 20 illustrates the blockchain write request 36. Once the blockchain ledger decision 42 is generated, the computer 20 may generate and send the blockchain write request 36 to one or both of the blockchain networks 24-1 and 24-2 (such as their respective blockchain processing nodes 96-1 and 96-2). The computer 20 may thus have permissioned access and privileges to functionally request multiple write operations to the blockchain networks 24-1 and 24-2. The computer 20, for example, establishes communication with the blockchain processing nodes 96-1 and 96-2. The computer 20 sends a first blockchain write request 36 via the communications network 22 to a network address (e.g., Internet Protocol address) assigned to the blockchain processing node 96-1. The computer 20 sends a second blockchain write request 36 via the communications network 22 to a network address (e.g., Internet Protocol address) assigned to the blockchain processing node 96-2. Each blockchain write request 36 may include, or be accompanied by, a copy of the electronic data 30 (and/or its representative hash value(s) 32). Each blockchain write request 36 requests that the corresponding blockchain processing nodes 96-1 and/or 96-2 write and store the respective duplicate copy of the electronic data 30 to their respective blockchain networks 24-1 and 24-2. When the blockchain processing nodes 96-1 and/or 96-2 receive the electronic data 30, the blockchain processing nodes 96-1 and/or 96-2 may approve or authorize writing the electronic data 30 to the corresponding block-chain (e.g., the selected blockchain network 24-1 and/or 24-2). The blockchain processing nodes 96-1 and/or 96-2 receive the electronic data 30, the blockchain processing nodes 96-1 and/or 96-2 may approve or authorize writing the electronic data 30 to the corresponding blockchain (e.g., the selected blockchain network 24-1 and/or 24-2). The respective blockchain processing nodes 96-1 and/or 96-2 may also send a confirmation to any destination (such as the computer 20), and the confirmation confirms and details that the electronic data 30 was written/stored to the corresponding blockchain (e.g., the selected blockchain network 24-1 and/ or 24-2).

Figure 21:
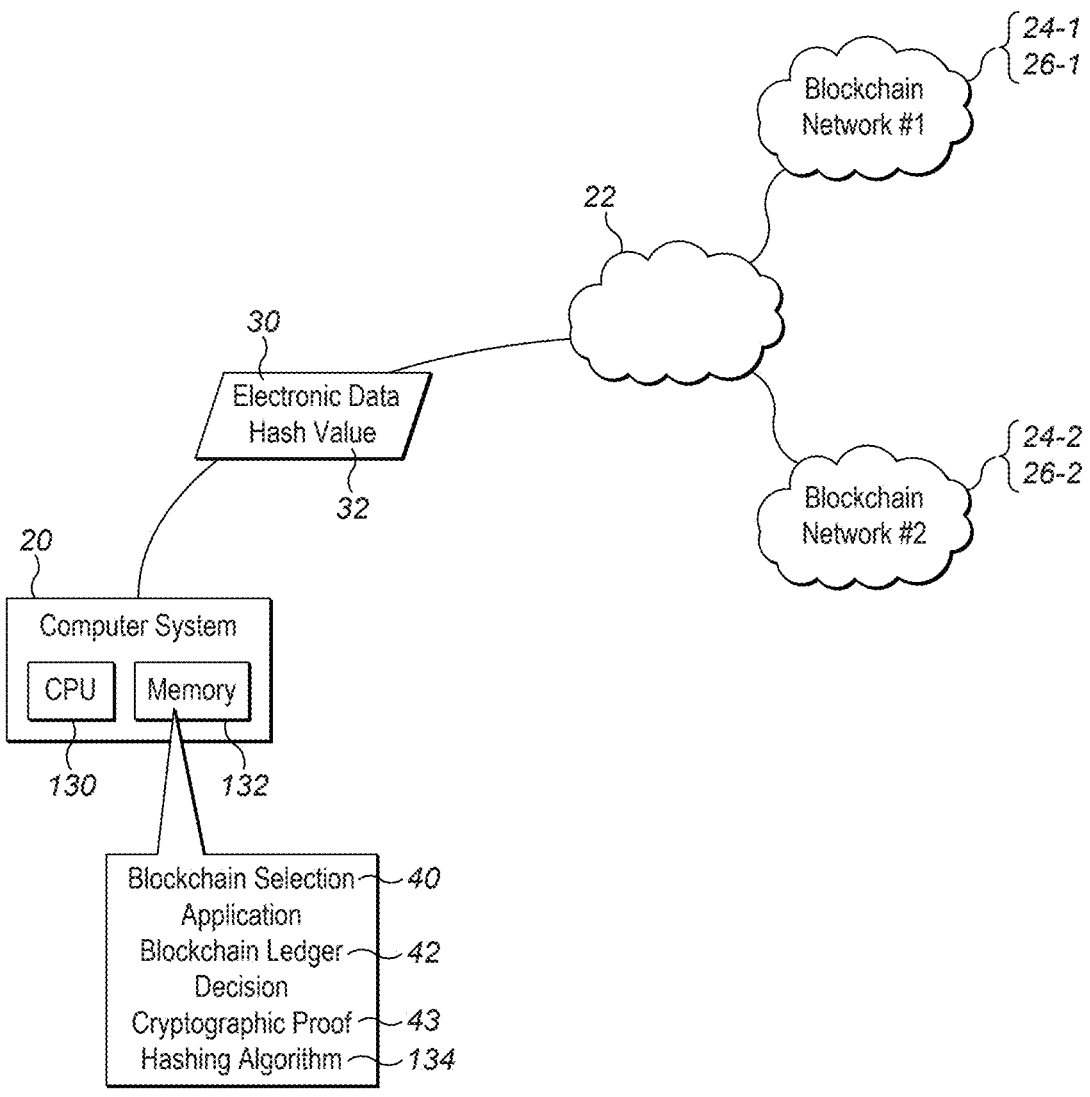

FIG. 21 illustrates hashing. The computer 20 may send the electronic data 20 to the blockchain processing nodes 96-1 and 96-2 for blockchain recordation. The computer 20, however, may additionally or alternatively send the hash value or values 32 that represent the electronic data 30. The blockchain selection application 40 may thus include, or access, instructions, code, and/or programs that cause the computer 20 to perform operations, such as calling, invok-ing, and/or applying an electronic representation of a hash-ing algorithm 134 to the electronic data 30. The hashing algorithm 134 thus generates the one or more hash values 32, which may be written to, or incorporated into, the corresponding blockchain (e.g., the selected blockchain net-work 24-1 and/or 24-2).

The blockchain selection application 40 may also gener-ate the cryptographic proof 43. The cryptographic proof 43 proves that the computer 20 redundantly wrote or archived the electronic data 30 to the multiple blockchain networks 24-1 and 24-2. The blockchain selection application 40, for example, may generate one or more hash values (using the hashing algorithm 134) representing the electronic data 30, the importance 44 and value 46 of the electronic data 30, the blockchain network parameters 48, the ledger or blockchain preferences 50, the rules 52, the policies 54, and/or the budget 80. If the computer 20 receives a confirmation from any blockchain network 24 or service provider 26 (e.g., indicating or specifying details that the electronic data 30 was written/stored to the corresponding blockchain), the blockchain selection application 40 may additionally or alternatively generate the cryptographic proof 43 of the blockchain transfer. The blockchain selection application 40 may concatenate any bit values (representing any of the electronic data 30, the importance 44 and value 46 of the electronic data 30, the blockchain network parameters 48, the ledger or blockchain preferences 50, the rules 52, the policies 54, and/or the budget 80) and generate hash values. The blockchain selection application 40, additionally or alternative, may concatenate any individual hash values and generate other hash values. The blockchain selection appli-cation 40 may generate hash values using a unique identifier assigned to any of the multiple networks 24 and/or service providers 26. The blockchain selection application 40 may generate hash values using a unique identifier (such as an IP address, MAC address, hardware serial number) assigned to any machine, computer, and/or miner operating within, or associated with, the multiple networks 24 and/or service providers 26. The blockchain selection application 40 may instruct the computer 20 to perform network packet inspec-tion to read/retrieve a source address, a destination address, and/or the unique identifier associated with, or specified by, a data packet. However the cryptographic proof 43 is generated, the blockchain selection application 40 may instruct the blockchain networks 24-1 and/or 24-2 to write or record the proof 43. After the cryptographic proof 43 is immutably recorded, the cryptographic proof 43 may be read and the blockchain ledger decision 42 reconstructed for auditing purposes.

Figure 22:
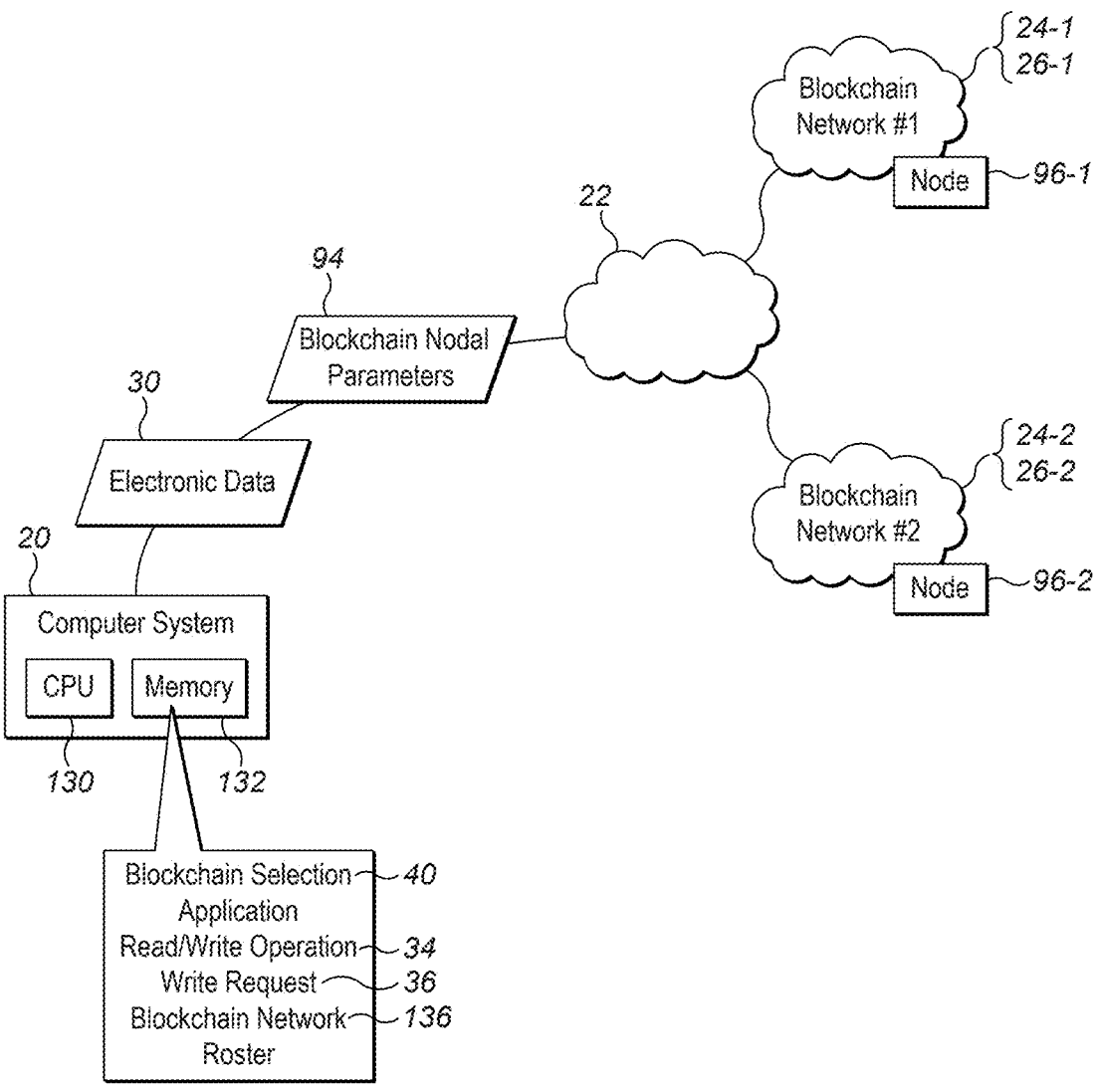

FIG. 22 illustrates a blockchain network roster 136. The blockchain network roster 136 describes privileges, permis-sions, credentials, cryptographic keys, network addresses, and other access information for the multiple blockchain networks 24 and/or service providers 26. Because the com-puter 20 may have membership or subscriber privileges to the multiple blockchain networks 24 and/or service provid-ers 26, the blockchain network roster 136 tracks and stores each blockchain network's, and/or each service provider's, access credentials. For example, should the computer 20 query the blockchain network 24-1 for the blockchain nodal parameters 94, the computer 20 may query the blockchain network roster 136 to identify the Internet protocol address assigned to the blockchain node 96-1. The blockchain net-work roster 136 may also have database entries for user-names, passwords, public/private key pairs, and any other information for accessing the blockchain node 96-1. As another example, when the computer 20 sends the electronic data 30, the computer 20 may query the blockchain network roster 136 to identify the Internet protocol address assigned to the blockchain node 96-1. When the computer 20 executes, issues, or performs the read/write request 34 and/or the write request 36, the computer 20 may consult the blockchain network roster 136 for the appropriate, approved, or authorized access information. The blockchain network roster 136 may thus be a local resource that maps or relates each blockchain network 24 and/or service provider 26 to its corresponding access/network privileges. The blockchain network roster 136, however, may additionally or alterna-tively be implemented as a remote network resource main-tained by any networked device.

Figure 23:
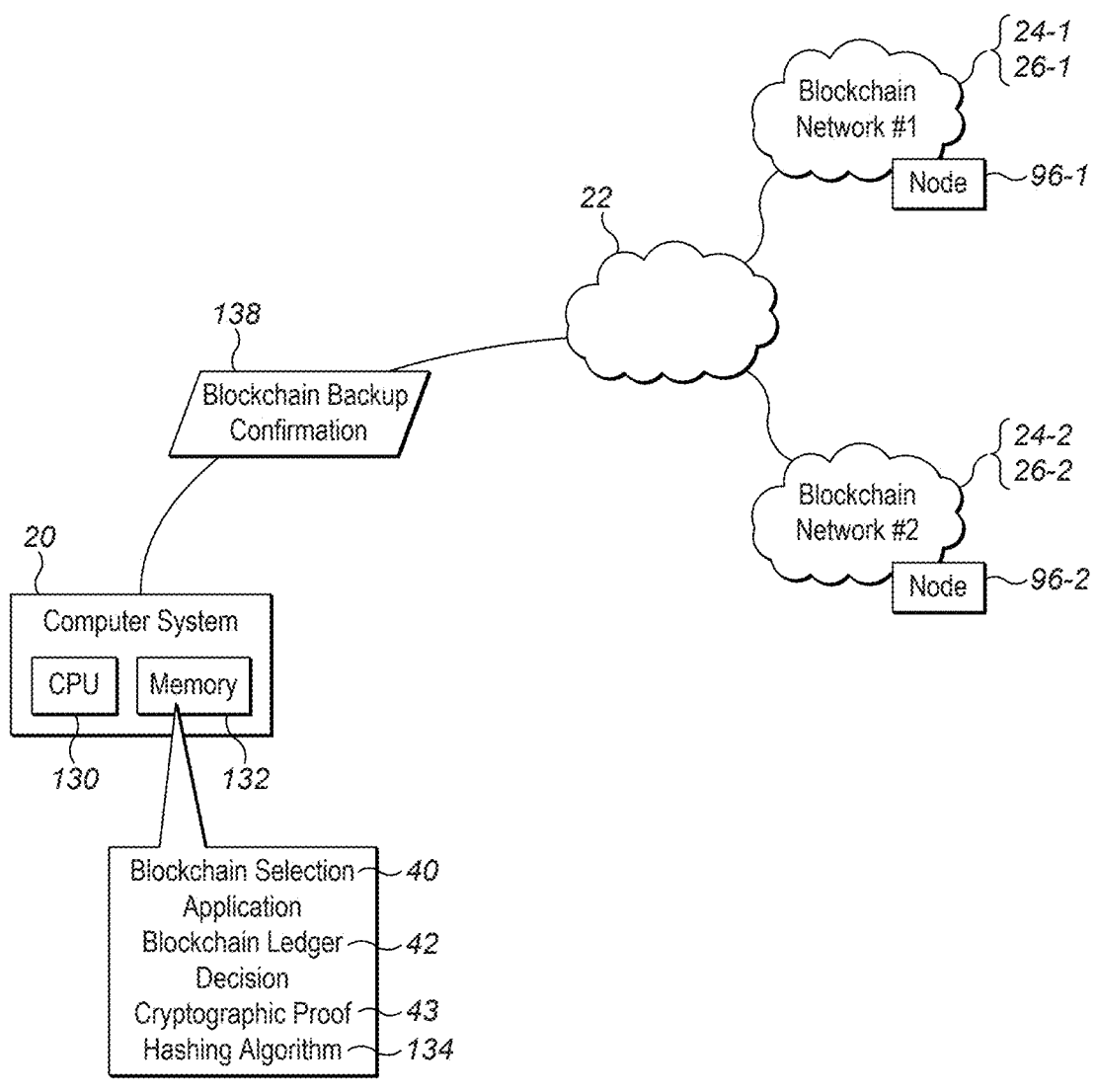
Figure 24:
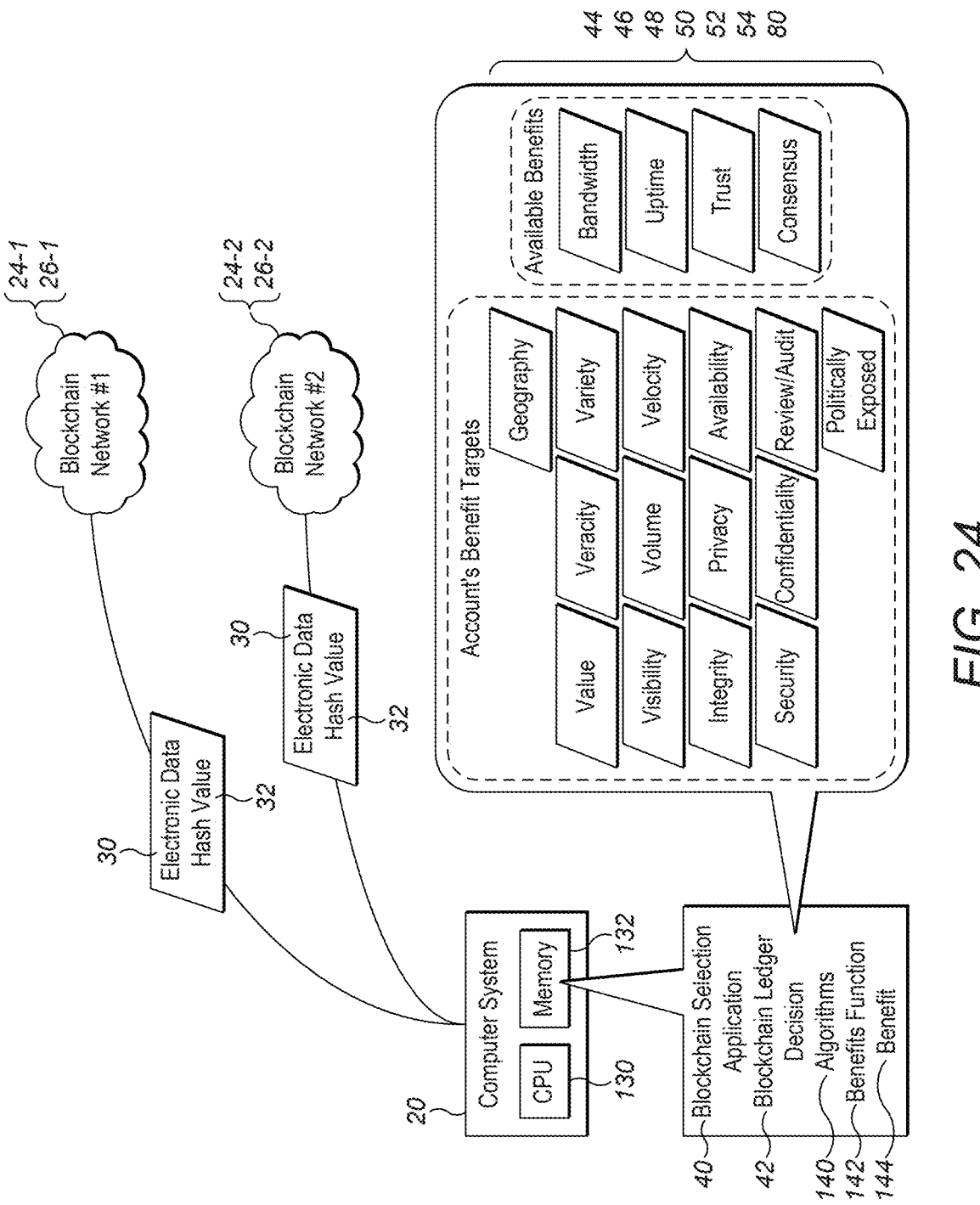
FIGS. 24-27 illustrate a blockchain selection mechanism, according to exemplary embodiments.

FIG. 23 illustrates a blockchain backup confirmation 138. When the electronic data 30 is redundantly written to the second blockchain network 24-2/26-2, the second block-chain network 24-2/26-2 may send the blockchain backup confirmation 138. The blockchain backup confirmation 138 confirms that the electronic data 30 was successfully written to the second blockchain network 24-2/26-2. The blockchain backup confirmation 138, in other words, acts as a confir-mation blockchain backup and acknowledges that the elec-tronic data 30 was successfully backed-up to the second blockchain network 24-2/26-2. The blockchain selection application 40 may then additionally or alternatively gener-ate the cryptographic proof 43 using the blockchain backup confirmation 138. For example, the blockchain selection application 40 may generate a first cryptographic proof 43 representing the blockchain ledger decision 42 (e.g., the electronic data 30, the importance 44 and value 46 of the electronic data 30, the blockchain network parameters 48, the ledger or blockchain preferences 50, the rules 52, the policies 54, and/or the budget 80). The blockchain selection application 40 may generate a second cryptographic proof 43 representing the blockchain backup confirmation 138. However, the blockchain selection application 40 may generate a single cryptographic proof 43 by concatenating and/or hashing any bit or hash values representing the blockchain ledger decision 42 and the blockchain backup confirmation 138. However the cryptographic proof(s) 43 is/are generated, the blockchain selection application 40 may instruct the blockchain networks 24-1 and/or 24-2 to write or record the proof(s) 43 for future reconstruction and auditing purposes (perhaps using multiple read/write operations 34 and/or multiple write requests 36).

Exemplary embodiments may use any encryption or hashing function. There are many encryption algorithms and schemes, and exemplary embodiments may be adapted to execute or to conform to any encryption algorithm and/or scheme. In the blockchain environment, though, many readers may be familiar with the various hashing algorithms, especially the well-known SHA-256 hashing algorithm. The SHA-256 hashing algorithm acts on any electronic data or information to generate a 256-bit hash value as a cryptographic key. The key is thus a unique digital signature. However, there are many different hashing algorithms (e.g., the SHA-2 family, SHA-256, SHA-512, and/or the SHA-3 family), and exemplary embodiments may be adapted to execute or to conform to any hashing algorithm, hashing family, and/or hashing scheme (e.g., Blake family, MD family, RIPE family, SHA family, CRC family).

Exemplary embodiments may be applied regardless of networking environment. The computer 20 communicates via the communications network 22 with the multiple blockchain networks 24 and the multiple blockchain service providers 26. Exemplary embodiments may be easily adapted to any networking infrastructure and to any network protocol or communications standard. Exemplary embodiments may be easily adapted to stationary or mobile devices having wide-area networking (e.g., 4G/LTE/5G/6G cellular), wireless local area networking (WI-FI®), near field, and/or BLUETOOTH® capability. Exemplary embodiments may be applied to any device utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet. Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. For example, the computer 20 may utilize any desktop, mobile, or server central processing unit or chipset offered by INTEL®, ADVANCED MICRO DEVICES®, ARM®, TAIWAN SEMICONDUCTOR MANUFACTURING®, QUALCOMM®, or any other manufacturer. The computer 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

Exemplary embodiments may packetize. When the computer 20 communicates via the communications network 22, the computer 20 may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address. The blockchain selection application 40 may instruct the computer 20 to perform network packet inspection to read/retrieve a source address, a destination address, and/or the unique identifier associated with, or specified by, a data packet.

FIGS. 24-27 further illustrate the blockchain selection mechanism, according to exemplary embodiments. As the blockchain selection application 40 instructs the computer 20 to generate the blockchain ledger decision 42, the computer 20 may call, request, and/or execute one or more blockchain selection algorithms 140. Each one of the blockchain selection algorithms 140 may be coded, programmed, or tailored to implement one or more functional, selectional objectives. One of the blockchain selection algorithms 140, for example, may implement a benefits function 142. The benefits function 142 accepts any one or more of the importance 44 and value 46 of the electronic data 30, the blockchain network parameters 48, the ledger or blockchain preferences 50, the rules 52, the policies 54, and/or the budget 80 as inputs. The benefits function 142 may then determine or calculate a benefit 144 as an output, perhaps based on the inputs. As a simple example, the benefits function 142 may logically describe or relate target values of the importance 44 and value 46 of the electronic data 30, the blockchain network parameters 48, the ledger or blockchain preferences 50, the rules 52, the policies 54, and/or the budget 80. The benefits function 142 analyzes, weighs, compares, and/or iterates on the inputs (according to its programming code) to generate the benefit 144. The blockchain selection application 40 may then instruct the computer 20 to generate the blockchain ledger decision 42, perhaps based on the benefit 144. Simply put, the benefits function 142 helps determine which of the multiple blockchain networks 24, and/or the multiple blockchain service providers 26, has/have lower costs, greater performance, reduced timing, or higher quality metrics.

Figure 25:
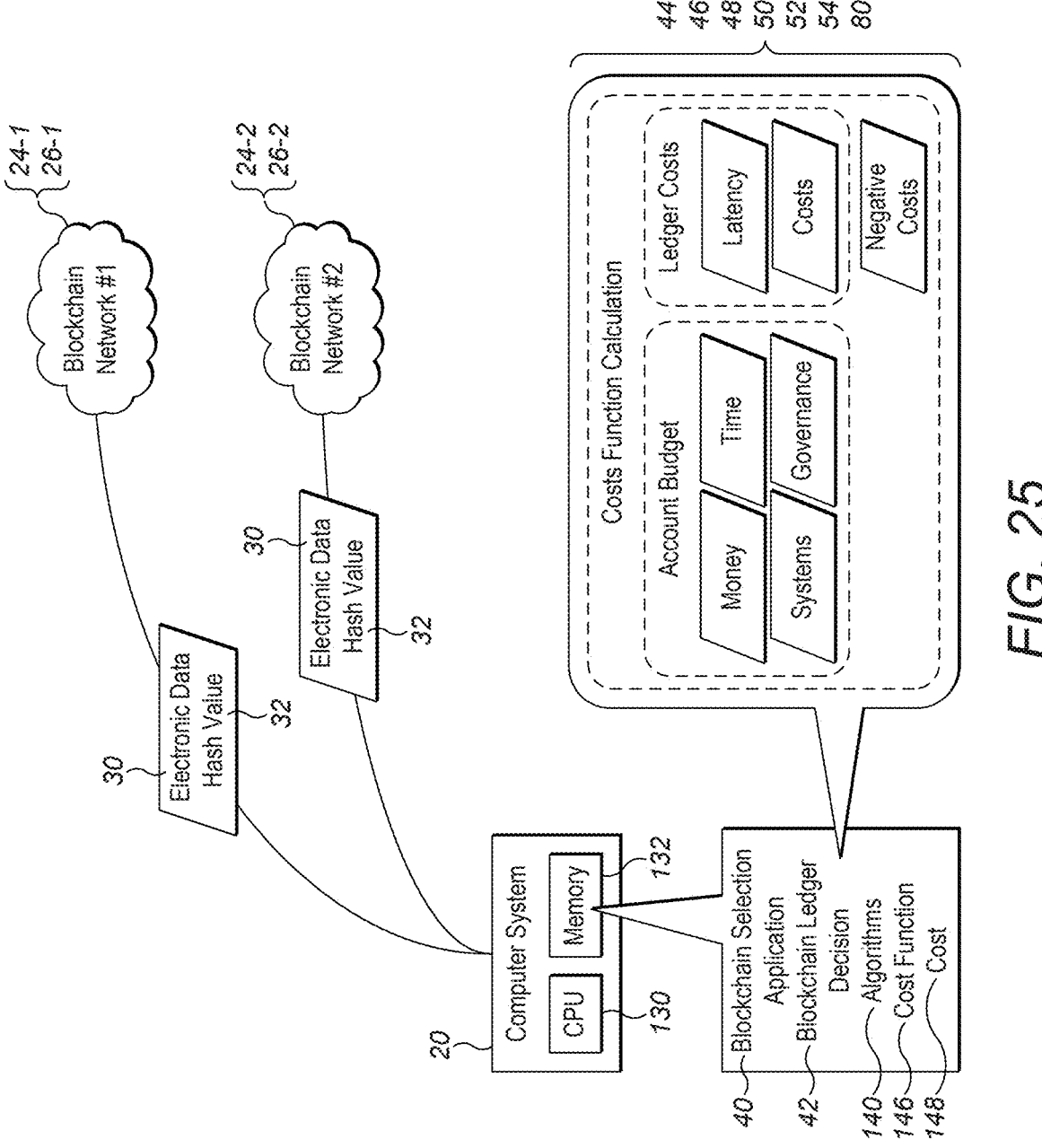

FIG. 25 further illustrates the blockchain selection mechanism. The blockchain ledger decision 42 may additionally or alternatively call, request, access, or implement a cost function 146. The cost function 146 accepts any one or more of the importance 44 and value 46 of the electronic data 30, the blockchain network parameters 48, the ledger or blockchain preferences 50, the rules 52, the policies 54, and/or the budget 80 as inputs. The cost function 146 may then determine or calculate a final or overall cost 148 as an output, perhaps based on the inputs. As a simple example, the cost function 146 may logically describe or relate various parameters of the budget 80 (such as current money/currency/balance, required processing/write times, system processing costs, and governance compliance costs) to the costs of using or writing to any blockchain ledger. The cost function 146 analyzes, weighs, compares, and/or iterates on the inputs (according to its programming code) to generate the cost 148. The blockchain selection application 40 may then instruct the computer 20 to generate the blockchain ledger decision 42, perhaps based on the cost 148. Simply put, the cost function 146 helps determine which of the multiple blockchain networks 24, and/or the multiple blockchain service providers 26, has/have lower costs, greater performance, reduced timing, or higher quality metrics.

Figure 26:
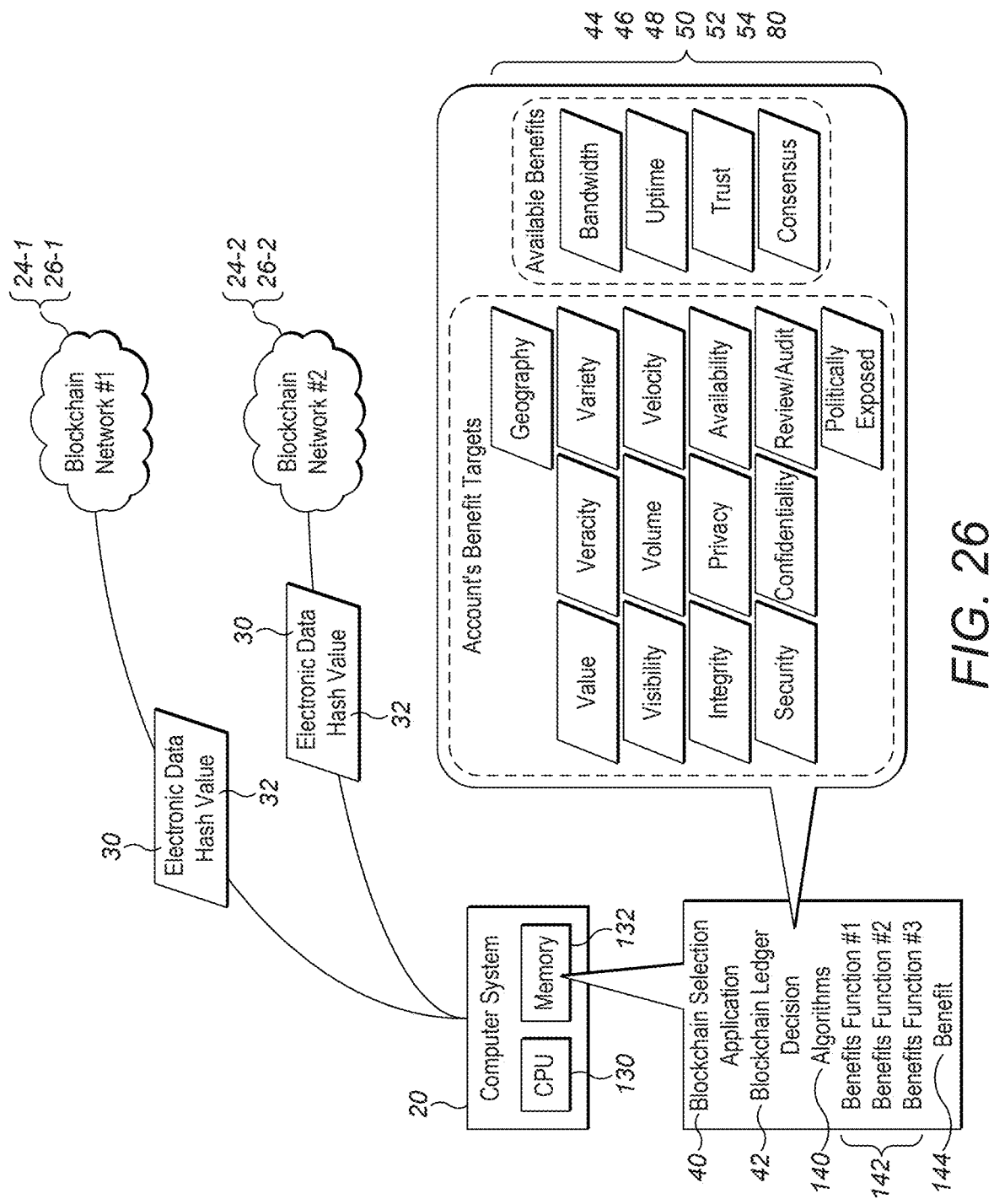
Figure 27:
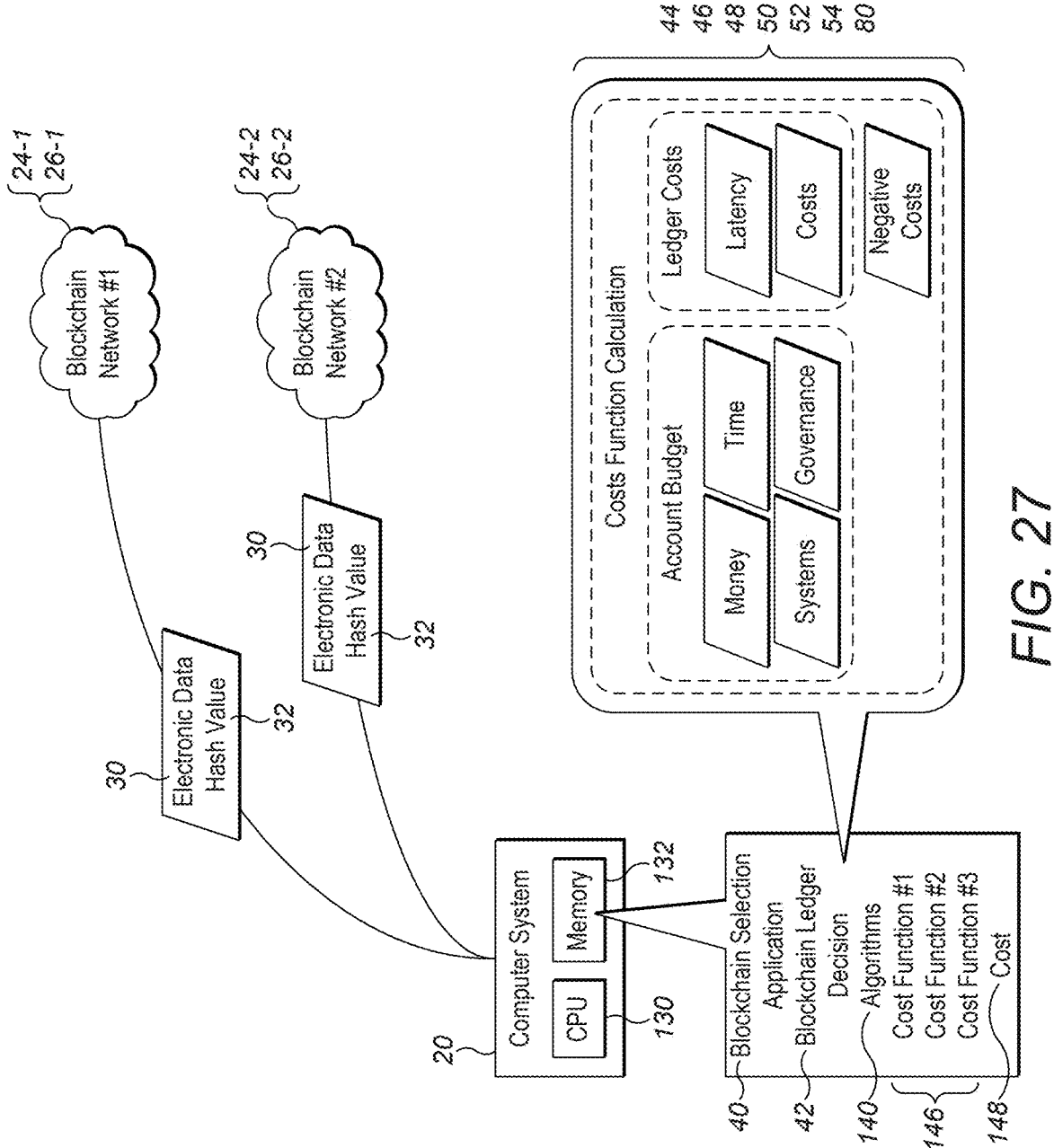
Figure 28:
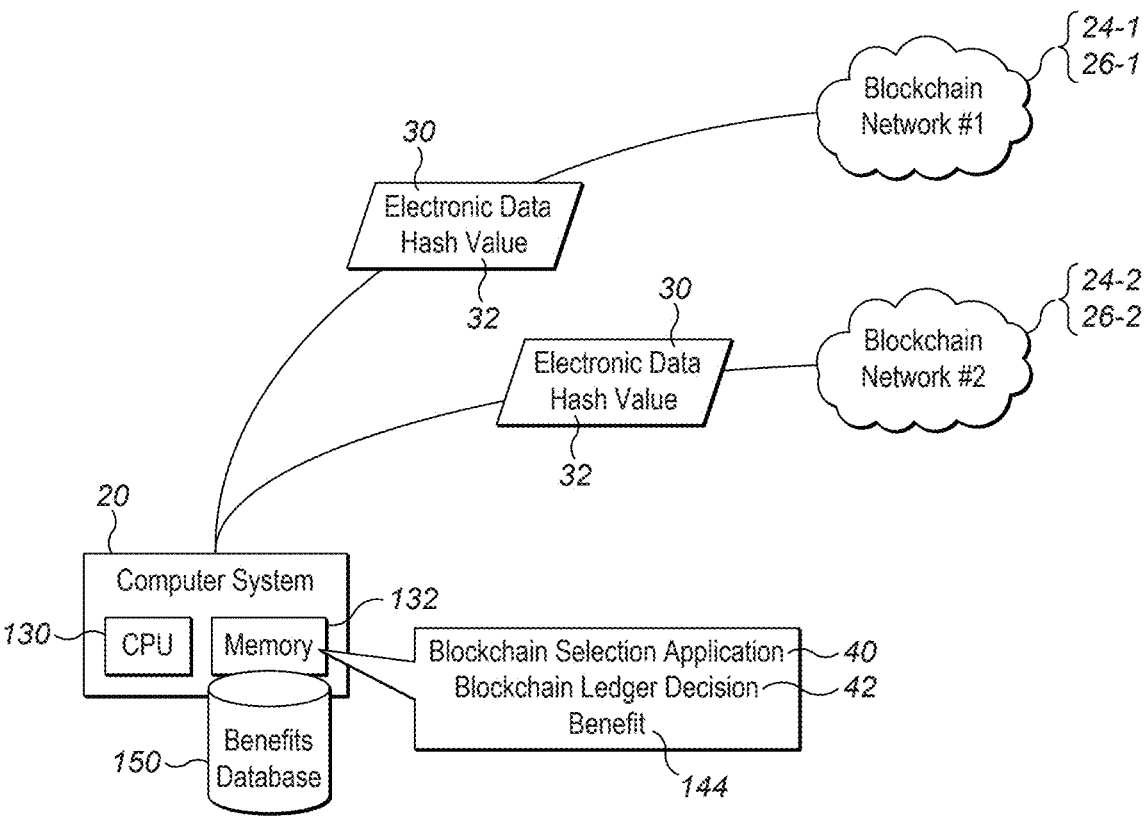

As FIGS. 26-27 illustrate, the blockchain selection mechanism may be tunable. The user/administrator of the computer 20, and/or the blockchain selection application 40, may specify the blockchain selection algorithms 140 that are used to determine the benefit 144 and the cost 148. That is, as FIG. 26 illustrates, there may be many different benefits functions 142 that are accessible to, or useable by, the blockchain selection application 40. Any of the benefits functions 142 may be locally stored by the computer 20 or remotely retrievable/accessible to the computer 20. The user/administrator need only specify or configure the blockchain selection application 40 to implement her desired benefit function 142. Similarly, FIG. 27 illustrates multiple cost functions 146. Each cost function 146 may be locally stored or remotely retrievable/accessible. The user/administrator need only specify or configure the blockchain selection application 40 to implement her desired cost function 146. The user/administrator may thus experiment with the different benefits functions 142 and with the different cost functions 146. Each different benefits function 142 and each different cost function 146 may be coded or programmed to achieve different goals, objectives, or outcomes. Each different benefits function 142 and each different cost function 146 may be offered by a different vendor, thus allowing vendors to specialize in particular business sectors or features. The different benefits functions 142 and the different cost functions 146 may be downloaded and evaluated. Over time and trials, then, the user/administrator (or the blockchain selection application 40) gains experience with the different benefits functions 142 and with the different cost functions 146. The user/administrator (or the blockchain selection application 40) may evaluate their individual/ combined effects and determine which of the blockchain selection algorithms 140 best generates her desired blockchain ledger decision 42.

Suppliers and services may be used. Exemplary embodiments may optionally utilize vendors for the benefits function 142 and/or for the cost function 146. The computer 20 may enlist or request that a service provider provide or perform a processing service. The computer 20, for example, may communicate with the vendor's server, or the service provider, via the communications network 22. The vendor's server, or the service provider's infrastructure, has a hardware processing element ("P") that downloads the benefits function 142 and/or the cost function 146 to the computer 20. The computer 20, however, may additionally or alternatively send a benefit or cost request to the vendor's server or the service provider's infrastructure. The benefit or cost request may specify the inputs for the benefits function 142 and/or for the cost function 146. The benefit or cost request may also specify the benefits function 142 and/or the cost function 146 to be executed (such as specifying a benefits function identifier and/or a cost function identifier). The vendor's server or the service provider's infrastructure may thus offer different benefits functions 142 and/or the cost functions 146. The vendor's server or the service provider's infrastructure identifies the appropriate benefits function 142 and/or the cost function 146 (perhaps by querying a database of algorithms or services having entries that map or associate different function identifiers to their corresponding benefits function 142 and/or the cost function 146). The vendor's server or the service provider's infrastructure executes the corresponding benefits function 142 and/or the cost function 146 using the inputs to generate the benefit 144 and/or the cost 148. The vendor's server or the service provider's infrastructure sends a service response to the computer 20, and the service response includes or specifies the benefit 144 and/or the cost 148.

Exemplary embodiments may be defined as context. The context may be defined or configured according to the importance 44 and value 46 of the electronic data 30, the blockchain network parameters 48, the ledger or blockchain preferences 50, the rules 52, the policies 54, and/or the budget 80. Similarly, the benefit 144 and/or the cost 148 may be defined or configured according to the importance 44 and value 46 of the electronic data 30, the blockchain network parameters 48, the ledger or blockchain preferences 50, the rules 52, the policies 54, and/or the budget 80. Multiple users/administrators may establish different profiled accounts (as later explained with reference to FIG. 35). Each user/administrator may thus configure or define their corresponding importance 44 and value 46 of the electronic data 30, the blockchain network parameters 48, the ledger or blockchain preferences 50, the rules 52, the policies 54, and/or the budget 80. Each user/administrator, for example, may establish business rules, ledger rules, and different ledger use histories that are all elements of a corresponding account/profile. The business rules and the ledger rules may thus be choices made by the user that govern operations and expenses. They are stored in the Master Account to be available for Ledger Evaluation and optimization, as illustrated in FIG. 52.

Figure 52:
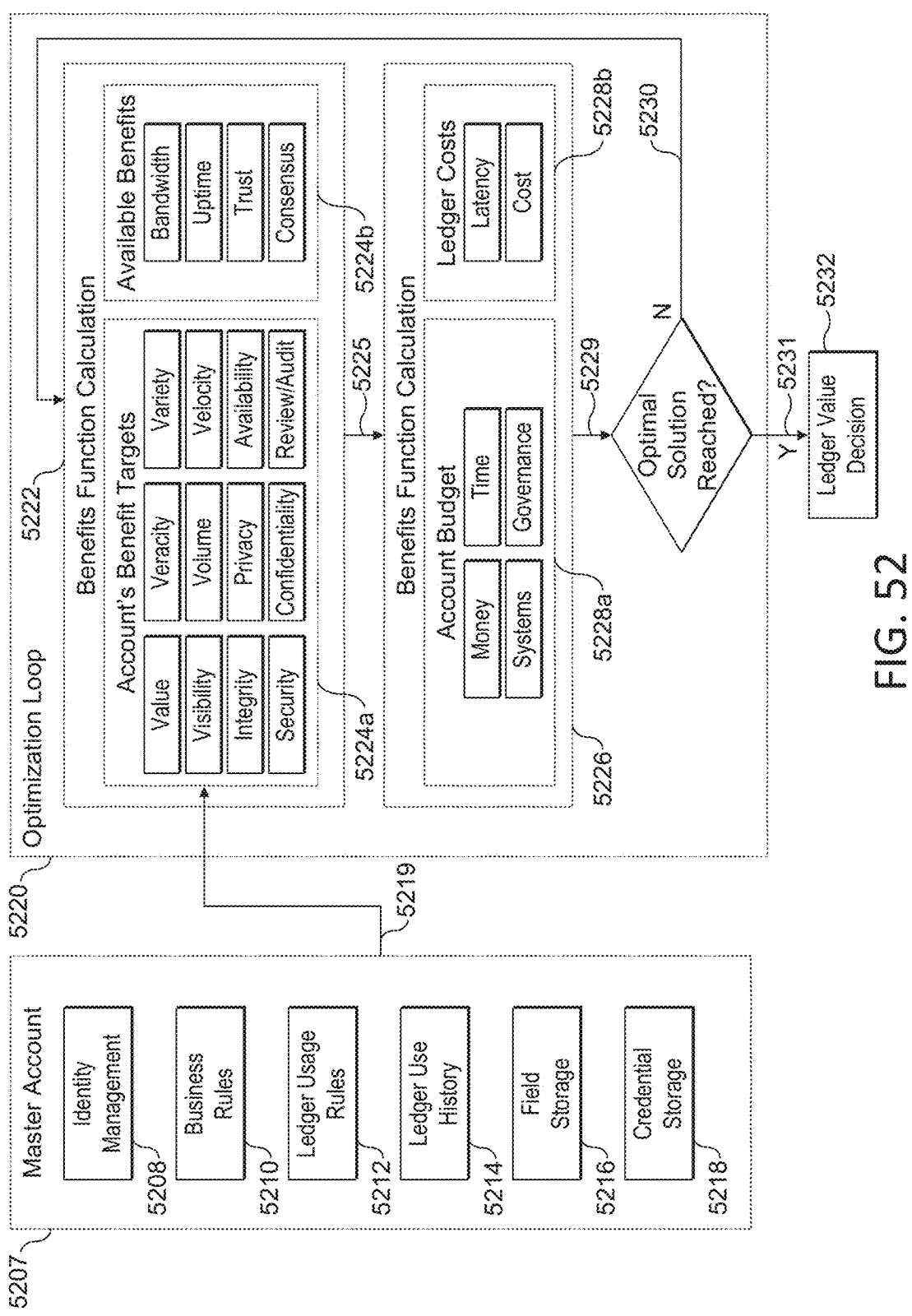
FIG. 52 illustrates a blockchain selection optimization mechanism, according to exemplary embodiments.

FIG. 52 shows a Master Account 5207 as including Identity Management 5208, Business Rules 5210, Ledger Usage Rules 5212, Ledger Use History 5214, Field Storage 5216, and Credential Storage 5218, and/or the like. Identity Management 5208 manages identity of the Master Account 5207, Business Rules 5210 represents business rules used by the Master Account 5207, Ledger Usage Rules 5212 represents blockchain usage rules used by the Master Account 52017, Field Storage 5216 can store the descriptive fielding data (described further below), and Credential Storage 5218 can store credential information. Ledger Use History 5214 records the operations and expenses after they actually occur as the result of ongoing optimization. The identified Business Rules 5210 and Ledger Usage Rules 5214 are similar concepts managed in the real world by staff in similar roles, and thus sometimes functionally overlap. In FIG. 52, they are shown as separated by the context and reason they are created. This is why FIG. 52 shows a single arrow 5219 between the Master Account 5207 and the Optimization Loop 5220. The Optimization Lopp 5220 performs business Benefits Function calculation(s) 5222 and business Costs Function calculation 5226 that guide how the system will accommodate business needs, such as: any user request (any transactional sequence performed by a user); requests made from workflows (predefined series of user transactions); and/or requests made as part of automated workflows (no direct user intervention). Benefits Function calculation 5222 may take into account various Account's Benefit Targets 5224a and Available Benefits 5224b and generates a benefit value output. From there, the workflow proceeds, as illustrated by arrow 5225, to perform Costs Function calculation 5226. Costs Function calculation 5226 may take into account various Account Budget parameters 5228a and Ledger Costs parameters 5228b and produces a cost value output. From there, using the benefit value output and the cost value output, the workflow proceeds (as illustrated by arrow 5229) to determine whether the optimal decision has been reached. If the answer is yes ("Y"), represented by an arrow 5231, the node produces a Leger Value Decision result 5232. If the answer is no ("N"), represented by an arrow 5230, the workflow returns back to the beginning of the Optimization Loop 5220.

Harmonization with data integrity functions is accomplished partly through a value-pricing mechanism designed to assure that the cost of preserving data on the ledger does not exceed the value of having preserved it. Value pricing may involve: value to the business, measured in the "business currency" of transaction value (data collected in a distinct transaction and its value); transaction groups, transactions, and sub-transactions may be considered; grouping may be by source, desired storage size, by type or by time; run rate forecasting of how much data is likely in a period and what its expected minimum and maximum value to the business might be. Business data by data source may include: valuation sources (sources which directly determine or report the value of an asset being described in the system; financial sources (sources which serve as inputs into valuations; operational sources (demonstrate its function and attractiveness); descriptive source (prove the assets continued existence); business data by data type (document, datafile, video); cost to the business, measured in the business currency; and/or preferences based on the costs and values of the business task being performed.

user intervention). Harmonization with data integrity functions is accomplished partly through a value-pricing mechanism designed to assure that the cost of preserving data on the ledger does not exceed the value of having preserved it. Value pricing involves: Value to the business, measured in the "business currency" of Transaction value (data collected in a distinct transaction and its value); Transaction groups, transactions, and sub-transactions may be considered; Grouping may be by source, desired storage size, by type or by time; Run rate forecasting of how much data is likely in a period and what its expected minimum and maximum value to the business might be. Business data by data source may include: Valuation Sources (sources which directly determine or report the value of an asset being described in the system; Financial Sources (sources which serve as inputs into valuations; Operational Sources (demonstrate its function and attractiveness); Descriptive Source (prove the assets continued existence); Business data by data type (document, datafile, video); Cost to the business, measured in the business currency; and/or Preferences based on the costs and values of the business task being performed.

Ledger-use rules may also be defined. The ledger-use rules Relate "Available Benefits" from Ledger Operations back to the desired value and budget. As such they begin with Ledger-Centric metrics (rather than business currency). The ledger-use rules, for example, may be any units and may specify minimum and/or maximum values for the below parameters:

| Ledger Usage Metric | Ledger Usage Target | Typical Ledger Usage Rule |
|---|---|---|
| 1.2.1 Available Benefits | | |
| Bandwidth | Data per second throughput | Target min/max |
| Uptime | Error free ops as a % of all time | Usually 99.999 (or additional 9s) |
| Trust | Blend of (1) chain sponsor (2) Chain participants (3) Chain diversity and durability | Min/Max Trust Quality Index |
| Consensus | Blend of (1) Method of Consensus (2) Consensus participants (3) Chain governance | Min/Max Consensus Quality Index |
| 1.2.2 Ledger Costs | | |
| Latency | Required wait time to know a transaction has been confirmed | Target min/max may be between milliseconds and 10,000 seconds (3 hours) based on latency alone (not, for example, batch creation) |
| Cost | Cost per block written | Expressed in chain-native "gas prices" (between "free" and the equivalent of 100 USD per transaction); Converted to "business currency" for decision making |

Multiple business rules may be defined. For purposes of governing data integrity, business rules may be defined as sequences and decisions that harmonize two or more business operations, data, tech, storage, legal, and other budgets, and/or data integrity functions (on and off ledger). Essentially these are the Business Benefits (top) and Business Costs (bottom) that guide how the system will accommodate business needs such as: Any user request (any transactional sequence performed by a user); Requests made from work-flows (predefined series of user transactions); and/or Requests made as part of automated workflows (no direct Ledger Rules may also contain pre-defined preferences (independent of price; but based on a ledger's generally understood operating characteristics. Ledger Fidelity Rules: which ledgers are relatively more suitable for writing relatively more (or more detailed) data. This focuses on the data's flow rate vs the ledger's ability to write quickly and without delays. Ledger Priority Rules (in what order of preference). Typically, a ranked list with the user's most-preferred ledgers (for whatever reason) prioritized for selection, ranked down to least preferred.

Ledger fidelity rules may also be defined. Specific ledgers may be given rules that prefer to select data from the total available on a spectrum of Full fidelity (prefer an exact copy), Random-Sampled (any random fraction greater than zero and less than one, typically between 0.01% and 50%), and/or Time-Sampled, such as one transaction per fractional second, second, minute, hour, day etc. Time-compressed (lossy compression that nonetheless can serve to validate an original value.

FIGS. 28-33 further illustrate the blockchain selection mechanism, according to exemplary embodiments. Here the blockchain selection mechanism may use decisional tables or other predetermined outcomes. For example, the blockchain selection application 40 may instruct the computer 20 to consult an electronic benefits database 150. The computer 20 may access and query the electronic benefits database 150 to determine the benefit 144, perhaps based on any of the importance 44 and value 46 of the electronic data 30, the blockchain network parameters 48, the ledger or blockchain preferences 50, the rules 52, the policies 54, and/or the budget 80. While the benefits database 150 is illustrated as being locally stored in the memory device 132 of the computer 20, the benefits database 150 may be remotely stored and accessed/queried at any networked location. Even though the benefits database 150 may have any logical structure, a relational database is perhaps easiest to understand. FIG. 29 thus illustrates the benefits database 150 as an electronic table 152 having entries that map, convert, or translate any of the inputs to the corresponding benefit 144. That is, the computer 20 may query the benefits database 150 for any query parameter (such as one, or any combination, of the importance 44 and value 46 of the electronic data 30, the blockchain network parameters 48, the ledger or blockchain preferences 50, the rules 52, the policies 54, and/or the budget 80). The computer 20 identifies the corresponding benefit 144 that is predetermined for the query parameter(s). The blockchain selection application 40 may then instruct the computer 20 to generate the blockchain ledger decision 42, perhaps based on the benefit 144.

Figure 30:
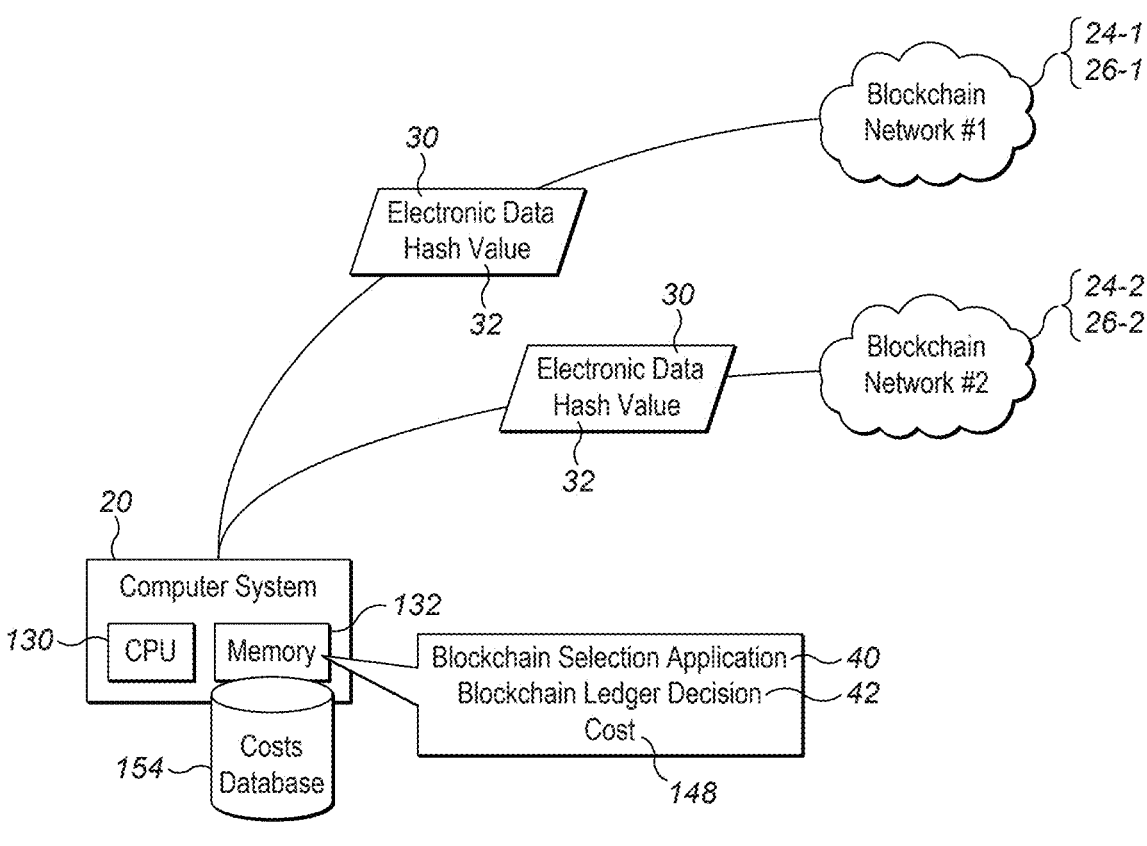

As FIGS. 30-31 illustrate, the blockchain selection mechanism may also utilize an electronic costs database 154. The blockchain selection application 40 may instruct the computer 20 to consult the electronic costs database 154 when determining the cost 148. The computer 20 may access and query the electronic costs database 154 to determine the cost 148, perhaps based on any of the importance 44 and value 46 of the electronic data 30, the blockchain network parameters 48, the ledger or blockchain preferences 50, the rules 52, the policies 54, and/or the budget 80. While the costs database 154 is illustrated as being locally stored in the memory device 132 of the computer 20, the costs database 154 may be remotely stored and accessed/queried at any networked location. Again, while the costs database 154 may have any logical structure, a relational database is perhaps easiest to understand. FIG. 31 thus illustrates the costs database 154 as an electronic table 156 having entries that map, convert, or translate any of the inputs to the corresponding cost 148. That is, the computer 20 may query the costs database 154 for any query parameter (such as one, or any combination, of the importance 44 and value 46 of the electronic data 30, the blockchain network parameters 48, the ledger or blockchain preferences 50, the rules 52, the policies 54, and/or the budget 80). The computer 20 identifies the corresponding cost entry value 148 that is predetermined for the query parameter(s). The blockchain selection application 40 may then instruct the computer 20 to generate the blockchain ledger decision 42, perhaps based on the cost 148.

Figure 32:
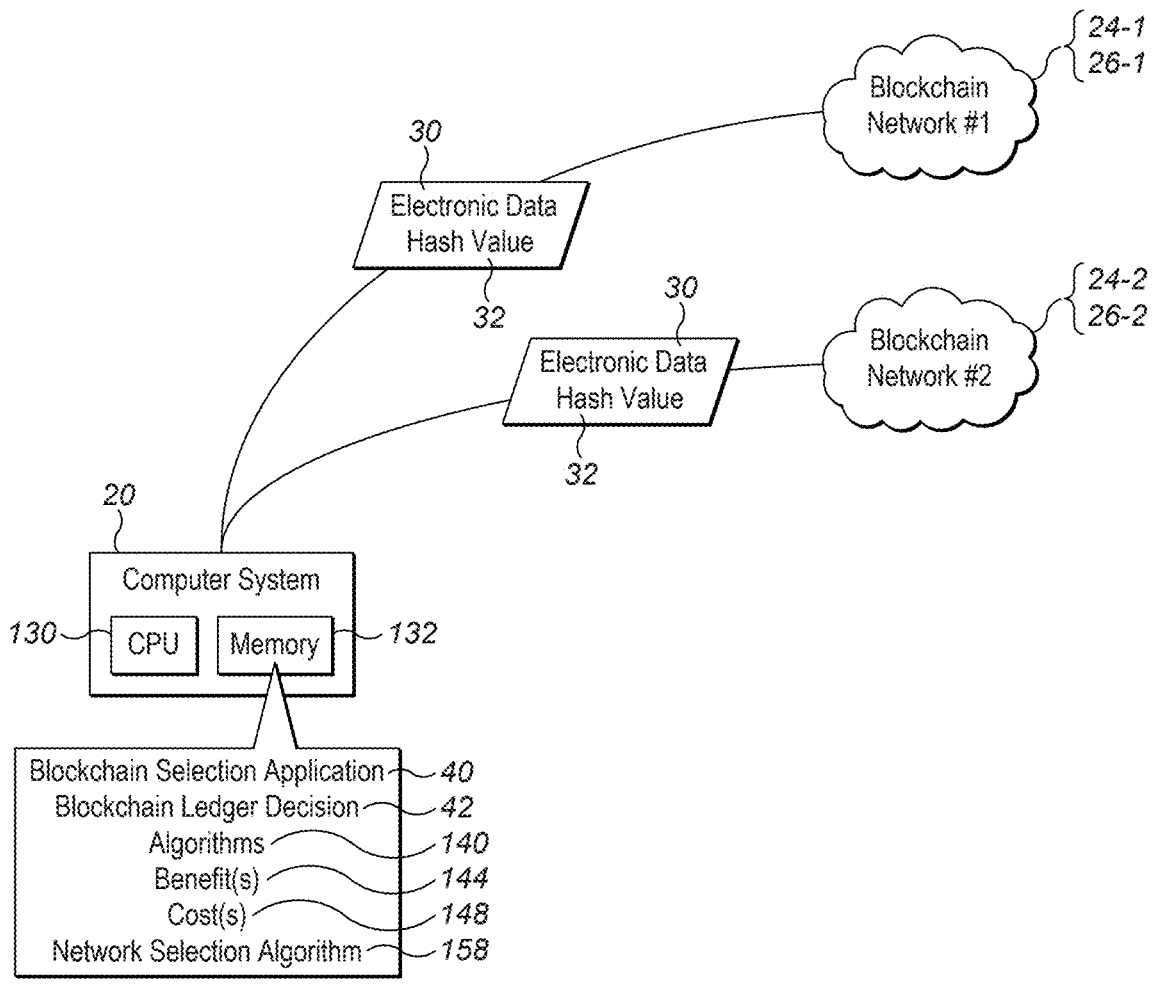

FIG. 32 illustrates a blockchain network selection algorithm 158. Once the computer 20 generates the benefit 144 and the cost 148 (whether using the functions 142 and 146 and/or the predetermined databases 150 and 154, as above explained), the blockchain selection application 40 may instruct the computer 20 to call, access, or execute the blockchain network selection algorithm 158. The blockchain network selection algorithm 158 may be coded, programmed, or tailored to implement a decisional strategy or operation, perhaps based on the benefit 144 and the cost 148. That is, the blockchain network selection algorithm 158 may accept the benefit 144 and/or the cost 148 as inputs. The blockchain network selection algorithm 158 may then determine or calculate the blockchain ledger decision 42 as an output, perhaps based on the inputs. The blockchain network selection algorithm 158 helps determine which of the multiple blockchain networks 24, and/or the multiple blockchain service providers 26, has/have lower costs, greater performance, reduced timing, or higher quality metrics.

Figure 33:
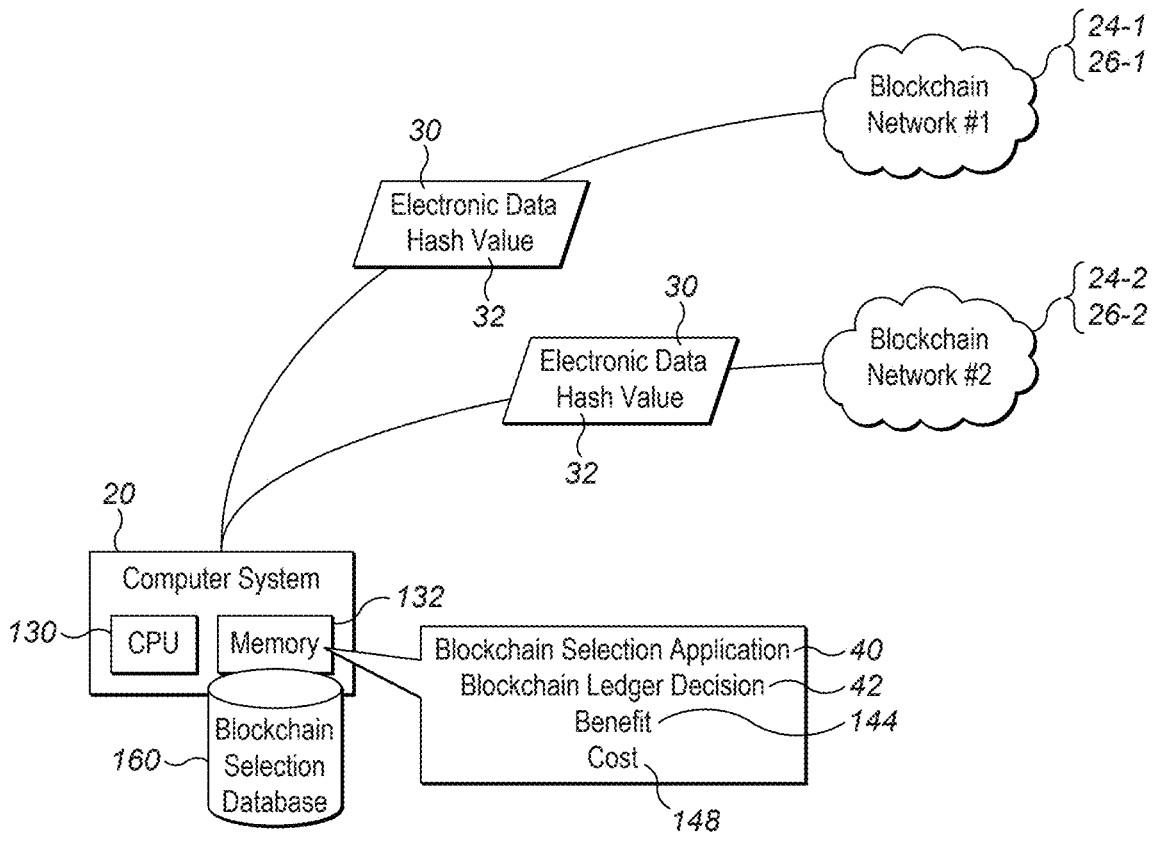
Figure 34:
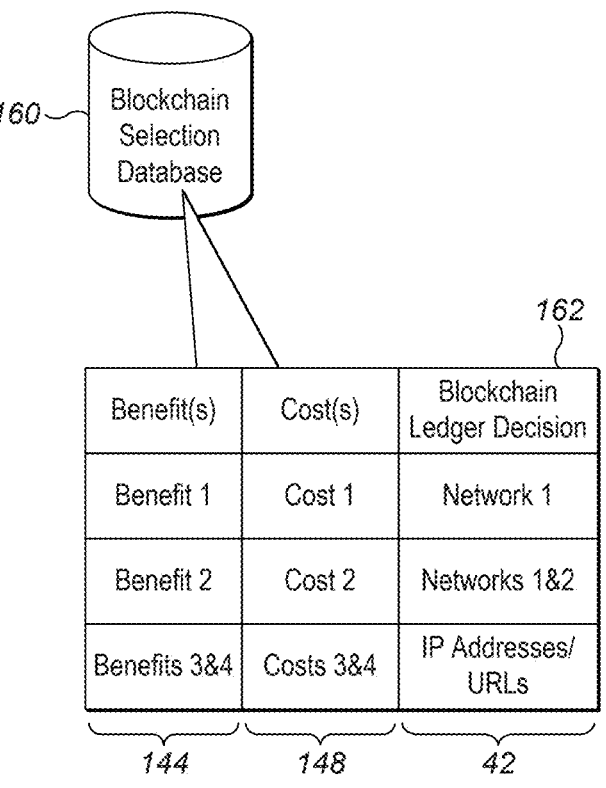

FIGS. 33-34 illustrate predetermined outcomes, according to exemplary embodiments. Once the blockchain selection application 40 determines or identifies the benefit 144 and the cost(s) 148 (as above explained), the blockchain selection application 40 may instruct the computer 20 to consult an electronic blockchain selection database 160. The blockchain selection database 160 contains predetermined blockchain network selections, perhaps based on the benefit(s) 144 and the cost(s) 148. That is, whether the blockchain selection application 40 implements the benefits function 142, the cost function 146, the benefits database 150, and/or the costs database 154, the blockchain selection mechanism may further utilize the blockchain selection database 160. The computer 20 may access and query the electronic blockchain selection database 160 to determine which of the multiple blockchain networks 24, and/or the multiple blockchain service providers 26, is best suited for writing the electronic data 30. While FIG. 33 illustrates the blockchain selection database 160 locally stored in the memory device 132 of the computer 20, the blockchain selection database 160 may be remotely stored and accessed/queried at any networked location. Again, while the blockchain selection database 160 may have any logical structure, FIG. 34 illustrates a simple relational database table 162 having entries that map, convert, or translate any of the benefits 144 and the costs 148 to the corresponding blockchain ledger decision 42. That is, the computer 20 may query the blockchain selection database 160 for any query parameter (such as one, or any combination, of the benefits 144 and the costs 148). The computer 20 identifies the corresponding blockchain ledger decision 42 that is predetermined for the query parameter(s). Exemplary embodiments may thus use predetermined selections (e.g., IP addresses, URLs, or other network destination identifiers), perhaps based on the benefit(s) 144 and the cost(s) 148. The blockchain selection application 40 may then instruct the computer 20 to send the electronic data 30, and/or its representative hash values 32, to the one or multiple blockchain networks 24 and/or blockchain service providers 26.

Figure 35:
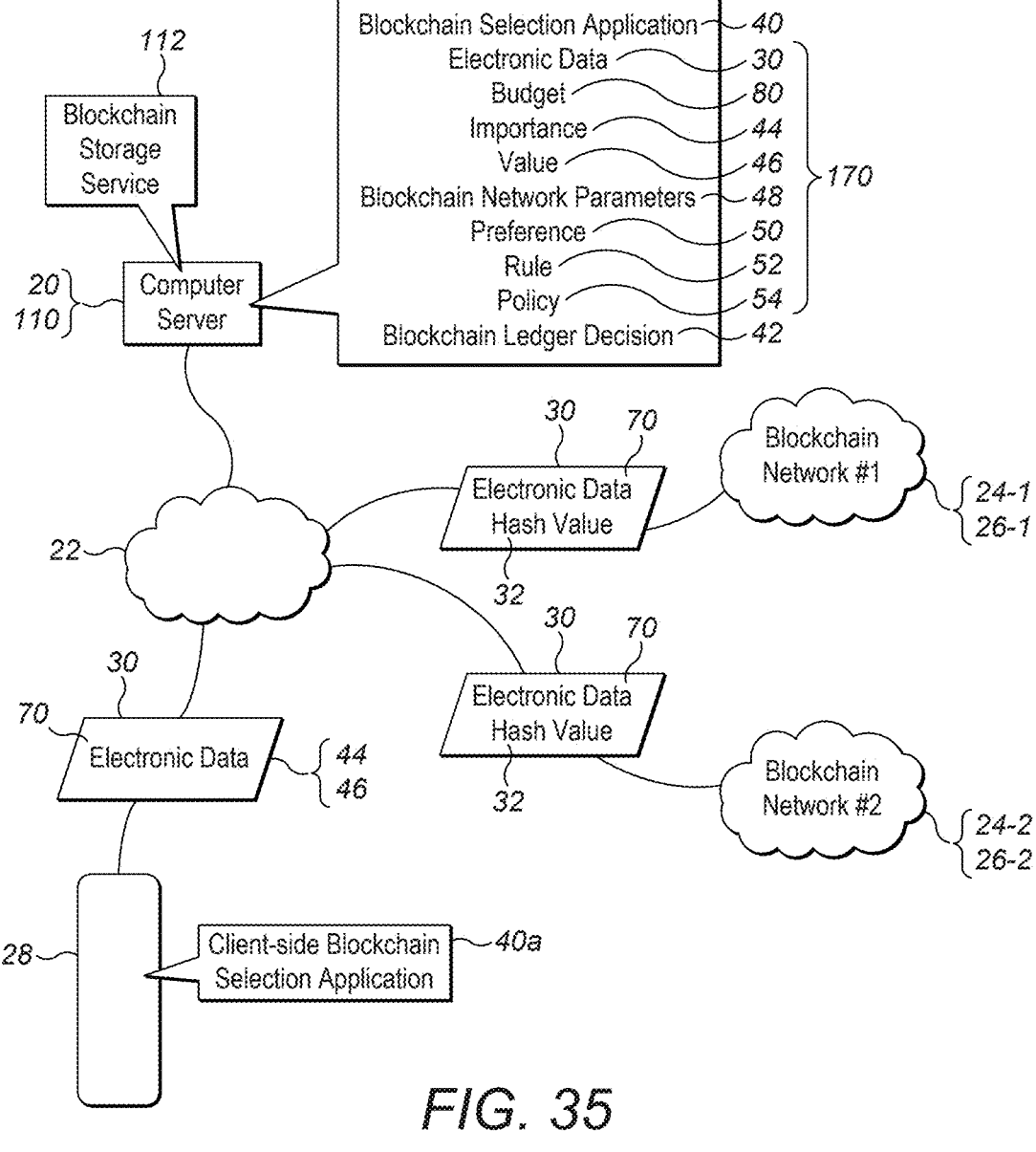
FIGS. 35-36 illustrate automated selection activation mechanisms, according to exemplary embodiments.
Figure 36:
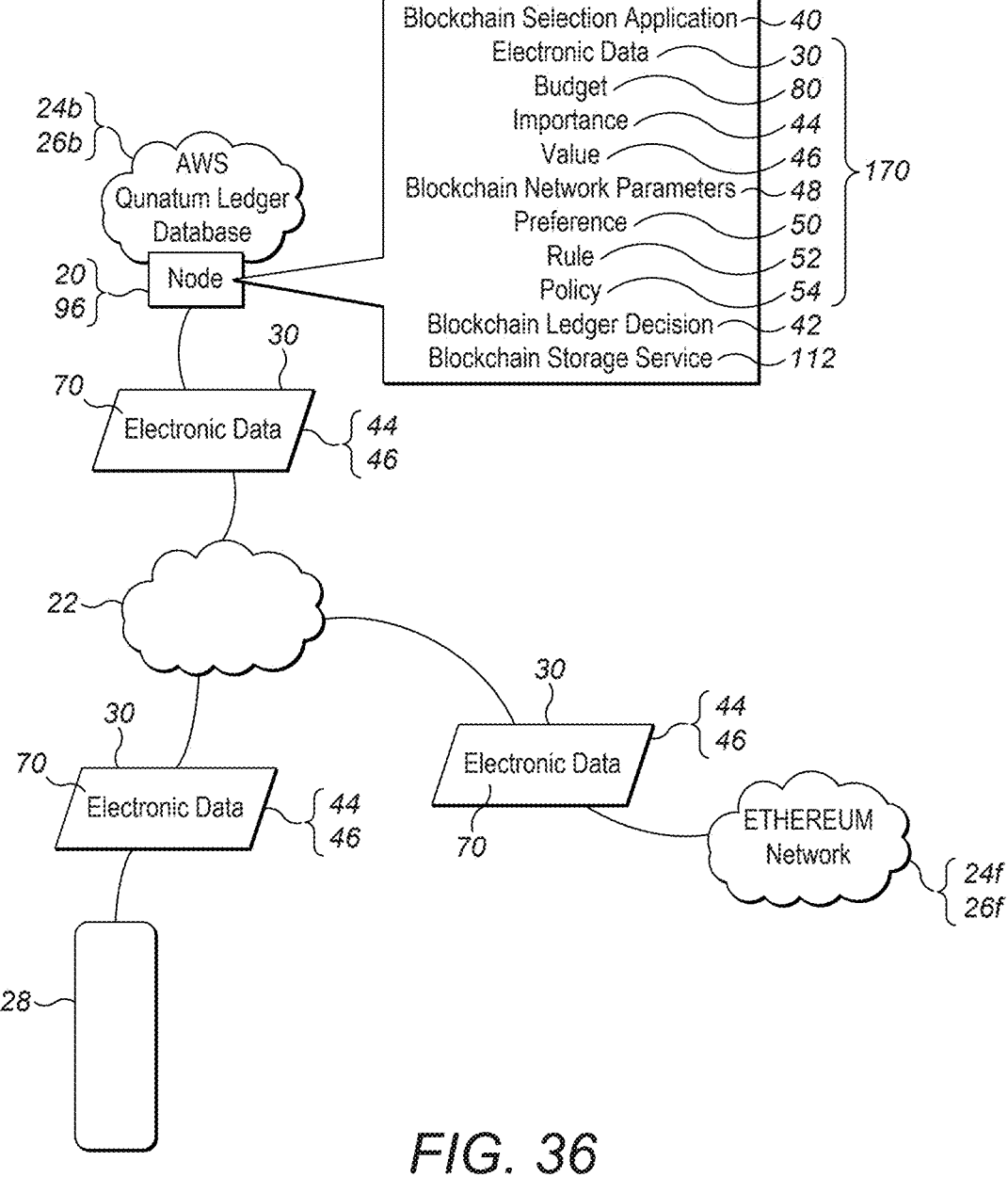

FIGS. 35-36 illustrate automated selection activation mechanisms, according to exemplary embodiments. The importance 44 and value 46 of the electronic data 30 likely determines its achievability. The blockchain selection application 40, and/or the blockchain backup service 112, may use the importance 44 and value 46 of the electronic data 30 to implement the blockchain ledger decision 42. For example, FIG. 35 illustrates the electronic data 30 self-specifying its corresponding importance 44 and value 46. That is, when the computer 20 (such as the server 110) receives the electronic data 30, the server 110 may packet inspect for the importance 44 and/or value 46. The electronic data 30 may additionally or alternatively specify its corresponding importance 44 and value 46. The importance 44 and value 46, for example, may be a parameter, data field, or bit value included in a header or body of a data packet. The importance 44 and value 46 may additionally or alternatively be the metadata 70 that is descriptively added to the electronic data 30. The importance 44 and value 46 may additionally or alternatively be a format parameter or value, a unique file extension, or component. The importance 44 and value 46 may be added, configured, or included by a client-side version of the blockchain selection application (illustrated as reference numeral 40a). The client-side version of the blockchain selection application 40a may be downloaded by clients of the server 110 and/or the blockchain backup service 112. The client-side version of the blockchain selection application 40a includes programming code that interfaces with the server-side blockchain selection application 40 in a client/server relationship to archive the electronic data 30. The client device (such as the smartphone 28) may thus send the electronic data 30 to the network address (e.g., IP address or URL) associated with the server 110 and/or the blockchain backup service 112. When the server 110 receives the electronic data 30, the server-side blockchain selection application 40 instructs or causes the server 110 to read the importance 44 and value 46 specified by the electronic data 30. The server 110 may then duplicate the electronic data 30 and provide the blockchain backup service 112 that archives the duplicate copy of the electronic data 30, based at least in part on the importance 44 and value 46.

Customer or client profiling may be used. Because the server 110 may have many client devices, the server 110 may provide the blockchain backup service 112 to its client-customers. The server 110 may thus access a client profile 170 that is established or configured for the user of the client device (such as the smartphone 28). The client profile 170 stores, maintains, or specifies values, settings, or other configuration parameters representing the user's/device's unique service settings (e.g., importance 44 and value 46 of the electronic data 30, the blockchain network parameters 48, the ledger or blockchain preferences 50, the rules 52, the policies 54, and/or the budget 80). The server-side blockchain selection application 40 may instruct or cause the server 110 to generate the blockchain ledger decision 42 (perhaps based on the importance 44 and value 46 of the electronic data 30, the ledger or blockchain preferences 50, the rules 52, the policies 54, and/or the budget 80, as this disclosure above explained). Once the computer server 110 generates the blockchain ledger decision 42, the computer server 110 may then send or forward the electronic data 30 (and/or its representative hash value(s) 32 and/or the metadata 70) to the selected blockchain network(s) 24 and/or service provider(s) 26. The server 110 may then initiate or authorize a compensation for providing the blockchain backup service 112 (such as processing a cryptocoinage or credit card transaction, perhaps according to the budget 80). The blockchain backup service 112 may thus reduce the client's processor and memory storage burdens.

FIG. 36 illustrates automated blockchain activation. Here again any blockchain network 24 may manage redundant rewrites to another, and perhaps different, blockchain. FIG.

35, for example, illustrates the user's smartphone 28 sending her electronic data 30 (and/or its representative hash value(s) 32) to the first blockchain network (such as Amazon's Quantum Ledger Database 24b and 26b). The smartphone 28 may store and execute the client-side version of the blockchain selection application 40a, which may request that Amazon's Quantum Ledger Database 24b and 26b duplicatively/redundantly write the electronic data 30 to the QUANTUM LEDGER® blockchain. When the computer 20 (illustrated as the blockchain node 96) receives the electronic data 30, the blockchain node 96 may itself duplicate the electronic data 30 and add, write, or otherwise record the duplicate copy/copies to the QUANTUM LEDGER® blockchain. The blockchain node 96 may also add, write, or otherwise record the importance 44, the value 46, and/or the metadata 70 to the QUANTUM LEDGER® blockchain. The first blockchain network (such as Amazon's Quantum Ledger Database 24b and 26b) may thus specify the importance 44 and value 46 associated with the electronic data 30 for all processing devices to read and to process. The blockchain node 96, additionally or alternatively, command or instruct another networked node or device to write the electronic data 30, and its importance 44 and value 46, to the QUANTUM LEDGER® blockchain.

The blockchain backup service 112 may also be provided. Even though the electronic data 30 is stored to the first blockchain network (such as Amazon's Quantum Ledger Database 24b and 26b), the blockchain backup service 112 may also redundantly rewrite the electronic data 30 to a second blockchain network 24 or service provider 26. While any blockchain or service may be selected, FIG. 36 illustrates the ETHEREUM® blockchain 24f and 26f. Amazon's blockchain node 96, in other words, may perform the blockchain backup service 112 on behalf of clients (such as the smartphone 28). When Amazon's blockchain node 96 receives or processes the electronic data 30, and/or any portion of the QUANTUM LEDGER® blockchain, the server-side blockchain selection application 40 instructs or causes the blockchain node 96 to read the importance 44 and value 46 specified by the electronic data 30 and/or the QUANTUM LEDGER® blockchain. The blockchain node 96 may then provide the blockchain backup service 112 that archives the electronic data 30 (and perhaps the metadata 70), perhaps according to the client profile 170 that is established or configured for the user of the client device (such as the smartphone 28). The QUANTUM LEDGER® blockchain node 96 selects the ETHEREUM® blockchain network 24f/26f for redundant storage and rewrites of the electronic data 30.

Figure 37:
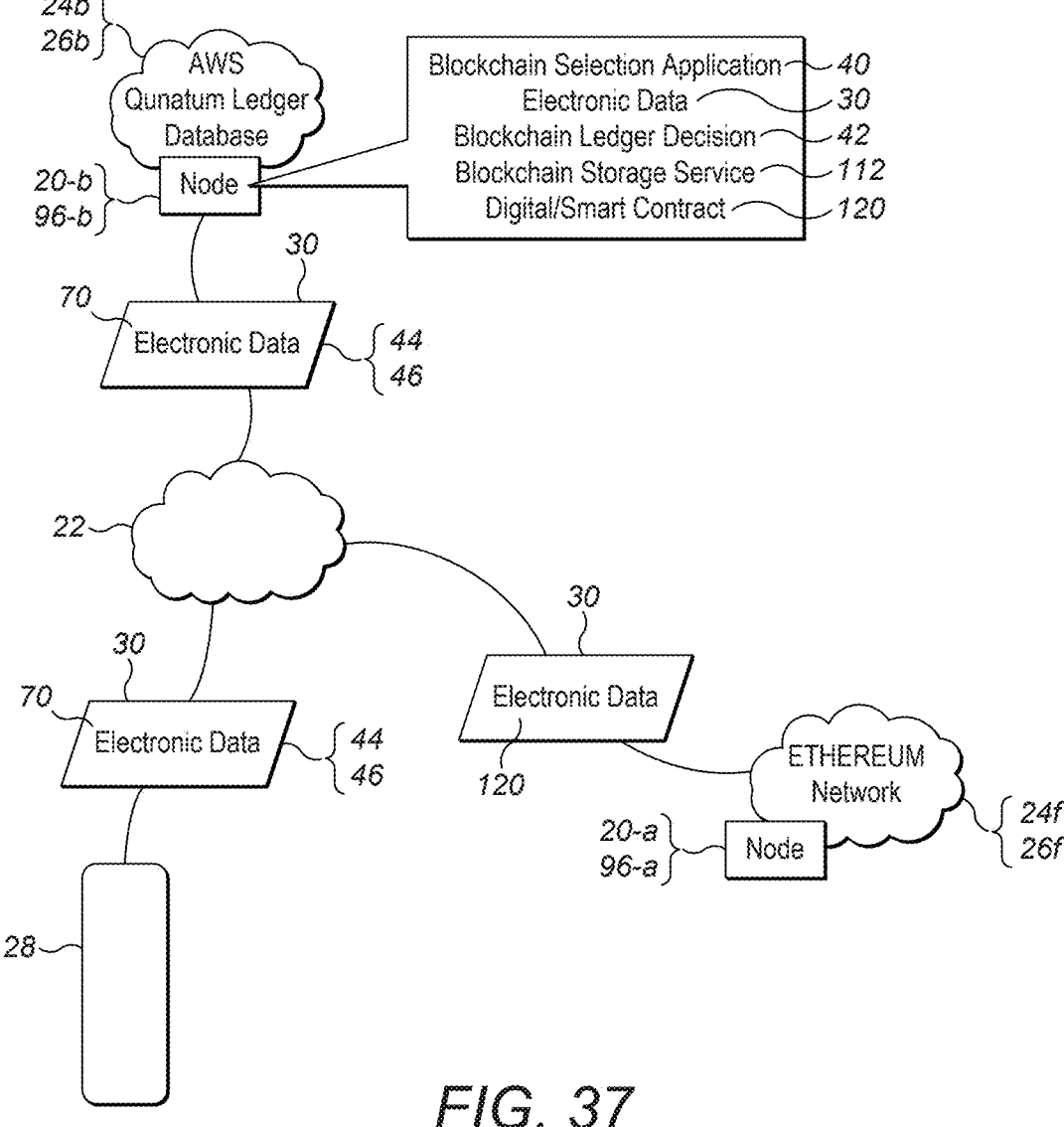
FIG. 37 illustrates a smart contract solution, according to exemplary embodiments.

FIG. 37 illustrates a smart contract solution, according to exemplary embodiments. The client device (such as the smartphone 28) may send the electronic data 30 to the first blockchain network (such as Amazon's Quantum Ledger Database 24b and 26b). The client device sends the electronic data 30 to the network address (e.g., IP address or URL) associated with the first blockchain network (such as the blockchain node 96 and/or the blockchain backup service 112). When the blockchain node 96 receives the electronic data 30, the blockchain node 96 reads the corresponding importance 44 and value 46 (perhaps as the metadata 70). The blockchain node 96 may write the electronic data 30, perhaps including its corresponding importance 44 and value 46 (perhaps as the metadata 70), to the first blockchain network (such as the Amazon's Quantum Ledger Database 24b and 26b). The blockchain node 96 may then authorize the blockchain backup service 112 (perhaps based on the profile 170, as above explained). When the blockchain backup service 112 is required, the blockchain selection application 40 may order or command the node 96 to forward the electronic data 40 to the second blockchain network (illustrated as the ETHEREUM® blockchain 24f and 26f). The blockchain selection application 40 may additionally or alternatively order or command the node 96 to send the digital or smart contract 120 to the ETHEREUM® blockchain 24f and 26f). The blockchain selection application 40 may thus select, retrieve, and send the digital or smart contract 120 that is responsible for blockchain data backups. The electronic data 40 and the digital or smart contract 120 convey via the communications network 22 to a network address associated with the ETHEREUM® blockchain 24f and 26f. When the ETHEREUM® blockchain 24f and 26f receives electronic data 40 and the digital or smart contract 120, any component (such as blockchain node 96-b) reads and executes the digital contract 120 to redundantly write the electronic data 20 to the digital contract 120 conveyed via the communications network 22 to a network address associated with the ETHEREUM® blockchain 24f and 26f.

Figure 38:
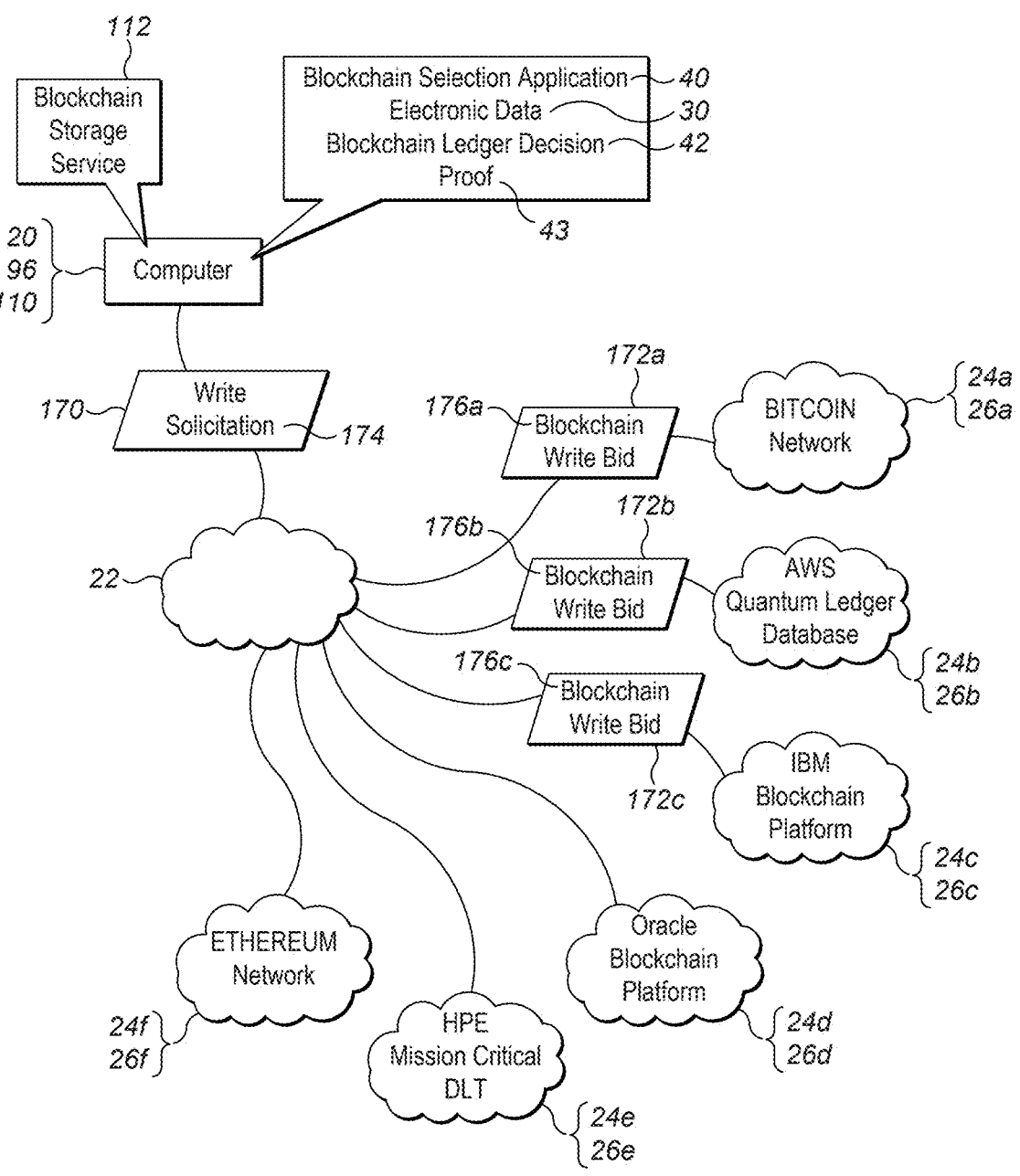
FIG. 38 illustrates blockchain bids, according to exemplary embodiments.
Figure 39:
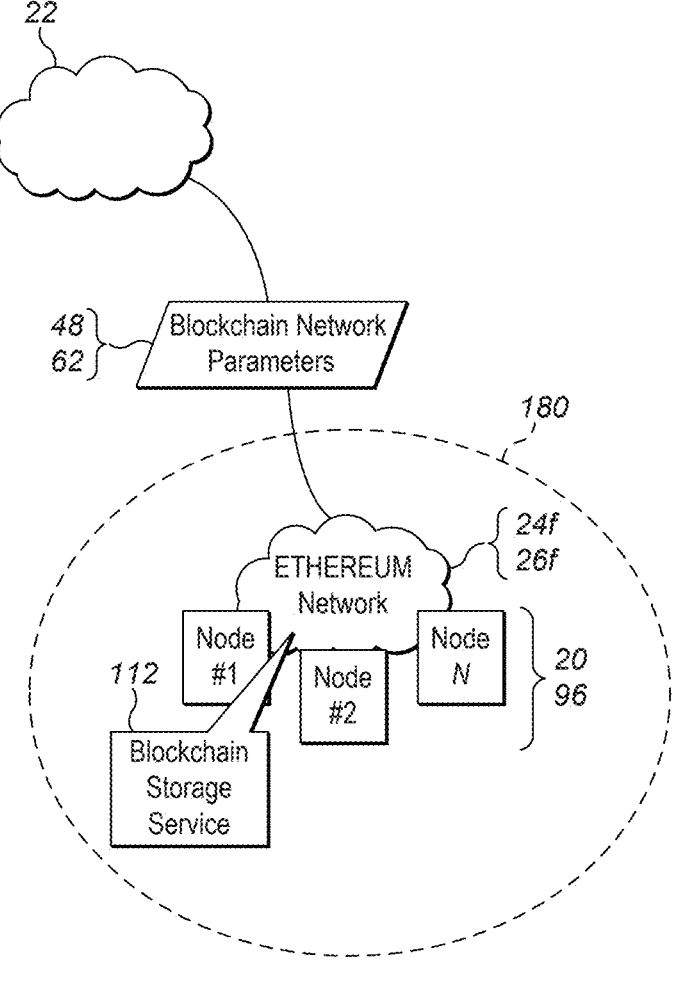
FIGS. 39-43 illustrate blockchain communities, according to exemplary embodiments.

FIG. 38 illustrates blockchain bids, according to exemplary embodiments. Here the multiple blockchain networks 24 and service providers 26 may compete for write opportunities. That is, when the computer 20 (such as the blockchain node 96 or the server 110) determines that the electronic data 30 should be backed-up and redundantly written, the blockchain selection application 40 may instruct the computer 20 to solicit blockchain write bids 170. The computer 20 sends write solicitations 170 to the blockchain networks 24, and each write solicitation 170 informs the blockchain network 24 of the need to write the electronic data 30. The write solicitation 170 may include write parameters or objectives (such as a required write time or latency, the prohibition 72, the nodal locations 74, the budget 80, and/or the blockchain nodal performance thresholds 98). Each blockchain network 24 or service provider 26 inspects the write solicitation 170 and generates its corresponding proposal for writing the electronic data 30, according to the write parameters and/or objectives specified by the write solicitation 170. Those blockchain networks 24 or service providers 26 that wish to compete generate and send their respective blockchain write bids 172. The computer 20 collects the responsive blockchain write bids 172. The blockchain selection application 40 then instructs the computer 20 to generate the blockchain ledger decision 42, perhaps by considering, weighing, or comparing the blockchain write bids 172. The blockchain selection application 40 may then instruct the computer 20 to generate the cryptographic proof 43. The blockchain selection application 40 may thus dynamically solicit write opportunities to further drive down costs, and perhaps increase quality and timing, of any blockchain data backup transfer.

The blockchain selection application 40 may compare the blockchain write bids 172. When the blockchain selection application 40 sends the write solicitations 170, the write solicitation 170 may include a data transfer specification 174 that specifies any personal, business, performance, governmental, and/or political objectives for data transfers. Should any blockchain 24/26 respond with their respective blockchain write bids 172, the responsive blockchain 24/26 may include or specify their respective mining plan 176. Each mining plan 176 specifies how the user's electronic data 30 will be blockchain recorded, according to the data transfer specification 174. The mining plan 176, in other words, specifies how the blockchain network 24, and/or the service provider 26, will write the electronic data 30 in compliance with the data transfer specification 174. The mining plan 176, for example, may specify or identify the blockchain nodes 96 that will process, mine, and/or write the electronic data 30. As a familiar example, recall that the electronic data 30 may have jurisdictional, geographical, and/or nodal restraints (as explained with reference to FIGS. 8-10). The mining plan 176 may thus list the locations and/or IP addresses associated with the blockchain nodes 96 that will receive, read, write, touch, or transfer the electronic data 30. As another example, the mining plan 176 may specify or identify the blockchain nodes 96 that will process any part, component, or programming statement of the digital contract 120. The blockchain selection application 40 may thus evaluate the different mining plans 176 when generating the blockchain ledger decision 42. The blockchain selection application 40 may then instruct the computer 20 to generate the cryptographic proof 43.

FIGS. 39-43 illustrate blockchain communities, according to exemplary embodiments. This disclosure above explained how the multiple blockchain network(s) 24 and/or the multiple blockchain service provider(s) 26 may report their respective blockchain "weather" forecasts 62. That is, each blockchain network 24 and/or blockchain service provider 26 may broadcast or send their corresponding cost(s), performance, timing, quality, and other blockchain network parameters 48. Each blockchain network 24 and/or blockchain service provider 26 may mandate a uniform, monolithic blockchain weather forecast 62 for all blockchain nodes 96. As a simple example, the ETHEREUM® blockchain 24f/26f may implement a management scheme in which all participating blockchain nodes 96 operate as a monolithic ledger community 180. Every blockchain node 96 thus reports, and operates according to, a network-wide, centrally-specified blockchain network parameters 48, regardless of any individual node's cost, performance, or other metric capabilities. The ETHEREUM® blockchain 24f and 26f, in other words, may command or decree that every blockchain node 96 be exclusively affiliated with the ETHEREUM® ledger community 180, such that each blockchain node 96 adheres to a consistent operating scheme and structure.

Figure 40:
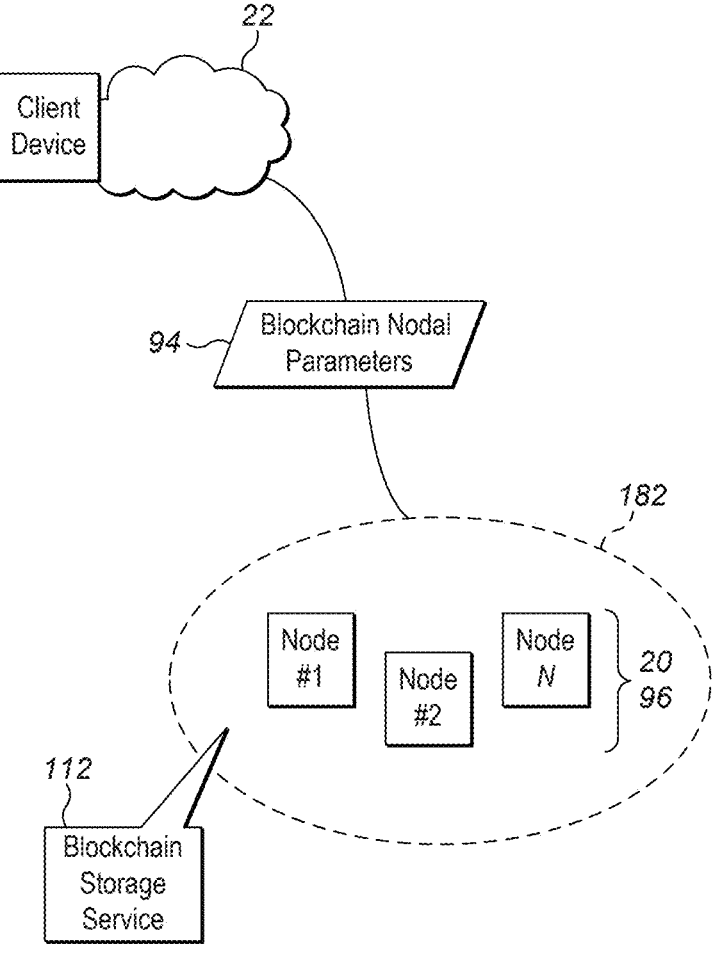

FIG. 40, though, illustrates a blockchain nodal community 182. Here individual blockchain nodes 96 may band together, perhaps ad hoc, and offer the blockchain storage services 112. The individual blockchain nodes (illustrated as reference numerals 96-1 through 96-N) may thus independently establish their cost(s), performance, timing, quality, and other blockchain nodal parameters 48. The number of members in the blockchain nodal community 182 may be one (1), a few, or many depending on membership requirements, business opportunities, and any other factors. A single blockchain node 96, for example, may operate solo and compete for blockchain writes (e.g., individually submitting the blockchain write bid 172 explained with reference to FIG. 38). Several blockchain nodes 96, however, may ally and agree to pool their blockchain resources as the blockchain nodal community 182. The blockchain nodal community 182 may thus agree to their overall operating scheme and structure and report their community's cost(s), performance, timing, quality, and other blockchain nodal parameters 94 (as explained with reference to FIG. 14). Clients may poll the blockchain nodal community 182, and the blockchain nodal community 182 may compete for blockchain writes (e.g., submitting the community's blockchain write bid 172).

Figure 41:
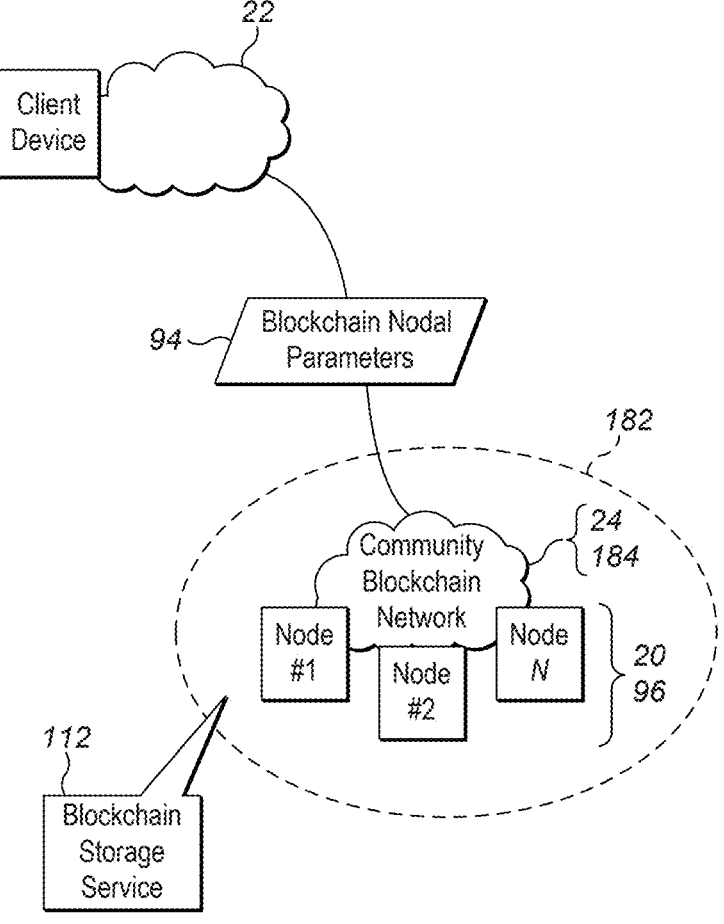

FIG. 41 illustrates a community blockchain 184. As the blockchain nodal community 182 may compete for blockchain writes, the blockchain nodal community 182 may write to their nodal or community blockchain 184. The blockchain nodal community 182 may thus offer their community's blockchain storage services 112 to their own, community blockchain 184. The blockchain nodes 96-1 through 96-N may thus compete, as the blockchain nodal community 182, for blockchain writes (e.g., submitting the community's blockchain write bid 172). The blockchain nodal community 182 thus forms or establishes their community blockchain network 24 and writes client data to the community blockchain 184.

Figure 42:
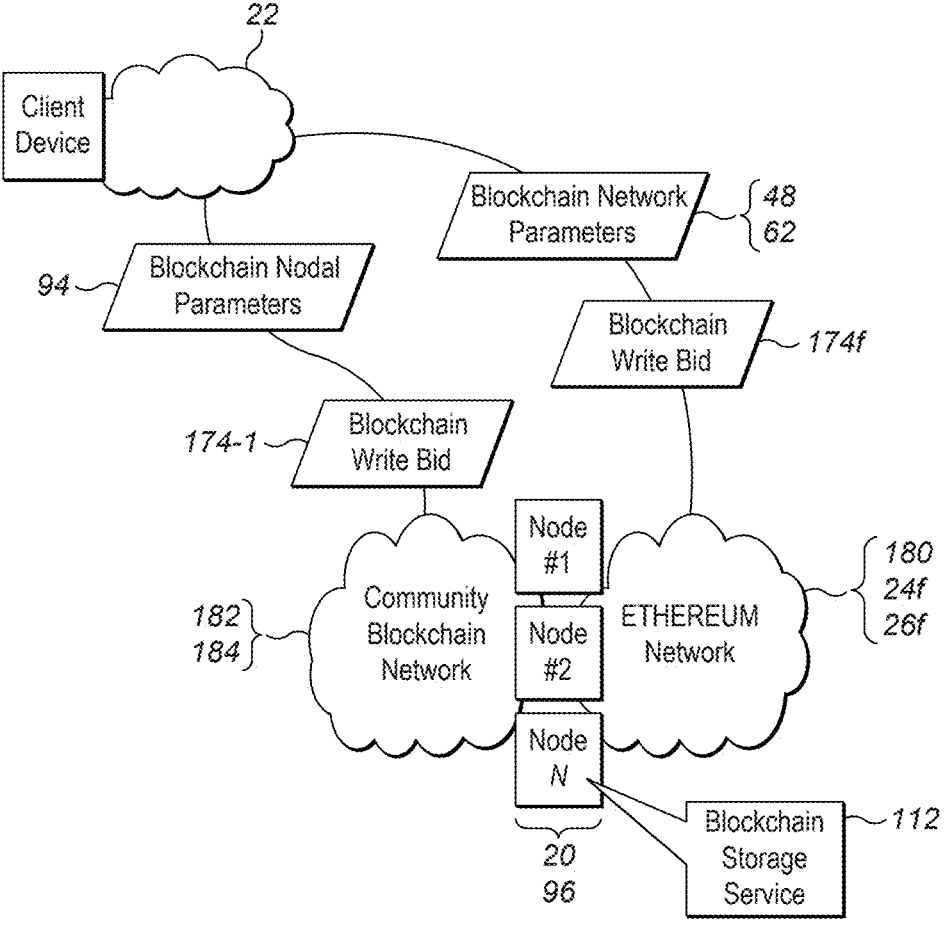

FIG. 42 illustrates non-exclusive blockchain writes. Here the blockchain nodes 96 may "double dip" and conduct write side-gigs. That is, the blockchain nodes 96 may be members of the monolithic ledger community 180 (illustrated as the ETHEREUM® blockchain 24f and 26f). However, some of the blockchain nodes 96 may also be members of the blockchain nodal community 182. Any of the blockchain nodes 96, in other words, may simultaneously serve, mine, and/or process multiple blockchains (e.g., the ETHEREUM® blockchain 24f/26f and the community blockchain 184). The monolithic ledger community 180 may thus permit some or all of its blockchain nodes 96 to offer the blockchain storage service 112 in a non-exclusive arrangement. Simply put, for whatever reason(s), the ETHEREUM® blockchain 24f/26f may permit its blockchain nodes 96 to compete against the mothership. The blockchain node 96 may thus bid and report the blockchain network parameters 48 (the blockchain weather forecast 62) specified by the monolithic ledger community 180 (e.g., the ETHEREUM® blockchain 24f/26f). The blockchain node 96, however, may also bid and report the blockchain nodal parameters 94 for its competing blockchain nodal community 182. Clients may thus compare different and competing blockchain write proposals, even though sent from or involving the multi-chainal blockchain nodes 96 (e.g., the blockchain write bid 172f prepared or authorized by the ETHEREUM® blockchain 24f/26f and the blockchain write bid 172-1 prepared or authorized by the blockchain nodal community 182).

Performance and capacity are examples. Some blockchain nodes 96 may have faster hardware processor cycles, greater RAM or system memory (in bytes), better/faster software programming, or any other performance capabilities. Simply put, some blockchain nodes 96 have a greater capacity and may process more blockchain transactions than other nodes. These better-performing blockchain nodes 96 may wish to band together to win more business. Conversely, lesser performing blockchain nodes may find it advantageous to ally with others to win more blockchain writes. Whatever the reasons or objectives, any individual blockchain nodes (illustrated as reference numerals 96-1 through 96-N) may advertise, broadcast, or solicit their cost(s), performance, timing, quality, and other blockchain nodal parameters 48. The blockchain nodes 96 may discover each other's capabilities and join any blockchain nodal community 182. Because a node 96 may process or mine multiple blockchains, any node 96 may dynamically evaluate any requested blockchain transaction and select the blockchain nodal community 182 offering the best terms (e.g., profit, cost, quality, timing).

Exemplary embodiments may thus include sub-blockchaining. Any of the blockchain nodes 96 may simultaneously serve, mine, and/or process multiple blockchains. The blockchain nodes 96 may mine and/or process the monolithic blockchain (such as ETHEREUM® blockchain 24f/26f). The same blockchain nodes 96, however, may also serve, mine, and/or process the community blockchain 184. The community blockchain 184 may thus be wholly separate and different from the monolithic blockchain. In practice, though, the monolithic ledger community 180 may permit sub-chaining. That is, the community blockchain 184 may be a sub-blockchain to the monolithic ETHEREUM® blockchain 24f/26f. The rules, regulations, and/or specifications for participating in the ETHEREUM® blockchain 24f/26f permit the blockchain nodal community 182 to offer and operate the (perhaps) competing community blockchain network 24. Yet, the community blockchain network 24 may still be required to conform to whatever rules, regulations, and/or specifications that are established by the monolithic blockchain (the ETHEREUM® blockchain 24f/26f). Again, for whatever reason(s), the ETHEREUM® blockchain 24f/26f may permit its blockchain nodes 96 to compete against the mothership.

Figure 43:
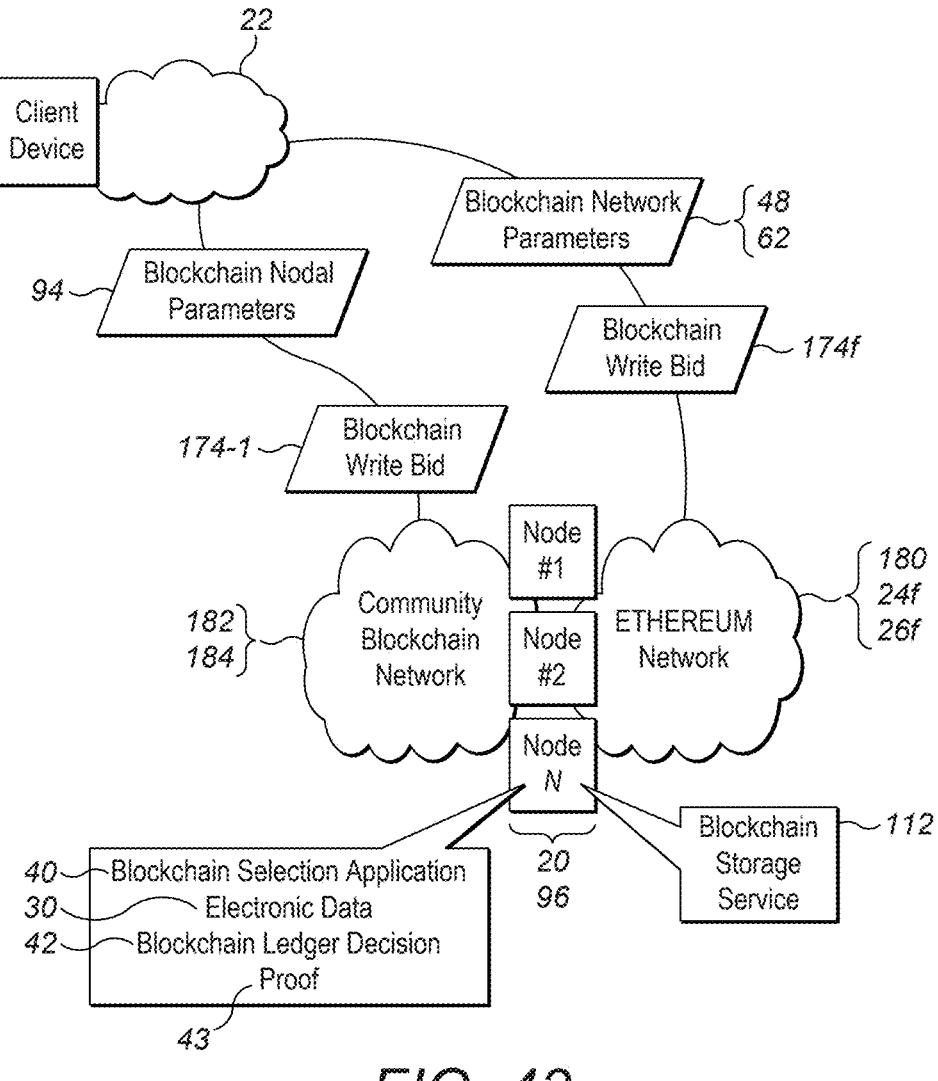

FIG. 43 illustrates automated selection. Because the blockchain node 96 may be a "master" miner and simultaneously serve, mine, and/or process multiple blockchains, the blockchain node 96 may select between the monolithic blockchain (the ETHEREUM® blockchain 24f/26f) and the community blockchain network 24. The computer 20 (such as the blockchain node 96) may store and execute the blockchain selection application 40. The blockchain selection application 40 causes the blockchain node 96 to evaluate the electronic data 30, the blockchain network parameters 48 (the blockchain weather forecast 62) specified by the monolithic ledger community 180 (e.g., the ETHEREUM® blockchain 24f/26f), and the blockchain nodal parameters 94 for the blockchain nodal community 182. The blockchain selection application 40 may also cause the blockchain node 96 to evaluate the importance 44 and value 46 of the electronic data 30, the ledger or blockchain preferences 50, the rules 52, the policies 54, and/or the budget 80, as this disclosure above explained). The blockchain node 96 generates the blockchain ledger decision 42 that chooses or selects between the monolithic blockchain (the ETIHEREUM® blockchain 24f/26f) and the community blockchain network 24. Once the blockchain node 96 generates the blockchain ledger decision 42, the blockchain node 96 may then write the electronic data 30 to the selected blockchain. The blockchain node 96 may also generate the cryptographic proof 43 that documents the blockchain write operation. The blockchain node 96 may thus be polled and report different answers, depending on its self-analysis of the cost, quality, timing, and other metrics provided by its monolithic blockchain and its blockchain nodal community 182.

Figure 44:
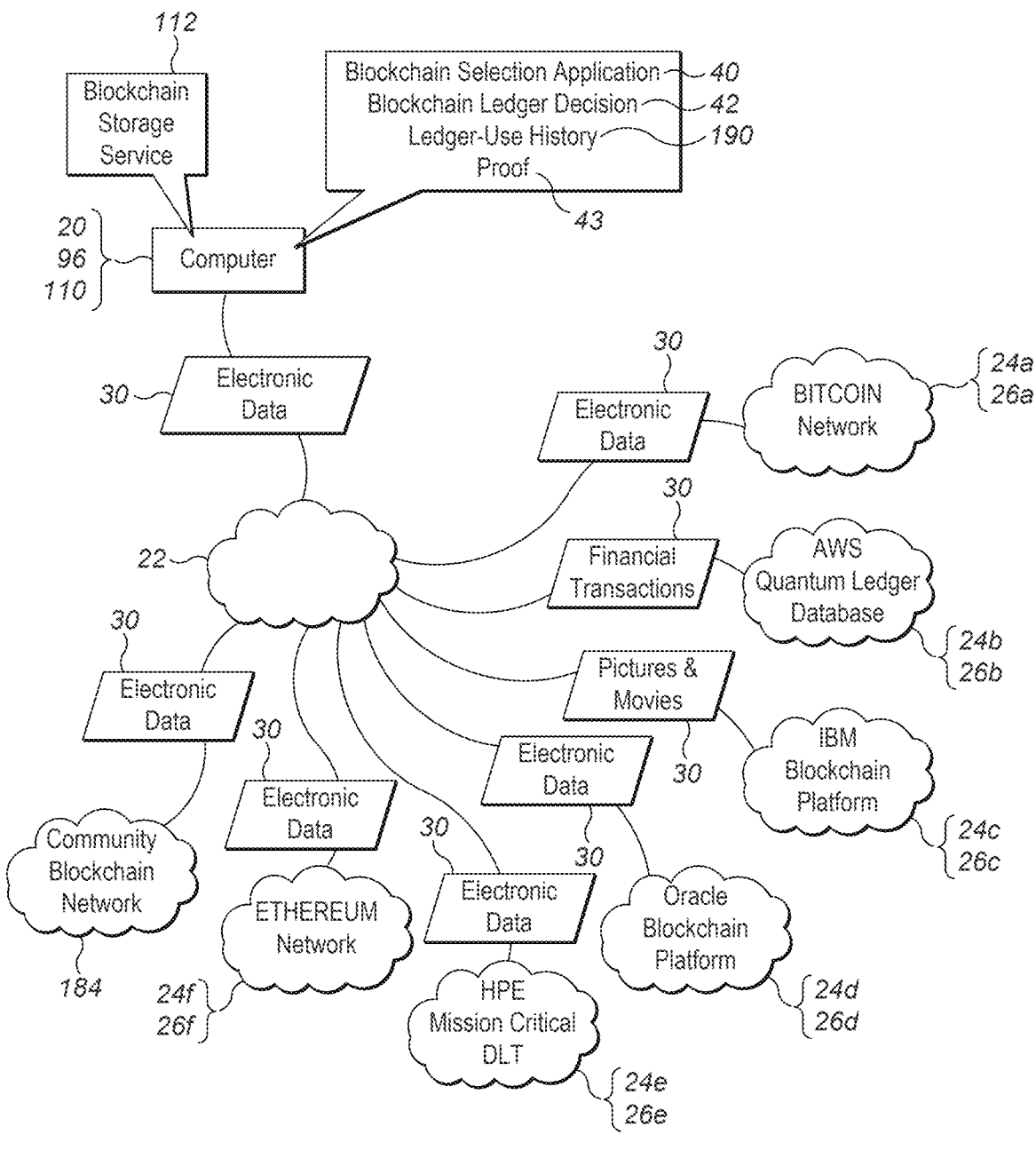
FIGS. 44-46 illustrate a ledger-use history, according to exemplary embodiments.
Figure 45:
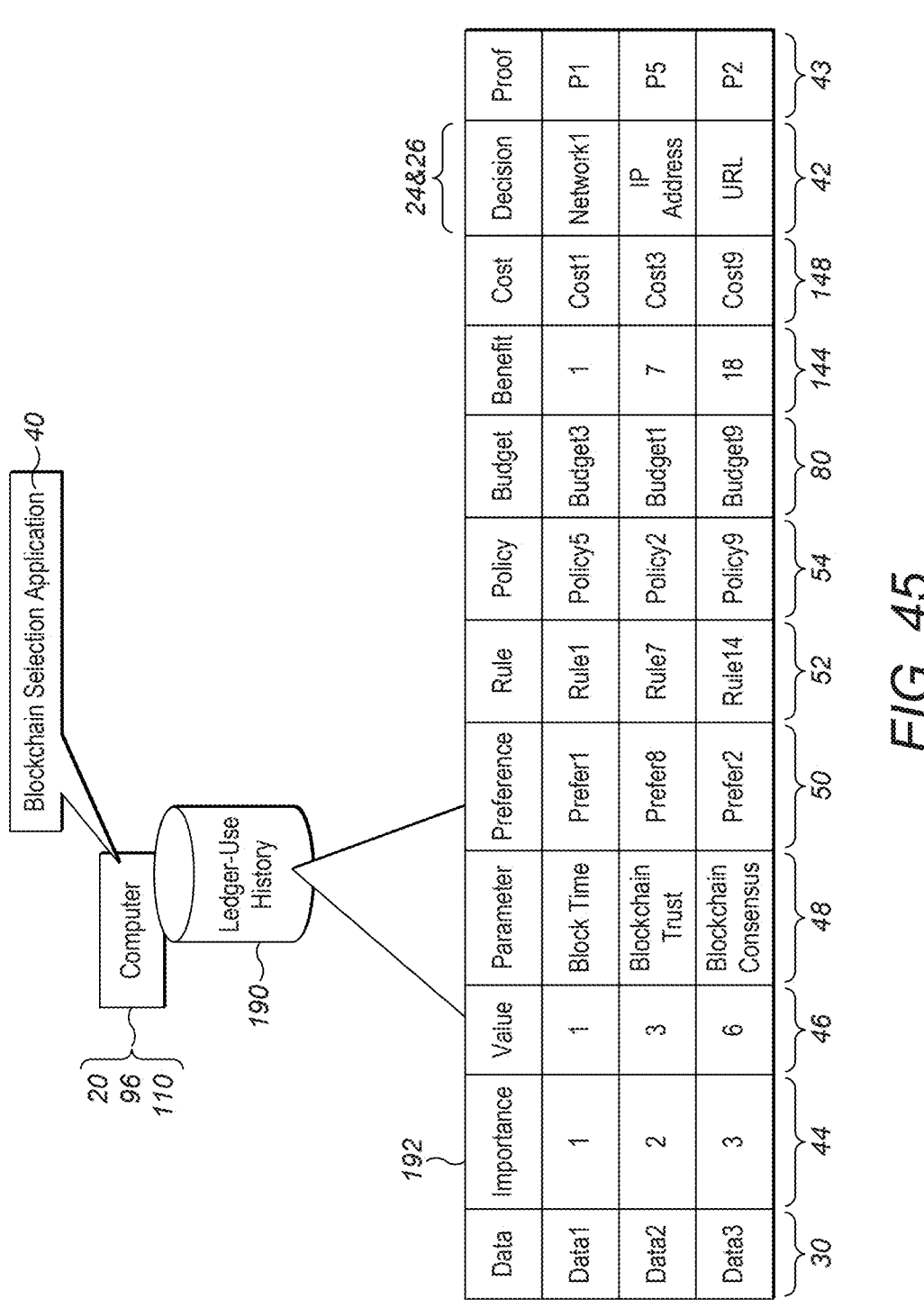
Figure 46:
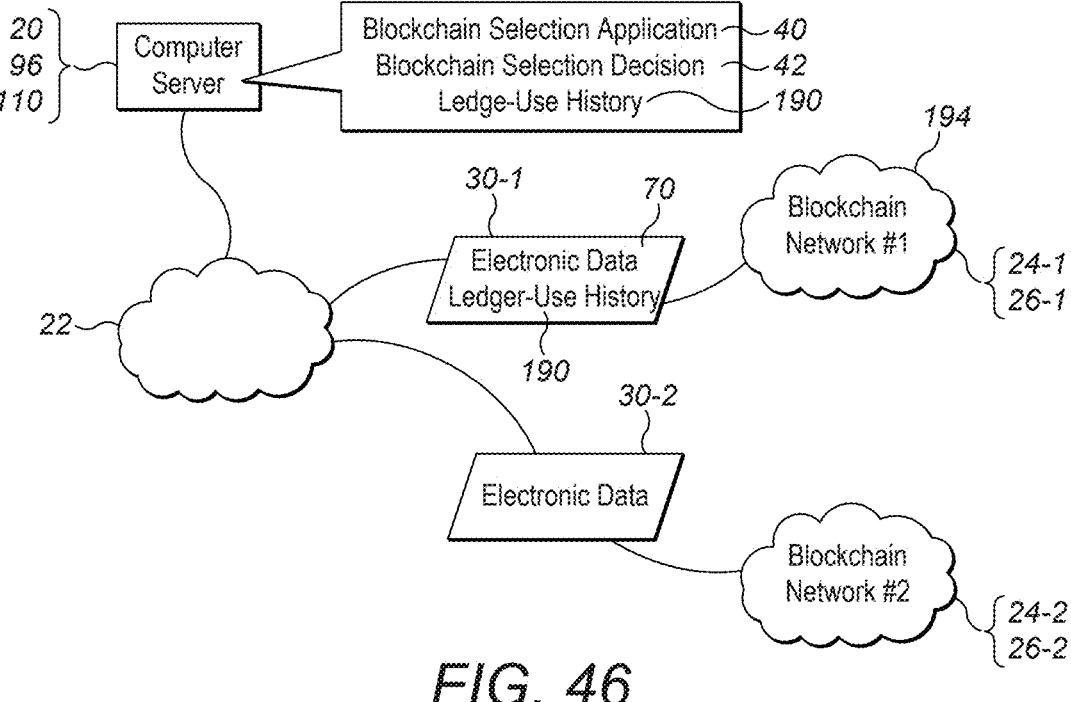

FIGS. 44-46 illustrate a ledger-use history 190, according to exemplary embodiments. As the reader may now understand, over time backup transfers of the user's electronic data 30 may be dispersed to many different blockchain networks 24 and/or service providers 26, perhaps depending on the electronic data 30 and the blockchain ledger decision 42 (as this disclosure above explained). For example, this disclosure already explained how the user may prefer that her banking, financial, and cryptocoinage records and transactions be routed to, and written to, Amazon's Quantum Ledger Database 24b and 26b (as previously explained with reference to FIG. 6). However, the user may also prefer that her personal digital images and movies be sent and written to IBM's Blockchain Platform 24c and 26c. Over time, then, different blockchain ledger decisions 42 may cause the computer 20 (such as the blockchain node 96 or the server 110) to route redundant copies of the user's electronic data 30 to many different destination blockchains 24 and 26.

The ledger-use history 190 tracks the redundant blockchain writes. Each time the blockchain ledger decision 42 is generated, the computer 20 may log the blockchain ledger decision 42. The blockchain selection application 40, for example, may cause the computer 20 to record any or all of the factors, parameters, metrics that influenced or contributed to the blockchain ledger decision 42 (e.g., the importance 44 and value 46 of the electronic data 30, the ledger or blockchain preferences 50, the rules 52, the policies 54, and/or the budget 80, as this disclosure above explained). The blockchain selection application 40 may also instruct the computer 20 to archive the blockchain ledger decision 42 and the destination blockchain network(s) 24/26. The blockchain selection application 40 may also instruct the computer 20 to archive the cryptographic proof 43 of the redundant blockchain write. The ledger-use history 190 may thus record and map the reasons for, and the locations of, backup transfers of the user's electronic data 30.

FIG. 45 illustrates the ledger-use history 190. While the ledger-use history 190 may have any structure and form, a relational database is thought easiest to understand and to illustrate. FIG. 45 thus shows the ledger-use history 190 as an electronic table 192. The ledger-use history 190 may thus have database entries that map, associate, convert, or translate each blockchain ledger decision 42 to its constituent parts. That is, the ledger-use history 190 has columns and rows that record any or all of the factors, parameters, metrics that influenced or contributed to the blockchain ledger decision 42 (e.g., the importance 44 and value 46 of the electronic data 30, the ledger or blockchain preferences 50, the rules 52, the policies 54, the budget 80, the benefit 144, and/or the cost 148, as this disclosure above explained). The ledger-use history 190 may also archive each piece of the backup-up electronic data 30 and its corresponding blockchain ledger decision 42. In simple words, the ledger-use history 190 tracks or maps the copied electronic data 30 to its corresponding blockchain destination (e.g., the blockchain network 24 and/or service provider 26). While the ledger-use history 190 is illustrated as being locally stored in the computer 20 (such as the blockchain node 96 or the server 110), the ledger-use history 190 may be remotely stored and accessed/queried at any networked location. The ledger-use history 190 may thus be queried for any query parameter, and the computer 20 may quickly and easily retrieve or identify the corresponding entry.

FIG. 46 also illustrates the ledger-use history 190. Exemplary embodiments may write the ledger-use history 190 to a blockchain for immutable recordation. The blockchain selection application 40, for example, may cause the computer 20 to write the electronic data (illustrated as reference numeral 30-1) to the first blockchain (illustrated as reference numerals 24-1 and 26-1). The blockchain selection application 40 may also instruct the computer 20 to generate the blockchain selection decision 42, generate a backup or duplicate copy of the electronic data (illustrated as reference numeral 30-2), and to write/transfer the electronic copy to the second blockchain (illustrated as reference numerals 24-2 and 26-2). Here, though, the ledger-use history 190 may also be written. That is, the blockchain selection application 40 may also instruct the computer 20 to generate and to write the ledger-use history 190 to either, or both, of the blockchains. FIG. 46, for example, illustrates the computer 20 requesting or writing the ledger-use history 190 to the first blockchain 24-1 and 26-1. Exemplary embodiments may thus write both the electronic data 30-1 and the ledger-use history 190 to the first blockchain 24-1 and 26-1. The ledger-use history 190, however, may additionally or alternatively be written to the second blockchain 24-2 and 26-2. regardless, the ledger-use history 190 maps the blockchain locations of the user's backup copies 30-2. The ledger-use history 190 may also describe why the backup copy 30-2 was generated and why the backup copy 30-2 was written to the second blockchain 24-2 and 26-2. The first blockchain 24-1/26-1 may thus store all the user's electronic data 30-1, while the second blockchain 24-2/26-2 stores the justifiable backup copies 30-2. The ledger-use history 190 records from where the backup copies 30-2 may be retrieved. The ledger-use history 190 may also record how the backup copies 30-2 may be reconstructed or reassembled.

Exemplary embodiments may thus meta-chain. The first blockchain 24-1/26-1 may write and store all the user's electronic data 30-1, in addition to all the metadata 70 describing the electronic data 30-1 and/or the blockchain selection decision 42. This disclosure may thus refer to the first blockchain 24-1/26-1 as a meta-blockchain 194 that writes and records all the user's electronic data 30-1. The meta-blockchain 194 may also write and store any or all of the metadata 70. The meta-blockchain 194 may thus store first drafts, subsequent drafts, and master copies of all the user's electronic data 30-1. The meta-blockchain 194 may also write and store the ledger-use history 190 containing the metadata 70 describing why the backup copies 30-2 were generated and where the backup copies 30-2 are located. The meta-blockchain 194 may thus contain any rules or procedures for retrieving the backup copies 30-2. The meta-blockchain 194 may also contain any rules or procedures for integrating or reassembling the backup copies 30-2 into a whole or larger part. The ledger-use history 190 and the meta-blockchain 194 may thus resemble a treasure map for acquiring and reassembling transactions representing the backup copies 30-2. The meta-blockchain 194 is thus a master blockchain that records and reproduces a total record of our whole transaction histories. The meta-blockchain 194, for example, may store a complete Merkel tree describing the user's writes and backup writes. The Merkel tree may thus be updated and/or rewritten with any write to the meta-blockchain 194.

The ledger-use history 190 may be comprehensive for every user/account/profile. The Ledger use history is the User's complete history of Which transaction, business process or user; Produced which data Ledger choice for the data's storage; How data may have been batched, selected or transformed before ledger storage; Ledger location of storage and contents placed there; The original data's location (anywhere, on any system) at the time it was available for ledger storage; and/or a time at which this occurred. The purpose of the ledger-use history 190 is that allows either of two critical functions. It would allow a complete timeline reconstruction, across all ledgers, of all data ever stored. Without the ledger use history, this process is possible but would lack the "roadmap" provided the by the Ledger Use History. It should also make possible point-to-point validation of specific items of data and their ledger-stored validation.

Exemplary embodiments may include descriptive fielding. Descriptive fielding is added data to identify for any data additional data that needs to be available for the Business Rules, Ledger Usage Rules, or Ledger Use History, such as: Authorship; Person; Organization; Licensing; Meaning; Definition of terms/variables; Creation rules; Validation rules; System Origins & Location; Storage size/ attributes; File format; Access rules/credentials; URL, address, or system details; Purpose; Suggested use; Suggested users, Suggested audience (readers); Suggested other;

Authentication; Suggested methods for determining data reasonableness; Suggested methods for determining data likelihood; Intended or appropriate uses; the authorship; and/or technical description.

In some implementations, the ledger usage rules can include pre-determined preferences or thresholds (e.g., independent of price; but based on a ledger's operating characteristics). For example, the ledger usage rules can include ledger fidelity rules (e.g., which ledgers are relatively more suitable for writing relatively more (or more detailed) data.) The ledger fidelity rules can focus on the data's flow rate rather than the ledger's ability to write quickly and without delays. For example, in the ledger fidelity rules, specific ledgers may be given rules that prefer to select data from the total available on a spectrum of, for example, full fidelity (e.g., prefer an exact copy), a random-sampled (e.g., any random fraction greater than zero and less than one, e.g., between 0.01% and 50%), a time-sampled (e.g., one transaction per fractional second, second, minute, hour, day etc.), a time-compressed (e.g., lossy compression that can serve to validate an original value.) The ledger usage rules 210 can include ledger priority rules (e.g., in what order of preference). In some implementations, the ledger priority rules can include a ranked list with the user's most-preferred ledgers prioritized for selection, ranked down to least preferred.

In some implementations, the ledger use history 190 can include the user's usage history of the ledger (e.g., transaction identification, business process identification, data metadata, ledger choice (or identification) for the data's storage, data processing history including how data may have been batched, selected, or transformed before ledger storage, leger location of storage and contents stored, the original data's location at the time it was available for ledger storage, time at which the ledger storage occurs, and/or the like) The ledger use history 190 can enable a timeline reconstruction (e.g., across all ledgers, of all data ever stored by the metachain computing node.) or a roadmap of the data and ledgers. The ledger-use history 190 can also enable point-to-point validation of specific items of data and their ledger-stored validation.

Credentials may also be written. Any verification and/or authentication credentials may be retrieved and written with, or to accompany, a duplicate copy of the electronic data 30. The first blockchain network 24-1, for example, may retrieve and write the electronic data 30 and the user's/administrator's credentials, public/private keys, and any other identifying or authenticating information. The second blockchain network 24-2 may additionally or alternatively retrieve and write the electronic data 30 and the user's/administrator's credentials, public/private keys, and any other identifying or authenticating information. The ledger use history 190 may thus record/log a storage event, along with context (e.g., the importance 44 and value 46 of the electronic data 30, the ledger or blockchain preferences 50, the rules 52, the policies 54, the budget 80, the benefit 144, and/or the cost 148, as this disclosure above explained). The ledger use history 190 thus repeat this tracking or logging of each data storage event (such as the read/write operation 34 and/or the write request 36).

Checkpoints may also be generated and/or written. In some implementations, the metachain computing node 96 can generate data checkpoints (i.e., summaries, snapshots, images) of the electronic data 30 and/or any write/storage event. In some implementations, the data checkpoints include a partial or full view of the past series of data stored on the selected ledger and metadata (e.g., storage layout of the data). In some implementations, the data checkpoints record the state of data within the metachain computing node (or the distributed ledger databases) is captured at various points in time. For example, when a review of the user's business rules (e.g., a periodic review) and ledger usage rules indicates that the data storage (e.g., transactions) on a distributed ledger database does not meet the business rules, the metachain computing node can create checkpoints (or summaries) to supplement the past ledger storage. The metachain computing node can generate checkpoints in the sampling methods discussed with regards to the ledger fidelity rules. For example, the metachain computing node can generate the checkpoints at a random time, at a pre-determined time, and/or periodically. Alternatively, the metachain computing node can sample the random bytes of data as checkpoints, sample pre-determined bytes of data at a pre-determined interval, or use a compression algorithm to generate the checkpoints. In some implementations, the metachain computing node can generate the checkpoints and write the checkpoints to distributed ledger databases. In some implementations, the leaf computing nodes of the distributed ledger database where the user data is stored can generate the checkpoints and write the checkpoints to different distributed ledger databases and/or store in the metachain computing node. In some implementations, the data checkpoints can be used to verify that user's data are synchronized (or duplicated, cloned) across multiple distributed ledger databases and the user's data can be accessed through multiple distributed ledger databases. Thus, when there is a failure of a distributed ledger database where user's data is stored, user's data can be accessed through other distributed ledger database to achieve business continuity, fault tolerance, and disaster recovery.

Data ownership may also be generated and/or written. When there is a change of ownership of the user's electronic data 30 (e.g., the owner of the real estate property has changed), the metachain computing node can change the ownership of the master account. In some implementations, the metachain computing node can retrieve identifying information (e.g., the previous credentials) associated with the master account and verify the new owner's authorization. Once authorized, the metachain computing node can update the credential (e.g., generate a new credential associated with the new owner) and synchronize (or duplicate) the updated credentials across multiple distributed ledger databases 24/26. In some implementations, the change of ownership of the master account (and the change of credentials) can be processed and recorded on the metachain computing node (e.g., a participant of the private distributed ledger database) and anchored on a public distributed ledger database. Therefore, the credentials (and partial or full view of the data) remain confidential while allowing for public proof of immutability of the change of ownership events.

Figure 47:
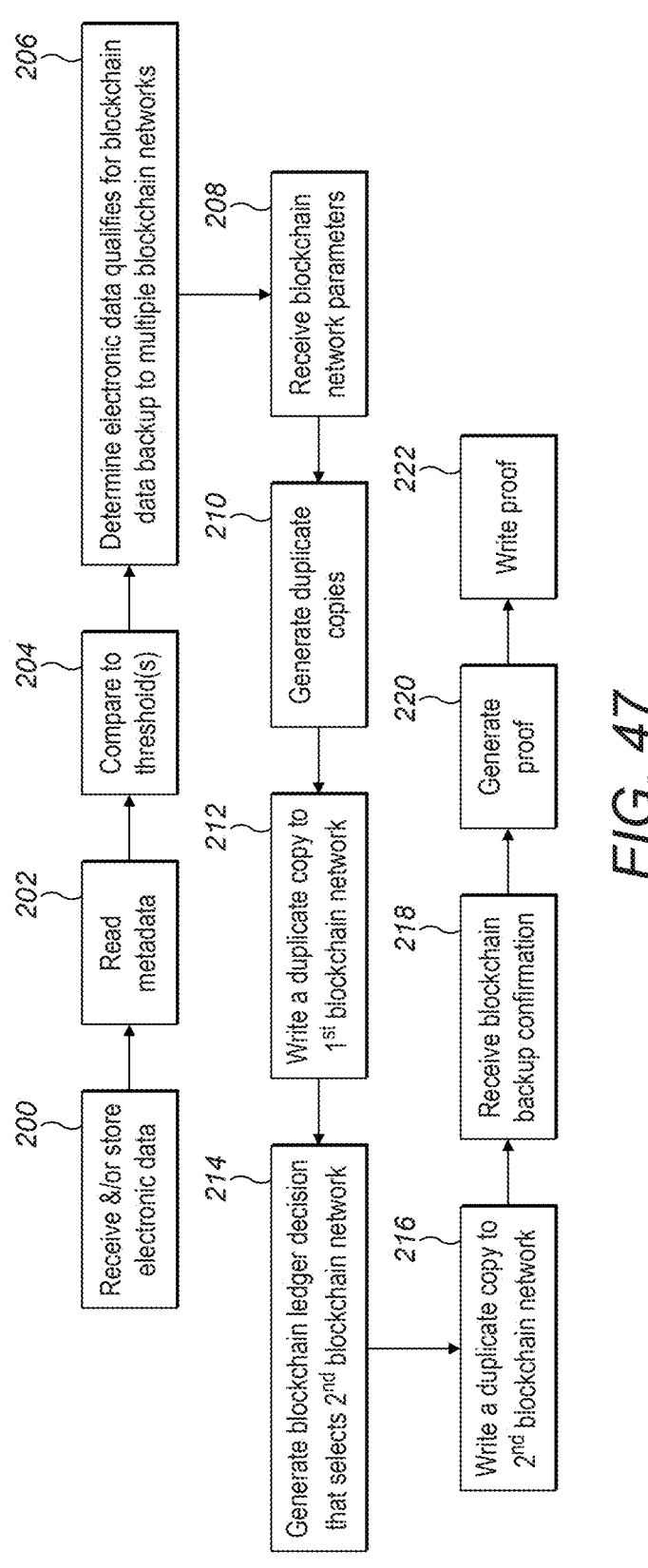
FIGS. 47-49 are flowcharts illustrating methods or algorithms for blockchain data backups, according to exemplary embodiments.
Figure 48:
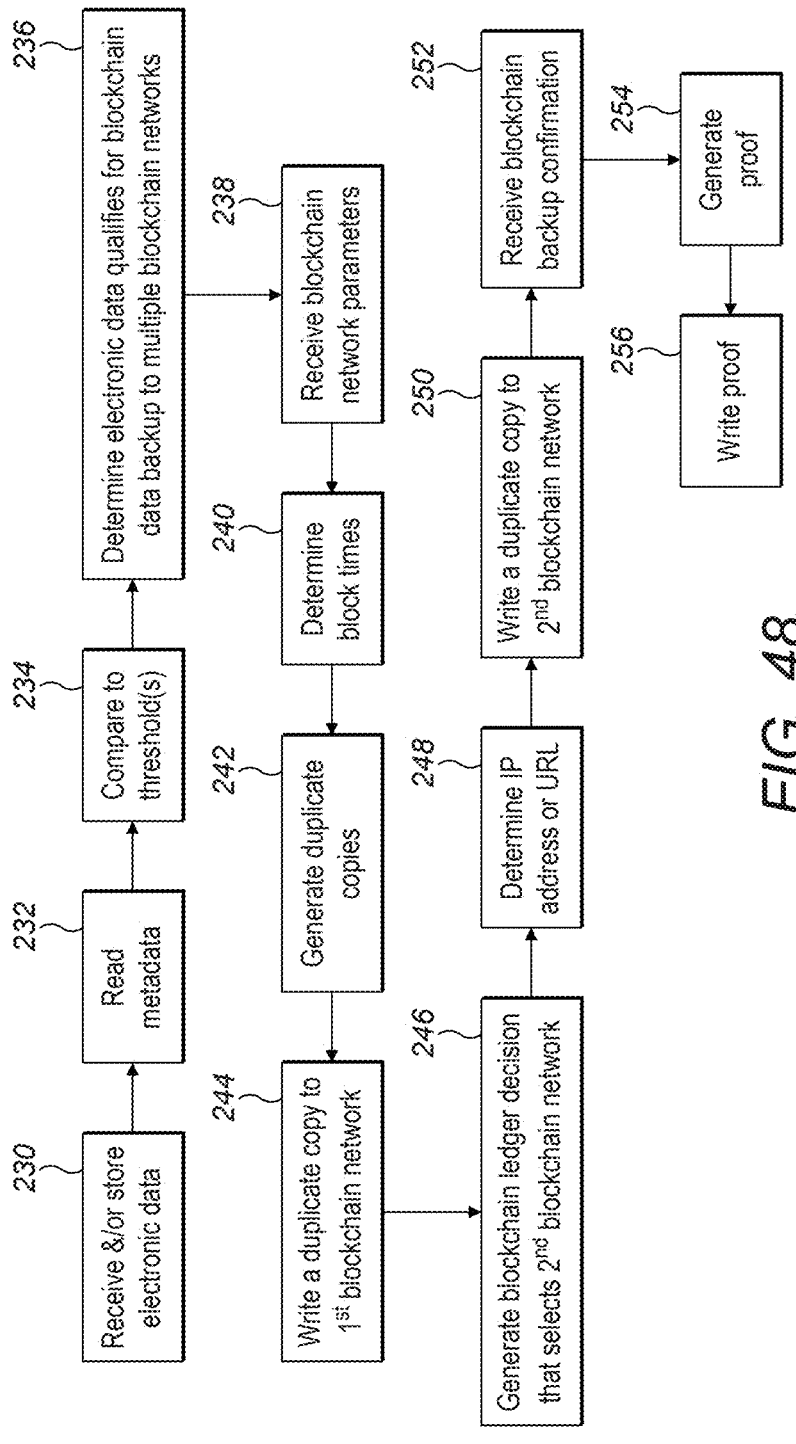
Figure 49:
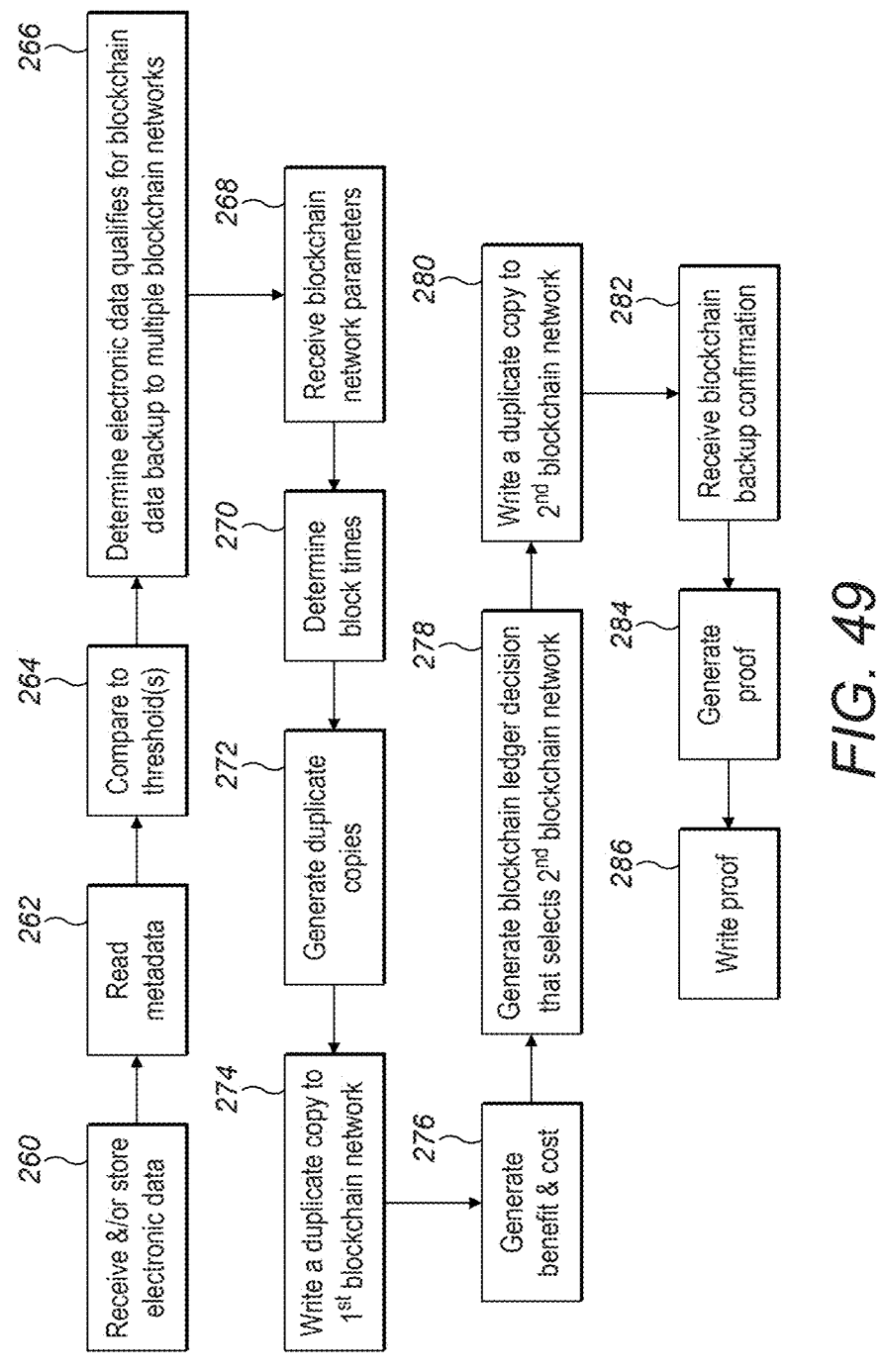

FIGS. 47-49 are flowcharts illustrating methods or algorithms for cryptographically proving a blockchain data backup to multiple blockchain networks, according to exemplary embodiments. The electronic data 30 is received and locally stored (Block 200). The metadata 70 specifying the importance 44 and the value 46 is read (Block 202). The importance 44 and the value 46 may be compared to threshold value(s) (Block 204). When the importance 44 and the value 46 satisfy the threshold value(s), the electronic data 30 may be determined to qualify for the blockchain data backup to the multiple blockchain networks 24/26 (Block 206). The blockchain network parameters 48 are received (Block 208). One or more duplicate copies of the electronic data 30 may be generated (Block 210). At least one of the duplicate copies is written to the first blockchain network (such as reference numeral 24-1 illustrated in FIG. 19) (Block 212). The blockchain ledger decision 42 is generated that selects the appropriate or desired second blockchain network 24-2 (Block 214) (perhaps based on the importance 44 and value 46 of the electronic data 30, the ledger or blockchain preferences 50, the rules 52, the policies 54, the budget 80, the benefit 144, and/or the cost 148, as this disclosure above explained). Another duplicate copy is written to the second blockchain network 24-2 (Block 216). The blockchain backup confirmation 138 is received (Block 218) and the cryptographic proof 43 is generated (Block 220). The cryptographic proof 43 may be written to either or both of the first blockchain network 24-1 and the second blockchain network 24-2 (Block 222).

FIG. 48 illustrates another method or algorithm. The electronic data 30 is received and locally stored (Block 230). The metadata 70 specifying the importance 44 and the value 46 is read (Block 232). The importance 44 and the value 46 may be compared to threshold value(s) (Block 234) to determine the electronic data 30 qualifies for the blockchain data backup to the multiple blockchain networks 24/26 (Block 236). The blockchain network parameters 48 are received (Block 238) and the corresponding block times are read or otherwise determined (Block 240). One or more duplicate copies of the electronic data 30 may be generated (Block 242). At least one of the duplicate copies is written to the first blockchain network 24-1 (Block 244). The blockchain ledger decision 42 is generated that selects the appropriate or desired second blockchain network 24-2 (Block 246) (perhaps by querying the electronic databases 150 and 154 having entries that map the block times, the importance 44, the value 46, and the blockchain network parameters 48 to the second blockchain network). An Internet protocol address associated with the second blockchain network is identified (Block 248). Another duplicate copy is written to the second blockchain network 24-2 (Block 250). The blockchain backup confirmation 138 is received (Block 252) and the cryptographic proof 43 is generated (Block 254). The cryptographic proof 43 may be written to either or both of the first blockchain network 24-1 and the second blockchain network 24-2 (Block 256).

FIG. 49 illustrates another method or algorithm. The electronic data 30 is received and locally stored (Block 260). The metadata 70 specifying the importance 44 and the value 46 is read (Block 262). The importance 44 and the value 46 may be compared to threshold value(s) (Block 264) to determine the electronic data 30 qualifies for the blockchain data backup to the multiple blockchain networks 24/26 (Block 266). The blockchain network parameters 48 are received (Block 268) and the corresponding block times are read or otherwise determined (Block 270). One or more duplicate copies of the electronic data 30 may be generated (Block 272). At least one of the duplicate copies is written to the first blockchain network 24-1 (Block 274). The benefit 144 and the cost are generated (Block 276) (perhaps by using the importance 44, the value 46, the ledger or blockchain preferences 50, the rules 52, the policies 54, the budget 80, the benefit 144, the cost 148, and/or the block times as inputs, as this disclosure above explained). The blockchain ledger decision 42 is generated that selects the appropriate or desired second blockchain network 24-2 (Block 278). Another duplicate copy is written to the second blockchain network 24-2 (Block 258). The blockchain backup confirmation 138 is received (Block 282) and the cryptographic proof 43 is generated (Block 284). The cryptographic proof

43 may be written to either or both of the first blockchain network 24-1 and the second blockchain network 24-2 (Block 286).

Figure 50:
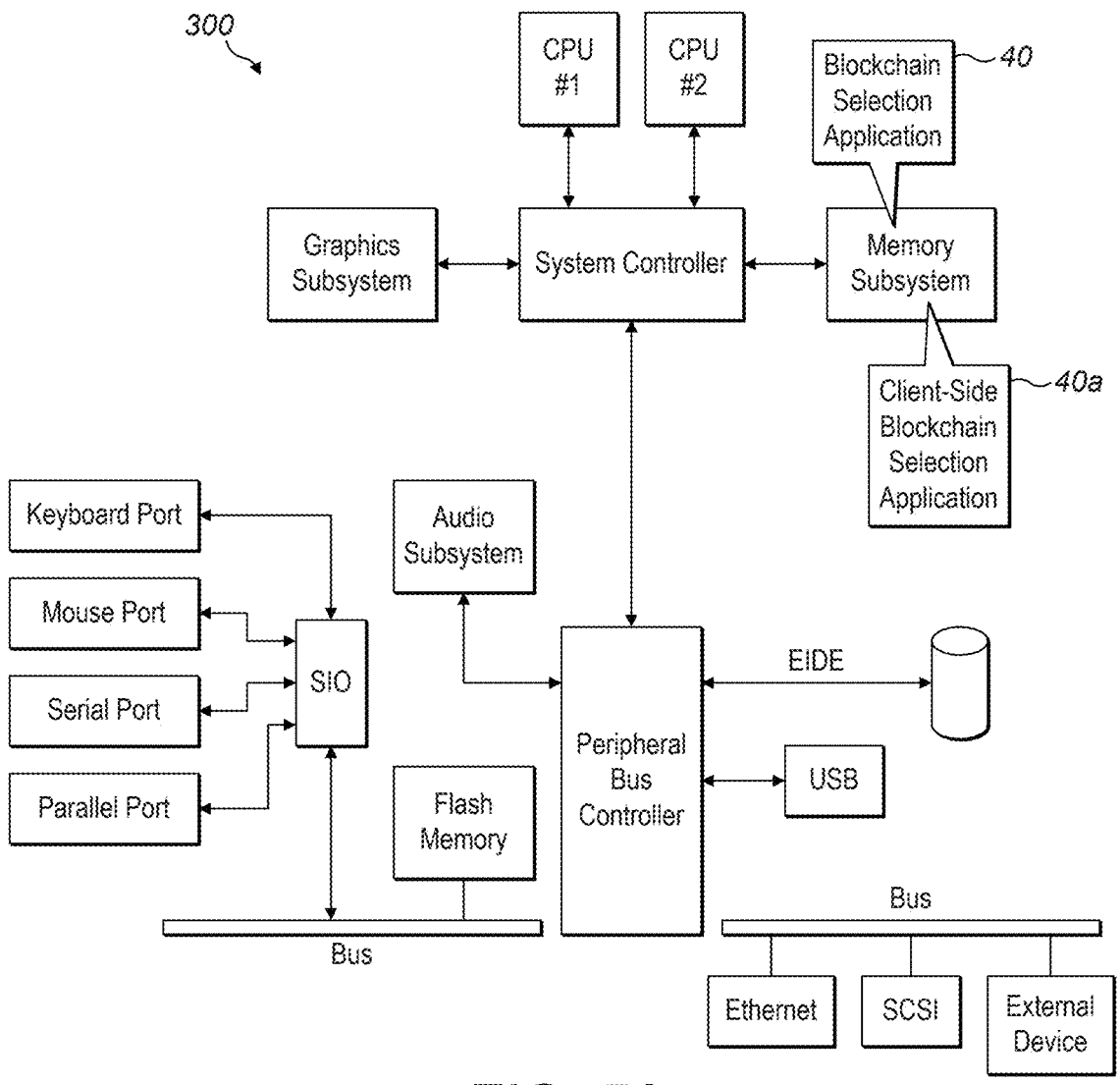
FIGS. 50-51 depict still more operating environments for additional aspects of exemplary embodiments.

FIG. 50 is a schematic illustrating additional exemplary embodiments. FIG. 50 is a more detailed diagram illustrating a processor-controlled device 300. As earlier paragraphs explained, the blockchain selection application 40 and/or the client-side blockchain selection application 40a may partially or entirely operate in any mobile or stationary processor-controlled device. FIG. 50, then, illustrates the blockchain selection application 40 and/or the client-side blockchain selection application 40a stored in a memory subsystem of the processor-controlled device 300. One or more processors communicate with the memory subsystem and execute either, some, or all applications. Because the processor-controlled device 350 is well known to those of ordinary skill in the art, no further explanation is needed.

Figure 51:
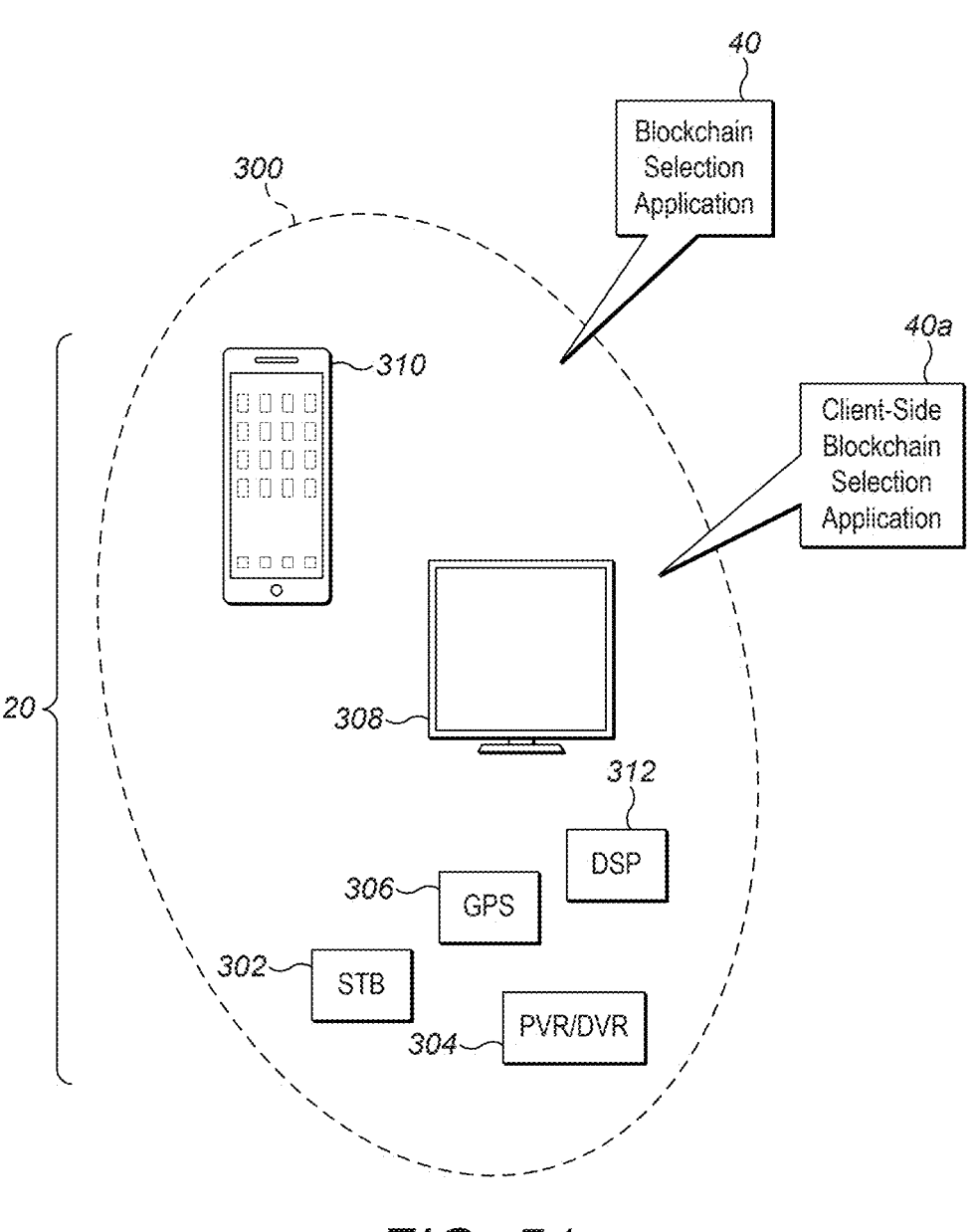

FIG. 51 depicts other possible operating environments for additional aspects of the exemplary embodiments. FIG. 51 illustrates the blockchain selection application 40 and/or the client-side blockchain selection application 40a operating within various other processor-controlled devices 300. FIG. 51, for example, illustrates that the blockchain selection application 40 and/or the client-side blockchain selection application 40a may entirely or partially operate within any computer 20, such as a set-top box ("STB") (302), a personal/digital video recorder (PVR/DVR) 304, a Global Positioning System (GPS) device 306, an interactive television 308, a tablet computer 310, or any computer system, communications device, or processor-controlled device utilizing any of the processors above described and/or a digital signal processor (DP/DSP) 312. Moreover, the processor-controlled device 300 may also include wearable devices (such as watches), radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for blockchain data backup to multiple blockchain networks, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method of data backup to multiple blockchain networks, comprising the steps of:

recording by a computer an electronic data to a first blockchain network of a set of multiple blockchain networks by sending a first write request;

selecting by the computer a second blockchain network of the set of multiple blockchain networks based on an evaluation of a predetermined set of network parameters, wherein the second blockchain network is different from the first blockchain network;

recording by the computer the electronic data to the second blockchain network by sending a second write request;

receiving by the computer a confirmation confirming the recording of the electronic data to the second blockchain network;

using an electronic representation of a hashing algorithm, generating by the computer a cryptographic proof of the recording of the electronic data to the second blockchain network; and recording by the computer the cryptographic proof, of the recording of the electronic data to the second blockchain network, to the first blockchain network by sending a third write request.

2. The method of claim 1, wherein the selecting step comprises performing a network-benefit calculation.

3. The method of claim 2, wherein the selecting step further comprises performing a network-cost calculation.

4. The method of claim 3, wherein the selecting step comprises a step of comparing a result of the network-benefit calculation to a result of the network-cost calculation.

5. The method of claim 4, wherein the step of comparing a result of the network-benefit calculation to a result of the network-cost calculation includes comparing a cost-benefit ratio to a predetermined network-threshold value.

6. The method of claim 1, wherein the predetermined set of network parameters comprises a block time parameter.

7. The method of claim 1, wherein the selecting step is further based on an evaluation of a metadata of the electronic data.

8. The method of claim 7, wherein the evaluation of a metadata of the electronic data comprises comparing the metadata to a metadata-threshold value.

9. A computer system that cryptographically proves a data backup to multiple blockchain networks, comprising:

a hardware processor; and a memory storing instructions that, when executed by the hardware processor, perform operations comprising:

recording an electronic data to a first blockchain network of a set of multiple blockchain networks by sending a first write request;

selecting a second blockchain network of the set of multiple blockchain networks based on an evaluation of a predetermined set of network parameters, wherein the second blockchain network is different from the first blockchain network;

recording the electronic data to the second blockchain network by sending a second write request;

receiving a confirmation confirming the recording of the electronic data to the second blockchain network;

using an electronic representation of a hashing algorithm, generating a cryptographic proof of the recording of the electronic data to the second blockchain network; and recording the cryptographic proof, of the recording of the electronic data to the second blockchain network, to the first blockchain network by sending a third write request.

10. The computer system of claim 9, wherein the selecting operation comprises performing a network-benefit-calculation operation.

11. The computer system of claim 10, wherein the selecting operation comprises performing a network-cost-calculation operation.

12. The computer system of claim 11, wherein the selecting operation comprises an operation of comparing a result of the network-benefit calculation to a result of the network-cost calculation.

13. The computer system of claim 12, wherein the operation of comparing a result of the network-benefit calculation to a result of the network-cost calculation includes an operation of comparing a cost-benefit ratio to a predetermined network-threshold value.

14. The computer system of claim 9, wherein the predetermined set of network parameters comprises a block time parameter.

15. A memory device storing instructions that, when executed by a hardware processor, perform operations that cryptographically prove a blockchain data backup to multiple blockchain networks, the operations comprising:

recording an electronic data to a first blockchain network of a set of multiple blockchain networks by sending a first write request;

selecting a second blockchain network of the set of multiple blockchain networks based on an evaluation of a predetermined set of network parameters, wherein the second blockchain network is different from the first blockchain network;

recording the electronic data to the second blockchain network by sending a second write request;

receiving a confirmation confirming the recording of the electronic data to the second blockchain network;

using an electronic representation of a hashing algorithm, generating a cryptographic proof of the recording of the electronic data to the second blockchain network; and recording the cryptographic proof, of the recording of the electronic data to the second blockchain network, to the first blockchain network by sending a third write request.

16. The memory device of claim 15, wherein the selecting operation comprises performing a network-benefit-calculation operation.

17. The memory device of claim 16, wherein the selecting operation comprises performing a network-cost-calculation operation.

18. The memory device of claim 17, wherein the selecting operation comprises an operation of comparing a result of the network-benefit calculation to a result of the network-cost calculation.

19. The memory device of claim 15, wherein the predetermined set of network parameters comprises a block time parameter.

20. The memory device of claim 15, wherein the operation of selecting is further based on an evaluation of a metadata of the electronic data.

* * * * *